(12) United States Patent
Matsumura et al.

(10) Patent No.: US 12,013,525 B2
(45) Date of Patent: Jun. 18, 2024

(54) MAGNIFIED OBSERVATION APPARATUS

(71) Applicant: Keyence Corporation, Osaka (JP)

(72) Inventors: Shingo Matsumura, Osaka (JP); Suguru Sekiya, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 289 days.

(21) Appl. No.: 17/574,590

(22) Filed: Jan. 13, 2022

(65) Prior Publication Data
US 2022/0269062 A1    Aug. 25, 2022

(30) Foreign Application Priority Data

Feb. 19, 2021    (JP) .................. 2021-025733

(51) Int. Cl.
*G02B 21/36* (2006.01)
*G02B 21/02* (2006.01)
*G02B 21/24* (2006.01)
*G02B 21/26* (2006.01)
(Continued)

(52) U.S. Cl.
CPC .......... *G02B 21/367* (2013.01); *G02B 21/025* (2013.01); *G02B 21/244* (2013.01); *G02B 21/245* (2013.01); *G02B 21/26* (2013.01); *G02B 21/368* (2013.01); *H04N 23/635* (2023.01); *H04N 23/67* (2023.01)

(58) Field of Classification Search
CPC .. G02B 21/367; G02B 21/025; G02B 21/244; G02B 21/245; G02B 21/26; G02B 21/368; H04N 23/635; H04N 23/67
See application file for complete search history.

(56) References Cited

U.S. PATENT DOCUMENTS 7,283,299 B2    10/2007  Inomata
9,007,452 B2     4/2015  Kang
9,213,177 B2 *  12/2015  Olson .................. G02B 21/002
(Continued)

FOREIGN PATENT DOCUMENTS

JP    2015-127770 A    7/2015

OTHER PUBLICATIONS

U.S. Appl. No. 17/574,589, filed Jan. 13, 2022 (111 pages).

*Primary Examiner* — James T Boylan
(74) *Attorney, Agent, or Firm* — Kilyk & Bowersox, P.L.L.C.

(57) ABSTRACT

A magnified observation apparatus includes an FOV changer, an in-focus degree evaluator, and a focus sequence executor. The in-focus degree evaluator calculates in-focus degree feature quantities, which represent in-focus degrees of image data corresponding to images to be displayed by a display controller on a display. The focus sequence executor executes an FOV-moving focus sequence in which a focusing device adjusts a relative distance between a focus position of the objective lens and an observation object in accordance with in-focus degree feature quantities of image data that are successively calculated by the in-focus degree evaluator corresponding to images of the observation object that are captured during movement of an observation FOV by the FOV changer so that a live image of the observation object is displayed on the display based on image data that is obtained during the movement of an observation FOV by the display controller.

20 Claims, 32 Drawing Sheets

(51) Int. Cl.
*H04N 23/63* (2023.01)
*H04N 23/67* (2023.01)

(56) References Cited

U.S. PATENT DOCUMENTS

| | | | |
|---|---|---|---|
| 9,383,569 B2 | 7/2016 | Kang | |
| 9,690,088 B2 | 6/2017 | Karube et al. | |
| 9,690,089 B2 | 6/2017 | Karube | |
| 10,302,931 B2 | 5/2019 | Inomata et al. | |
| 10,379,331 B2 | 8/2019 | Inomata et al. | |
| 10,422,986 B2 | 9/2019 | Inomata et al. | |
| 10,859,806 B2 | 12/2020 | Sekiya et al. | |
| 10,890,747 B2 * | 1/2021 | Kang | G02B 21/368 |
| 10,890,749 B2 | 1/2021 | Futami et al. | |
| 2005/0270611 A1 * | 12/2005 | Oshiro | G02B 21/244 |
| | | | 713/186 |
| 2009/0244698 A1 * | 10/2009 | Zust | G02B 21/365 |
| | | | 359/368 |
| 2010/0254596 A1 * | 10/2010 | Xiong | G06T 3/4053 |
| | | | 382/159 |
| 2011/0316999 A1 * | 12/2011 | Yoneyama | G02B 21/241 |
| | | | 348/79 |
| 2013/0027538 A1 * | 1/2013 | Ding | G01B 11/24 |
| | | | 348/79 |
| 2015/0015861 A1 * | 1/2015 | Sentoku | G03F 7/70516 |
| | | | 355/77 |
| 2018/0275388 A1 * | 9/2018 | Zou | G02B 21/26 |
| 2019/0323832 A1 * | 10/2019 | Natori | G01B 11/2513 |
| 2020/0348603 A1 * | 11/2020 | Staals | G03F 7/70616 |
| 2020/0404186 A1 * | 12/2020 | Wakui | G02B 21/008 |
| 2023/0230798 A1 * | 7/2023 | Igarashi | H01J 37/20 |
| | | | 250/307 |

\* cited by examiner

MAGNIFIED OBSERVATION APPARATUS

CROSS-REFERENCE TO RELATED APPLICATIONS

The present application claims foreign priority based on Japanese Patent Application No. 2021-025733, filed Feb. 19, 2021, the contents of which are incorporated herein by reference.

BACKGROUND

1. Technical Field

The present disclosure relates to a magnified observation apparatus.

2. Description of Related Art

Optical microscopes, digital microscopes, and the like, which include optical lens, are used as a magnified observation apparatus to view samples such as very small substances or objects such as work pieces by enlarging them. A digital microscope includes an XY stage, an optical part, an imaging device such as a CCD or CMOS having two-dimensionally arranged pixels, and a display. An object to be observed can be held on the XY stage. The imaging device can receive light reflected by or passing through the object and electrically measure the light at each pixel. An image can be obtained from the electrically measured light in an imaging field of view of a target position on the XY stage, be displayed on the display. Also, such a digital microscope can further include a focusing device that has a focus adjustment function to obtain a correctly focused image to be displayed on the display. The focusing device can move a Z stage or the objective lens to adjusting a relative distance between the objective lens and the object whereby adjusting the focus of the microscope.

In the case in which an observation field of view is moved, in other words, in the case in which an observation field of view that is displayed in the display is changed to another observation field of view, conventional digital microscopes first move an observation field of view and then adjust the focus of the microscopes. That is, horizontal change of an observation field of view by horizontal movement of the XY stage and vertical focusing movement of the Z stage or the objective lens are executed in different time periods, in other words, in two steps.

In the conventional digital microscopes, during the movement of the XY stage, in other words, during the change of an observation field of view, a correctly focused image cannot be displayed on the display (e.g., see Japanese Patent Laid-Open Publication No. JP 2015-127,770 A).

It is an object of the present disclosure to provide a magnified observation apparatus, a magnified observation method and a non-transitory computer-readable storage medium or storage device storing a magnified observation program that can easily adjust the focus of the magnified observation apparatus in response to change of an observation field of view.

SUMMARY

A magnified observation apparatus according a first aspect of the present invention includes a stage, an objective lens, a camera, a display controller, a focusing device, a field-of-view changer, an in-focus degree evaluator, and a focus sequence executor. An observation object is held on the stage. The objective lens is arranged to face the observation object, which is held on the stage. The camera can capture an image of the observation object through the objective lens, and generate image data representing the image. The display controller controls a display that displays the image of the observation object based on the image data, which is generated by the camera. The focusing device can adjust image focus by changing a relative distance between a focus position of the objective lens and the observation object by moving at least one of the objective lens and the observation object toward or away from each other in an optical axis of the objective lens to focus an image of the observation object. The field-of-view changer can change a position of an optical axis of the objective lens relative to the stage to move an observation field of view (FOV) of the camera. The in-focus degree evaluator calculates in-focus degree feature quantities, which represent in-focus degrees of image data corresponding to images of the observation object that are captured through the objective lens. The focus sequence executor can execute an FOV-moving focus sequence during movement of an observation FOV by the field-of-view changer. In the FOV-moving focus sequence, the focusing device adjusts a relative distance between the focus position of the objective lens and the observation object in accordance with in-focus degree feature quantities of image data that are successively calculated by the in-focus degree evaluator corresponding to images of the observation object that are captured during movement of an observation FOV by the field-of-view changer so that a live image of the observation object is displayed on the display based on image data that is obtained during the movement of an observation FOV by the display controller. The aforementioned magnified observation apparatus can perform image focus adjustment even during movement of an observation FOV.

A magnified observation method according a second aspect of the present invention is provided to observe an observation object that is placed on a stage by capturing an image of the observation object through an objective lens to display the image on a display during movement of a position of the optical axis of the objective lens relative to the stage by using a camera, a focusing device and a field-of-view changer. The focusing device can adjust image focus by changing a relative distance between a focus position of the objective lens and the observation object by moving at least one of the objective lens and the observation object in the optical axis of the objective lens to focus the image of the observation object. The field-of-view changer can change a position of the optical axis of the objective lens relative to the stage to move an observation FOV to be displayed on the display. The method includes moving an observation FOV, successively calculating in-focus degree feature quantities, and executing an FOV-moving focus sequence. In the observation field-of-view moving, an observation FOV corresponding to an image including the observation object that can be generated by the camera at a position of the objective lens relative to the stage is moved by using the field-of-view changer. In the successive calculation of in-focus degree feature quantities, in-focus degree feature quantities are calculated. The in-focus degree feature quantities represent in-focus degrees of image data corresponding to images of the observation object that are captured through the objective lens during movement of an observation FOV by the field-of-view changer. In the FOV-moving focus sequence execution, an FOV-moving focus sequence is executed. In the FOV-moving focus sequence, the focusing device adjusts a relative distance between the focus position of the objective lens and the observation object in accordance with the in-focus degree feature quantities of image data, which are successively calculated by the in-focus degree evaluator corresponding to images of the observation object that are captured during movement of an observation FOV by the field-of-view changer, so that a live image of the observation object is displayed on the display based on image data that is obtained during the movement of an observation FOV. The aforementioned magnified observation method can perform image focus adjustment even during movement of an observation FOV.

A magnified observation program according a third aspect of the present disclosure is provided to cause a computer to perform magnified observation in a magnified observation apparatus. The magnified observation apparatus includes a stage, an objective lens, a camera, a display, a field-of-view changer, and a focusing device. An observation object is held on the stage. The objective lens is arranged to face the observation object on the stage. The camera can capture an image of the observation object through the objective lens, and generate image data representing the image. The display displays the image of the observation object based on the image data, which is generated by the camera. The field-of-view changer can change a position of an optical axis of the objective lens relative to the stage to move an observation FOV to be displayed on the display. The focusing device can adjust image focus by changing a relative distance between a focus position of the objective lens and the observation object by moving at least one of the objective lens and the observation object in an optical axis of the objective lens to focus an image of the observation object. The magnified observation program includes moving an observation FOV, successively calculating in-focus degree feature quantities, and executing an FOV-moving focus sequence. In the observation field-of-view moving, an observation FOV corresponding to an image including the observation object that can be generated by the camera at a position of the objective lens relative to the stage is moved by using the field-of-view changer. In the successive calculation of in-focus degree feature quantities, in-focus degree feature quantities are calculated. The in-focus degree feature quantities represent in-focus degrees of image data corresponding to images of the observation object that are captured through the objective lens during movement of an observation FOV by the field-of-view changer. In the FOV-moving focus sequence execution, an FOV-moving focus sequence is executed. In the FOV-moving focus sequence, the focusing device adjusts a relative distance between the focus position of the objective lens and the observation object in accordance with the in-focus degree feature quantities of image data, which are successively calculated by the in-focus degree evaluator corresponding to images of the observation object that are captured during movement of an observation FOV by the field-of-view changer, so that a live image of the observation object is displayed on the display based on image data that is obtained during the movement of an observation FOV. The aforementioned magnified observation program can realize magnified observation that can perform image focus adjustment even during movement of an observation FOV.

The non-transitory computer-readable storage medium can be a magnetic disk, optical disc, magneto-optical disk or semiconductor memory such as CD-ROM, CD-R, CD-RW, flexible disk, magnetic tape, MO, DVD-ROM, DVD-RAM, DVD-R, DVD+R, DVD-RW, DVD+RW, HD DVD (AOD), Blu-ray (trade name), UHD BD (trade name), USB memory or SSD memory, or another medium that can store the program. The program can be distributed in a form stored in the storage medium, and be also distributed through network such as the Internet (downloaded). The storage medium can include a device that can store the program, for example, a general-purpose device or special-purpose device on which the aforementioned program is installed in a form of executable software, firmware or the like. Processes or functions included in the program can be executed by the program software that can be executed by a computer. The processes of parts can be realized by hardware such as certain gate array (FPGA, ASIC), or a form of combination of program software and partial hardware module that realizes parts of elements of hardware. In this specification, a storage medium includes a non-transitory material medium and transitory propagating signals.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION

Figure 1:
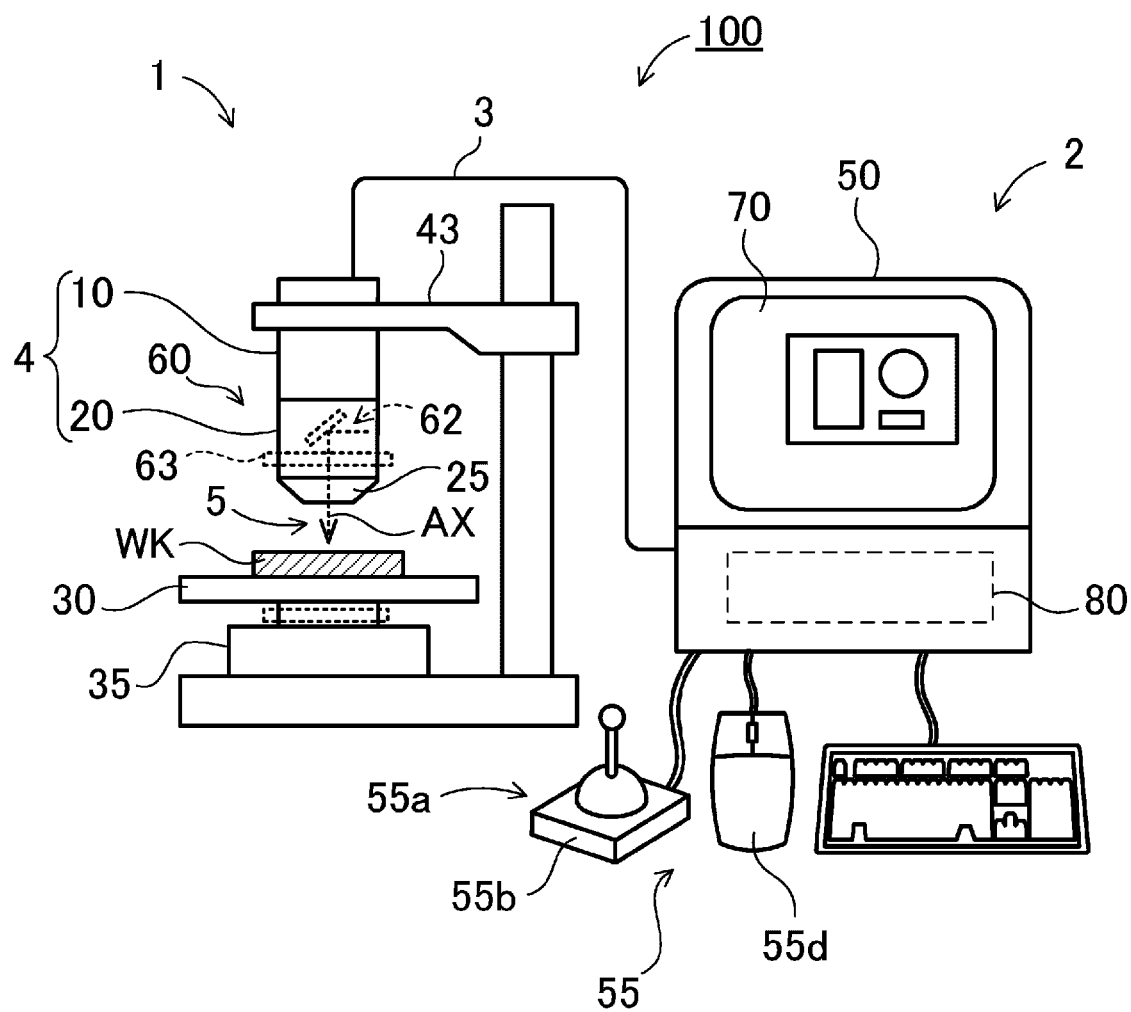
FIG. 1 is an external perspective view showing a magnified observation apparatus according to a first embodiment of the present disclosure.

The following description will describe embodiments according to the present disclosure with reference to the drawings. It should be appreciated, however, that the embodiments described below are illustrations of a magnified observation apparatus, a magnified observation method, a magnified observation program, and a non-transitory computer-readable storage medium or storage device storing the magnified observation program to give a magnified observation apparatus, a magnified observation method, a magnified observation program, and a non-transitory computer-readable storage medium or storage device storing the magnified observation program of the present disclosure are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this present disclosure are attached with the same designation and the same reference signs, and their description is omitted. In addition, a plurality of structural elements of the present disclosure can be configured as a single part that serves the purpose of a plurality of elements, on the other hand, a single structural element can be configured as a plurality of parts that serve the purpose of a single element.

A magnified observation apparatus that is used in embodiments of the present disclosure can be electrically, magnetically or optically connected to and communicate with a computer for operation, control, display and other processes, a printer, an external storage or other peripheral device through serial connection such as IEEE1394, RS-232x, RS-422, and USB, parallel connection, or a network such as 10BASE-T, 100BASE-TX and 1000BASE-T. The connection is not limited to the physical connection using cables. The connection can be wireless connection using electric waves, infrared rays, optical communications including wireless LAN (e.g., IEEE802.1x), and Bluetooth (registered trademark), or the like. A memory card, a magnetic disk, an optical disk, a magneto-optical disk, a semiconductor memory, or the like can be used as a storage medium for data exchange, setting retention, and the like. In this specification, a magnified observation apparatus or a magnified observation method according to the present disclosure refers not only to an observing main device or a magnified observation method to perform magnified observation in such to an observing main device but also to a magnified observation system that includes a computer and peripheral devices such as external storage in addition to its device or a magnified observation method to perform magnified observation in such a magnified observation system.

In the specification, a magnified observation apparatus according to the present disclosure is neither limited to a system that performs magnified observation nor an apparatus that performs input/output, display, calculation, communication, and the other processes relating image capture by using hardware. Also, a magnified observation method according to the present disclosure is neither limited to a method to perform magnified observation in a system that performs magnified observation nor in an apparatus that performs input/output, display, calculation, communication, and the other processes relating image capture by using hardware. An apparatus and a method that realize the processes by using software are also included within the scope of the present disclosure. For example, a magnified observation apparatus according to the present disclosure can include a device or system having a general-purpose circuit or computer that is incorporated with software, program, plug-in, object, library, applet, compiler, module, macro that can be executed in a particular program so as to perform image capture or processing relating to image capture. In this specification, a computer includes a workstation, a terminal, and other electron devices as well as general-purpose device and special-purpose electronic computers. In this specification, the program is not limited to a program that can be used itself alone, but can be a form that functions as a part of a particular computer program, software, service or the like, a form that functions after downloaded when necessary, a form that is provided as service in environment of OS or the like, a form that stays resident in environment, or a form that is executed in the background, or other support program.

First Embodiment

Figure 2:
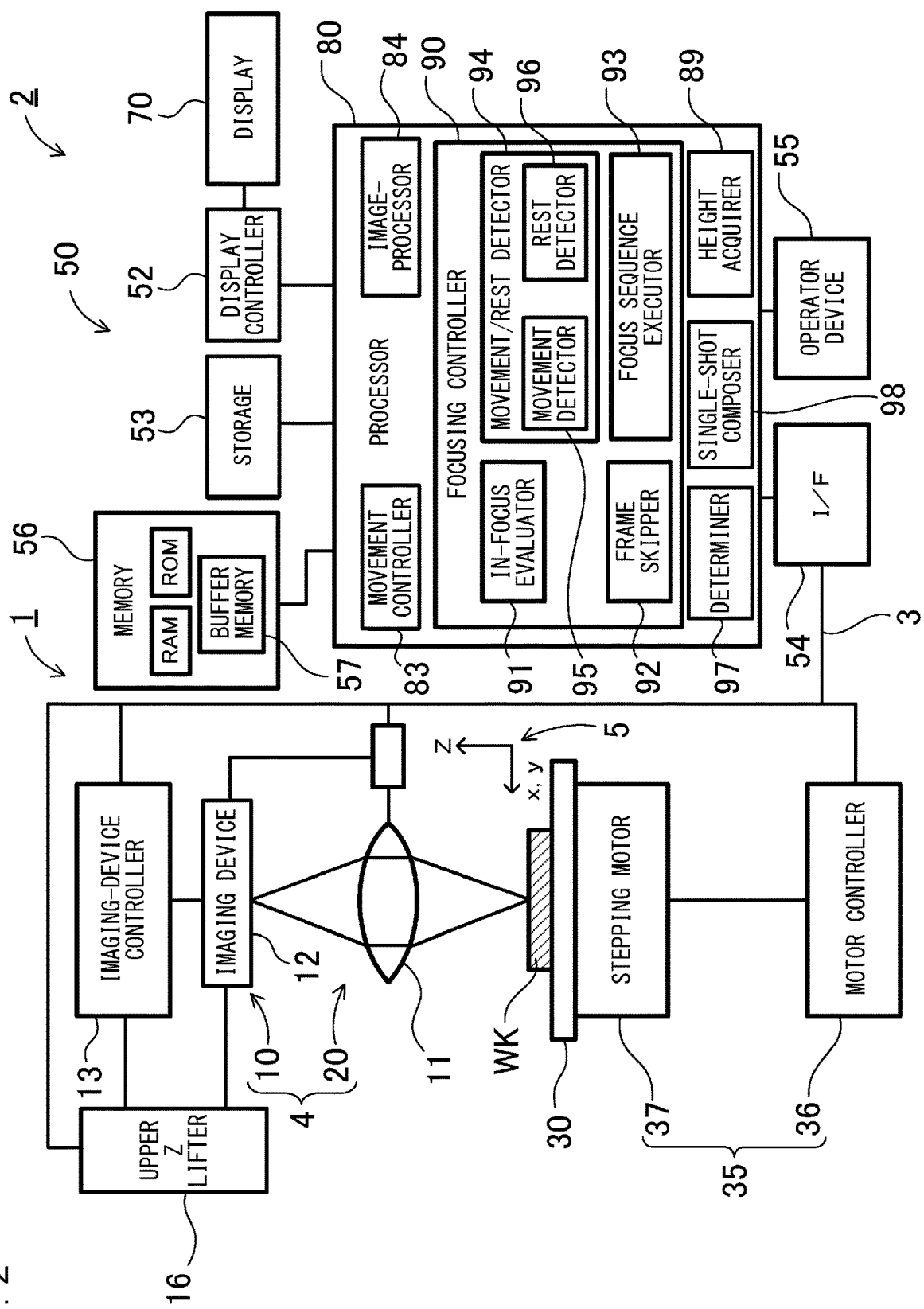
FIG. 2 is a block circuit diagram showing the magnified observation apparatus shown in FIG. 1.
Figure 3:
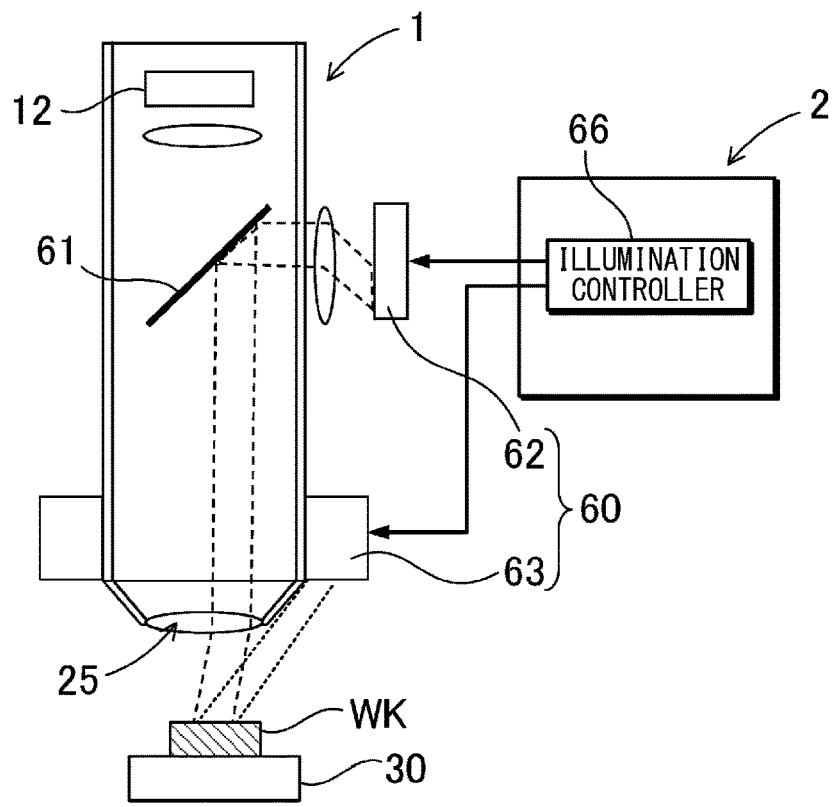
FIG. 3 is a schematic view showing an arrangement of an illuminator of the magnified observation apparatus.

A magnified observation apparatus 100 according to a first embodiment of the present disclosure is now described with reference to FIGS. 1 and 2. The magnified observation apparatus 100 mainly includes an imaging group part 1 and a control group part 2 as shown in FIG. 1. The imaging group part 1 includes an illuminator 60 that can illuminate an object to be observed (observation object) WK as a test piece or sample, a workpiece or any object, and a head 4 which that can capture an image of the observation object WK, which will be illuminated by the illuminator 60. The head 4 includes a camera 10 that includes an imaging device 12 and a microscope lens 20 that is detachably attached to an end of the camera 10 as shown in FIG. 2. The microscope lens 20 forms an imaging optical unit (lens optical unit) 11 that includes a plurality of optical lens elements. In this embodiment, the microscope lens 20 includes an objective lens 25 as shown in FIG. 3. The head 4 serves as an imaging part that receives illumination light reflected by or passing through the object.

The magnified observation apparatus further includes a focusing device. The focusing device can adjust image focus by changing a relative distance between a focus position of the optical imaging group part such as the objective lens 25 and the observation object by moving at least one of the objective lens and the observation object toward or away from each other in an optical axis of the optical imaging group part to focus an image of the observation object. The focusing device includes an upper Z lifter 16 (e.g., upper Z stage) and lower Z lifter 35 (e.g., lower Z stage), for example. The focusing device can be a device that can move the head 4 along the optical axis of the optical imaging group part or a device that can move the objective lens 25 with respect to the head 4 along the optical axis of the optical imaging group part. Alternatively, a lens in the objective lens 25 can be moved along the optical axis of the optical imaging group part. Also, in the case in which the objective lens 25 includes a variable focus liquid lens such as a liquid lens, the liquid lens can be deformed by a control circuit to change a relative distance between a focus position of the optical imaging group part (e.g., the objective lens 25) and the observation object, in other words, to move the focus position of the optical imaging group part along the optical axis of the optical imaging group part so as to increase/decrease the relative distance. The focusing device can include such a focusing device or a liquid lens that focuses under control of a control circuit.

(Camera 10)

The camera 10 includes the imaging device 12, which can receive light reflected by the observation object WK illuminated by the illuminator 60 through the imaging optical unit 11 and electrically measure the light, as shown in FIG. 3. CMOS is used for the imaging device 12 in this embodiment. It is noted that other photoreceptor devices such as CCD can be used for the imaging device 12. The objective lens 25 is arranged to face the observation object on the stage 30. The camera 10 can capture an image of the observation object through the objective lens 25 and generate image data representing the image.

The imaging group part includes the stage 30, which holds the observation object WK, and the upper Z lifter 16, which includes a Z upper stage and serves as a first focus adjuster that can change a relative distance between the stage 30 and the head 4 in a direction of an optical axis of the head 4 to adjust the focus of the objective lens. The upper Z lifter 16 can move the Z upper stage upward and downward. The imaging device 12 of the camera 10 can electrically measure light that passes through the imaging optical unit 11, and is incident on the observation object WK held on the stage 30 and reflected by the observation object WK, or passes through the observation object WK from a bottom surface side of the observation object WK.

The control group part 2 includes a control main unit 50, which includes a display 70. The display 70 can display a magnified image that is captured by the camera 10. The camera 10 is connected to the control main unit 50 through a cable 3. The display 70 can display an image of an observation field of view (observation FOV), which will include the observation object, based on image data that is generated by the camera 10. In this embodiment shown in FIG. 1, the display 70 is integrally formed in the control main unit 50. It is noted that the display can be separately formed from the control main unit. For example, the control main unit 50 can include a display connection interface that can connect the display 70 to the control main unit 50 in addition to a display controller 52, which can generate display information to be displayed on the display 70.

The control main unit 50 further includes a processor 80. The processor 80 can realize a plurality of functions (discussed later) shown in a block diagram of FIG. 2. A general-purpose computer installed with a dedicated program, or a dedicated device can be used as the control main unit 50. In this embodiment, the control main unit is formed of a general-purpose computer in which a magnified observation program that performs magnified observation in the magnified observation apparatus. The control main unit 50 includes the processor 80, the display controller 52, a storage device 53, an interface 54, an operator device 55, and a memory 56.

The cable 3 can be an electric cable that can transmit image information that is acquired by the imaging device 12 of the camera 10 to the control main unit 50. In addition to the electric cable, an optical cable that carries illumination light to the head 4 from the control main unit 50 can be included. In this case, the cable 3 can be integrated electric and optical cable. Alternatively, the electric and optical cables can be separately provided.

(Display 70)

A liquid crystal display, organic electroluminescence display, a CRT monitor, or the like can be used for the display 70. The operator device 55 is connected to the control main unit 50. Users can perform various manipulations by using the operator device 55. The operator device 55 includes an input device such as a console and a mouse. In this embodiment, the display 70 and the operator device 55 can be provided as external equipment. Alternatively, the display or the operator device can be integrally formed in the control main unit. The display 70 can be constructed of a touch panel. In this case, the display 70 and the operator device 55 can be integrally formed with each other.

The operator device 55 is connected through the cable or wirelessly to the control main unit 50 or the computer. Alternatively, the operator device can be directly attached to the computer. Typical examples of pointing devices used for the operator device 55 can be provided by a mouse, keyboard, slide pad, trackpoint, tablet, joy stick, console, jog dial, digitizer, light pen, numeric keypad (ten key), touchpad, and accupoint. The operator device 55 can be used to perform operations of a magnified observation operating program as well as the magnified observation apparatus itself and its peripheral devices. Also, a touch screen or touch panel can be used for the display, which displays interface screens, to allow users to execute input or perform manipulations by directly touching the screen with their fingers. Alternatively, a voice input device or existing input device can be used. In addition, these input devices and such a touch screen can be used together. In the embodiment shown in FIG. 1, the operator device 55 includes a mouse, a keyboard, and a joy stick 55b.

(Illuminator 60)

The illuminator 60 can emit illumination light to illuminate the observation object WK so that an image of the observation object WK is captured by the imaging device 12. FIG. 3 is a schematic view showing an arrangement of the illuminator 60. The illuminator 60 includes an illumination controller 66. The illumination controller 66 controls illumination light based on illumination conditions specified. Brightness of illumination light that is emitted by the illuminator 60 can be adjusted in accordance with the illumination conditions. For example, brightness of illumination light can be adjusted by adjusting a light emission duty cycle or intensity of the illuminator 60. The illuminator 60 can include LEDs as light sources. The illumination controller 66 can control brightness of illumination light by adjusting light emission of the light sources or light transmission amount of a light-shielding device such as a shutter.

A ring-shaped light (dark field illumination), a coaxial light (bright field illumination), which are epi-illumination lights, or the like can be used for the illumination. A suitable transmitted light illuminator, a suitable differentiation interference contrast illuminator, or the like can be suitably used as the illuminator 60. Epi-illumination refers to an illumination technique in which illumination light travels toward an observation object in a downward direction from the top side. A ring-shaped light, a coaxial light and the like can be used in epi-illumination. Angles of light incident on an observation object in coaxial and ring-shaped lights are different from each other so that their degrees of contrast are different from each other. Such coaxial and ring-shaped lights can be selectively used depending on observing objects. A microscope lens and an objective lens that correspond to both coaxial and ring-shaped lights, only to a coaxial light, or only to a ring-shaped light can be as the microscope lens 20, which is detachably attached to an end of the camera 10, and the objective lens 25, which is detachably attached to the microscope lens 20. Transmitted illumination is an illumination technique in which illumination light travels toward an observation object in a upward direction from the bottom side. In the embodiment shown in FIG. 3, the illuminator 60 includes a coaxial epi-illuminator 62 and a ring-shaped illuminator 63. Light from the coaxial epi-illuminator 62 is reflected by a beam splitter 61 to travel parallel to an optical axis AX of the objective lens 25. The illuminator 60 can be incorporated in the head 4 or be separately provided to be detachably attached to the head 4. The illuminator 60 can include LEDs, LDs or the like as light sources that are arranged in the coaxial epi-illuminator 62 and the ring-shaped illuminator 63, or a common illumination light source that is arranged in the control main unit 50. Light from such a common illumination light source can be carried by an optical cable to the illuminators of the head.

Figure 4:
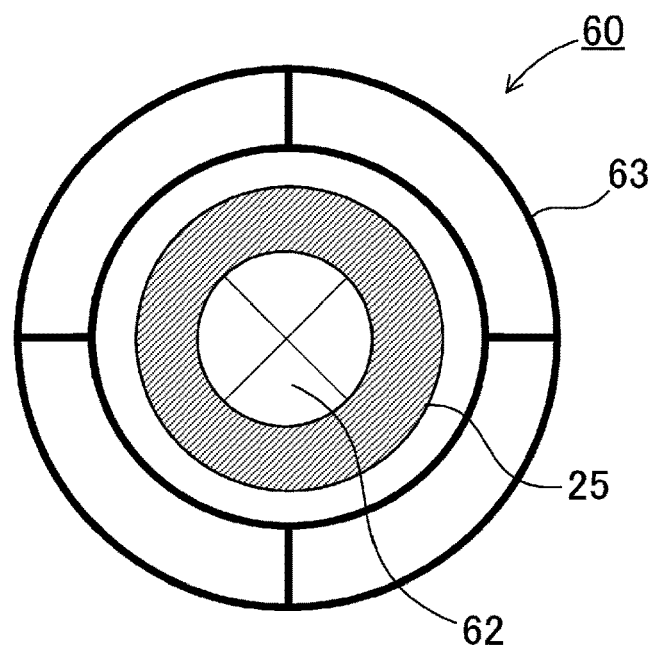
FIG. 4 is a schematic view showing coaxial and ring-shaped lights of the illuminator.

The coaxial light and the ring-shaped light can have an oblique illuminating function. FIG. 4 is a schematic view illustratively showing the coaxial and ring-shaped lights, which have such an oblique illuminating function. This illustrated illuminator 60 includes the coaxial epi-illuminator 62, which has a circular shape and is arranged on the inner side, and the ring-shaped illuminator 63, which similarly has a circular shape and is arranged on the outer side. The coaxial epi-illuminator 62 and the ring-shaped illuminator 63 have arc-shaped illumination blocks, which form their corresponding circles. The coaxial epi-illuminator 62 and the ring-shaped illuminator 63 can realize by selectively activating/deactivating the illumination blocks the oblique illuminating function in which illumination directions can be changed.

Consequently, the illuminator 60 can change between different illumination directions of light incident on the observation object so that the observation object can be irradiated with illumination light from different oblique angles. In addition, the illuminator 60 can irradiate the observation object with one of first and second lighting patterns. In the first lighting pattern, the observation object is irradiated with the different illumination directions of light one after another. In the second lighting pattern, the observation object is irradiated with at least one of the different illumination directions, which are included in the first lighting pattern. The illumination controller 66 controls the change between different illumination directions.

In the embodiment show in in FIG. 4, the ring-shaped illuminator 63 includes four illumination blocks 63a, 63b, 63c and 63d. The illumination blocks 63a to 63d can be independently lighted ON. For example, an illumination direction of light incident on the observation object can be selected by activating one of the illumination blocks 63a to 63d and deactivating the other (by lighting one of the illumination blocks 63a to 63d ON and the others OFF). It is noted that the number of blocks that ate included in the ring-shaped illuminator is not limited to four, but can be less or greater than four. The ring-shaped illuminator can be designed to have a suitable number of blocks depending on its observation use and the like. The illumination blocks 63a to 63d in the first lighting pattern can be lighted ON/OFF one after another in a predetermined light ON order (e.g., a clockwise order or a zigzag order). The light ON order of the illumination blocks 63a to 63d in the first lighting pattern can be stored as light ON order information in the memory 56. The first lighting pattern can be selectively applied only to the coaxial epi-illuminator 62, only to the ring-shaped illuminator 63, or to both the coaxial epi-illuminator 62 and the ring-shaped illuminator 63 depending on arrangements of the microscope lens 20 and the objective lens 25. In other words, if the first lighting pattern is applied only to the coaxial epi-illuminator 62, the illumination blocks of the coaxial epi-illuminator 62 are lighted ON/OFF one after another. If the first lighting pattern is applied only to the ring-shaped illuminator 63, the illumination blocks of the ring-shaped illuminator 63 are lighted ON/OFF one after another. If the first lighting pattern is applied to both the coaxial epi-illuminator 62 and the ring-shaped illuminator 63, the illumination blocks of the coaxial epi-illuminator 62 are lighted ON/OFF one after another, and the illumination blocks of the ring-shaped illuminator 63 are lighted ON/OFF one after another. For example, the ring-shaped light can be selected first in the first lighting pattern so that if an objective lens corresponding to both the coaxial light and the ring-shaped light is used as the objective lens 25 the ring-shaped illuminator 63 will be selected as a light for the first lighting pattern, and if an objective lens corresponding only to the coaxial light is used as the objective lens 25 the coaxial epi-illuminator 62 will be selected as a light for the first lighting pattern.

(Illumination Controller 66)

The illumination controller 66 selectively performs a first sequence and a second sequence to control illumination light. In the first sequence, the illuminator 60 is operated in the first lighting pattern. In addition, the display 70 will display a live image of the observation object that is irradiated with the first lighting pattern of light. The first sequence is also referred to as search lighting (discussed later). On the other hand, in the second sequence, the Illuminator 60 is operated in the second lighting pattern as at least one of the different illumination directions that is selected based on feature quantities of image data that are calculated correspondingly to the different illumination directions by a feature quantity calculator 88 as discussed later. In addition, the display 70 will display an image of the observation object that is irradiated with the second lighting pattern of light. As a result, a suitable illumination direction can be automatically selected, and an image captured in the suitable illumination direction will be displayed to allow users to easily recognize surface conditions of the observation object. For example, an image of the observation object is displayed in real time while the illuminator changes an illumination direction incident on the observation object whereby providing suitable observation environments for easy recognition of irregularities, a flaw, a dent or the like on a surface of the observation object. Therefore, users can avoid overlooking such irregularities, a flaw, a dent or the like.

In the case in which an observation FOV is moved along a field-of-view moving path (discussed later), the illumination controller 66 instructs the illuminator 60 to emit the first lighting pattern of light. In this case, because illumination directions can be automatically changed one after another during the movement of an observation FOV, users can observe surface conditions of the observation object under different illumination conditions. As a result, users can easily find a flaw, a chip, or the like. The illumination controller 66 can analyze image data including a plurality of images that are captured in their corresponding illumination directions and stored in a buffer memory 57, and will select at least one of the different illumination directions that most clearly shows such a flaw in its corresponding one of the images when the movement of an observation FOV is stopped by a field-of-view changer 5. The illuminator 60 then irradiates the observation object with the second lighting pattern of light in which the selected at least one of the different illumination directions is fixed. Consequently, a suitable image that allows users to most easily recognize such a flaw can be displayed when an observation FOV stops moving. Such a suitable image can provide a good observation for a flaw search.

The illuminator 60 shown in FIG. 1 includes the coaxial epi-illuminator 62 (see FIG. 3), which can irradiate the observation object WK with coaxial epi-illumination light, and the ring-shaped illuminator 63, which can irradiate the observation object WK with ring-shaped illumination light from its ring-shaped light source. The illuminators are connected to the control main unit 50 through a cable. The control main unit 50 includes a connector that connects the cable. The ring-shaped illuminator 63 can change between an entire ring-shaped illuminating function and an oblique illuminating function. To realize this change, a plurality of LEDs can be arranged in a ring shape as the ring-shaped illuminator 63. In this arrangement, the LEDs can be selectively lighted ON/OFF. Alternatively, a turret type mask that can partially cut off illumination light can be provided. It is noted that other suitable arrangement that can realize the change can be used. The illumination controller 66 controls illumination light and the change.

(Field-of-View Changer 5)

The magnified observation apparatus 100 includes the field-of-view changer (FOV changer) 5 that can move an observation FOV to be displayed on the display 70. The FOV changer 5 changes a relative position between the objective lens 25 and the stage 30 whereby moving a position of the optical axis AX of the objective lens 25 with respect to a mount surface of the stage 30. When a relative position between the objective lens 25 and the stage 30 is moved by the FOV changer 5, the display 70 will display an image that is captured in an updated observation FOV following the movement. In the embodiment shown in FIG. 1, an XY stage that can move the stage 30 in an XY plane is used for the FOV changer 5. It is noted that another FOV changer that can move the objective lens can be used instead of or in addition to the XY stage as the FOV changer in the disclosure. The FOV changer is only required to change a relative position between the objective lens and the stage as seen along the optical-axis side, in other words, to move an observation FOV in the XY plane.

The XY stage includes an electric stage-moving mechanism that can move the mount surface of the stage 30 in X and Y directions. The FOV changer 5 can further include a θ stage that can rotate the stage 30.

The stage 30 can be moved in a height direction (i.e., Z direction) by a lower stage lifter 35 in addition to the XY plane by the FOV changer 5.

Operations of the lower stage lifter 35 are now described. The control main unit 50 can provide a motor control circuit 36 with control data relating to control of a stepping motor 37 to change a relative distance between the stage 30 and the head 4, which includes the imaging optical unit 11 and the imaging device 12, in a direction of the optical axis (height in the direction of z in this embodiment). More specifically, the control main unit 50 can provide the motor control circuit 36 with control data that is required for control of the lower stage lifter 35 to control rotation of the stepping motor 37 whereby raising/lowering a height z (a position in the Z direction) of the stage 30. The stepping motor 37 generates a rotation signal in accordance with its rotation. The control main unit 50 can store a height z of the stage 30 as information about a relative distance between the stage 30 and the imaging optical unit 11 in the optical axis direction based on the rotation signal, which is provided through the motor control circuit 36. The stage 30 serves as an observation positioner that positions the observation object WK to provide a proper observation position.

In this embodiment, a relative distance between the stage 30 and the imaging optical unit 11 in the optical axis direction can be changed by changing not only a height of the stage 30 but also a height of the imaging optical unit, i.e., a height of the head 4. The head 4 is connected to the control main unit 50 through the cable 3. According to this connection, data that is acquired by the head 4 is transmitted to the control main unit 50 through the cable 3 so that the control main unit 50 can perform required processing. The stage can be arranged in a microscope main body. Alternatively, the stage can be arranged in a head that is separately formed from the microscope main body. An imaging unit that does not include the stage can be attached to the head. Such an imaging unit that does not include the stage can be attachable to an attachment stand and portable for users.

The imaging device 12 can electrically measure amounts of light that are received by pixels, which are arranged in two dimensions (x and y directions). An image of the observation object WK formed on the imaging device 12 is converted into electrical signals in accordance with amounts of light received by the pixels of the imaging device 12. The electrical signals are converted into digital data by an imaging-device control circuit 13. The control main unit 50 stores in the storage device 53 the digital data, which is converted by the imaging-device control circuit 13, as received light amount data D in combination with arrangement information (x, y) about the pixels as two-dimensional positional information on the observation object WK in a plane (x-y plane in FIG. 2) substantially perpendicular to the optical axis direction (z direction of in FIG. 2). In this specification, the plane substantially perpendicular to the optical axis direction is required not to strictly form an angle of 90 degrees with respect to the optical axis direction, but it refers to an observation plane that can be inclined from a plane strictly perpendicular to the optical axis direction within a certain range of angle that allows users to recognize an appearance of the observation object WK from the viewpoint of resolutions of the imaging optical unit and the imaging device 12.

Although the observation object WK has been illustratively described to be held on the stage 30 in the aforementioned embodiment, an arm that can hold an observation object WK on its end can be provided instead of the stage. Also, although the head 4 has been illustratively described to be attached to a camera attachment 43, it can be detachable to allow users to hold it in their hands at a desired position and a desired angle.

(Moving-Direction Input Device 55a)

The control group part 2 includes the operator device 55. The operator device 55 is an input device that is connected to the control main unit 50. The operator device 55 serves as a moving-direction input device 55a that receives user input indicating a moving direction of an observation FOV in the display 70. A moving direction of the FOV changer 5 is directed in accordance with the direction indicated by the input from the operator device 55. The operator device 55 can include a joy stick, a touchpad, a mouse, a keyboard (arrow keys or particular keys), or the like. In the case in which the joy stick 55b is used as the operator device 55, users can intuitively grasp a moving direction of an observation FOV when tilting the joy stick 55b. In addition, a movement speed can be specified in accordance with a tilt angle of the joy stick 55b with respect to an original, upright orientation.

The stage 30 can be moved in the XY plane in addition to in the height direction (i.e., Z direction), which corresponds to the lower stage lifter 35. More specifically, the movable XY stage, which is movable in the X and Y axial directions, is provided. In addition, the rotatable stage (θ stage), which can rotate the stage 30, can be provided.

Both the upper and lower Z lifters 16 and 35 have been illustratively described to be electrically driven in this embodiment. However, the upper and lower Z lifters are only required to acquire a relative distance between the focus position of the objective lens 25 and the stage 30, and are not necessarily electrically driven. For example, one of the upper and lower Z lifters can be manually driven.

The control main unit 50 includes the processor 80, the display controller 52, a storage device 53, the interface 54, an operator device 55, and the memory 56 as shown in the block diagram of FIG. 2. This magnified observation apparatus 100 can display on the display 70 an observation image that is captured by the imaging device 12, which electrically measure light that is guided through the imaging optical unit 11 and is reflected or passes through the observation object WK, which is held on the stage 30.

The storage device 53 serves as storage that stores image data to be displayed on the display 70 by the display controller 52 as still images or video. In addition, the storage device 53 can store image data and condition data associated with each other correspondingly to different observation objects. The image data is image data of a composite image that is generated by an image-processing part 84. The condition data includes information about one or more conditions when the composite image is generated.

The interface 54 is a connection part through which the control main unit 50 transmits/receives data to/from the head 4, lower stage lifter 35, and the like. The memory 56 is constructed of a RAM, ROM, or the like. The memory 56 includes the buffer memory 57, which can temporarily store image data that is acquired correspondingly to images that are captured in different illumination directions one after another by the camera 10 during movement by the FOV changer 5. The operator device 55 also serves to specify image-capture conditions for capturing an image by using the camera 10, and other required settings and operations.

The buffer memory 57 temporarily stores image data correspondingly to a plurality of images that are captured in the different illumination directions to be displayed on the display 70 in the first sequence. Because image data that is temporarily stored in the buffer memory 57 while it is moved from one place to another (buffered) will be used to determine a suitable illumination direction, the image data is assigned to or associated with its corresponding illumination directions. The buffer memory 57 is required to have only a capacity corresponding to one cycle. Image data corresponding to one cycle can be overwritten with image data corresponding to the following cycle. In this specification, one cycle refers to a cycle period in which different illumination operations that are included in the first lighting pattern are executed one after another. The different illumination operations, which are included in the first lighting pattern, are executed at least one time in one cycle. That is, image data that is temporarily stored in the buffer memory 57 during one or more cycles is sufficient to select from the different illumination directions.

The feature quantity calculator 88 is configured to calculate, if the buffer memory 57 stores image data of images to be displayed correspondingly to the different illumination directions, feature quantities of the image data stored in the area, which is specified through an area specifier, correspondingly to the different illumination directions in the first lighting pattern, in response to the area specification through the area specifier. The illumination controller then selects at least one illumination direction from the different illumination directions and switches from the first sequence to the second sequence. The feature quantities can include variances of subject brightness values of image data, contrast values, and the like. Because image data of images is stored in the buffer memory 57 while the illuminator changes between the illumination directions one after another, a suitable illumination direction can be selected based on the image data, which has been stored, when a user specifies a desired area. As a result, such a suitable illumination direction can be quickly selected without causing the user to wait for a new image capture. When a desired area is specified through the area specifier, if image data of images that has been stored in the buffer memory 57 includes less than one cycle amount of data or no data, the first sequence will be kept until the buffer memory 57 stores image data corresponding to one cycle. After the buffer memory 57 stores image data corresponding to one cycle, the feature quantity calculator 88 will calculate feature quantities of the image data that has been stored in the buffer memory 57 of images in the area specified. At least one of the illumination directions will be then selected, and the sequence will go from the first sequence to the second sequence.

(Display Controller 52)

The display controller 52 provides image data that is generated by the camera 10 to the display 70. The display 70 can display an image resented by image data corresponding to an observation FOV that is provided by the display controller 52. This display controller 52 can be constructed of a GPU, and the like. In the embodiment shown FIG. 2, the display controller 52 is constructed separately from the processor. This exemplary display controller 52 is constructed of a GPU. It is noted that the display controller 52 in the present disclosure is not limited to such a GPU but can be incorporated into the processor. For example, a CPU or MPU that forms the processor can include the display controller 52.

(Processor 80)

The processor 80 realizes functions of a movement controller 83, the image-processing part 84, a focusing controller 90, a height information acquirer 89, the feature quantity calculator 88, a determiner 97, a single-shot composer 98, and the like. The movement controller 83 controls movement of the FOV changer 5 in accordance with the direction of movement provided by the moving direction input device 55a. The focusing controller 90 controls the focusing device and adjusts image focus. For example, the focusing controller 90 can control auto-focusing of the focusing device in which the focusing device automatically focuses (performs auto-focusing). The focusing controller 90 realizes functions of an in-focus degree evaluator, a frame skipper 92, a movement/rest detector 94, a focus sequence executor 93, and the like. The in-focus degree evaluator 91 calculates in-focus degree feature quantities, which represent in-focus degrees of image data corresponding to images to be displayed by the display controller 52 on the display 70.

In the case in which the focusing device moves at least one of the objective lens and the observation object toward or away from each other in the optical axis direction, the frame skipper 92 will direct the display controller 52 to skip updating of a live image on the display 70 based on comparison between in-focus degree feature quantities of image data, which are successively calculated by the in-focus degree evaluator 91, corresponding to images before and after the movement by the focusing device. As a result, in the case in which the focusing device achieves focus, only if the image after the movement has an improved in-focus degree feature quantity, an image on the display 70 will be updated.

In the case in which the focusing device focuses an image, if one of in-focus degree feature quantities, which are successively calculated by the in-focus degree evaluator 91, of image data corresponding to an image after the movement by the focusing device becomes worse than an in-focus degree feature quantity of image data corresponding to an image that is displayed on the display 70 before the movement, the frame skipper 92 will not update an image on the display 70. As a result, users can be free from stress that is caused by temporarily misfocused images, which are displayed in conventional magnified observation apparatuses, in auto-focusing. Consequently, stress-free focus adjustment can be achieved.

In this specification, the in-focus degree feature quantities are indices representing in-focus degrees of images, and can include known parameter such as a focus value or a phase difference. For example, a focus value such as a contrast calculated based on an image data can be used. In this case, during image focusing of the focusing device, the frame skipper 92 will update an image on the display 70 based on comparison between focus values of image data, which are successively calculated by the in-focus degree evaluator 91, corresponding to images before and after the movement by the focusing device (e.g., a lifter mechanism). As a result, the focusing device can perform auto-focusing based on focus values such as contrasts that are acquired from image data without a dedicated sensor.

To use a phase difference as the in-focus degree feature quantity, an auto-focusing sensor that can detect a difference between an in-focus position and the current position is arranged. In the case in which the focusing device focuses an image, during image focusing of the focusing device, phase differences are successively measured by the auto-focusing sensor. In comparison between the in-focus position and the current position, if a measurement value of an image after the movement by the focusing device is improved relative to a measurement value corresponding to an image that is displayed on the display 70 before the movement, the display controller 52 updates an image on the display 70. Because the auto-focusing sensor will not require movement in the Z direction, high-speed auto-focusing can be achieved.

During movement of an observation FOV by the FOV changer 5, the focus sequence executor 93 can execute an FOV-moving focus sequence in which the focusing device adjusts a relative distance between a focus position of the optical imaging group part (e.g., objective lens 25) and the observation object WK in accordance with information about an XY position of the observation FOV. A live image of the observation object will be displayed on the display 70 based on image data obtained in the FOV-moving focus sequence by the display controller 52.

The movement/rest detector 94 can detect a start and stop of movement of an observation FOV. When the movement/rest detector 94 detects movement of an observation FOV, the FOV-moving focus sequence can be performed to adjust by using the focusing device a relative distance between a focus position of the optical imaging group part (e.g., objective lens 25) and the observation object WK in accordance with at least one of image data of an image that is captured by the camera 10 during the movement of an observation FOV and information about an XY position of an observation FOV. A live image of the observation object can be displayed on the display 70 by the display controller 52 based on the image data of an image that is captured by the camera 10 during movement of an observation FOV. When the movement/rest detector 94 detects a stop of movement of an observation FOV (detects that an observation FOV to brought to rest), the FOV-moving focus sequence will be ended, and an FOV-resting sequence is performed to cause the focusing device to stop adjustment of a relative distance between a focus position of the optical imaging group part (e.g., objective lens 25) and the observation object WK. Consequently, image focus adjustment can be performed even during movement of an observation FOV. Such an FOV-moving focus sequence cannot be performed by conventional magnified observation apparatuses.

The movement/rest detector 94 can be constructed of one detector that can detect a start and a stop of movement of an observation FOV, in other words, can detect moving and resting of an observation FOV. Alternatively, the movement/rest detector can include detectors that can separately detect a start and stop of movement of an observation FOV.

In the case in which the illumination controller 66 performs the first sequence, the illumination controller 66 will direct the illuminator 60 to operate in the first lighting pattern when the FOV-moving focus sequence is performed. In the FOV-moving focus sequence, a relative distance between a focus position of the optical imaging group part (e.g., objective lens 25) and the observation object WK is adjusted in accordance with information about an XY position of an observation FOV. The FOV-moving focus sequence will be ended, and the FOV-resting sequence will be performed when the movement/rest detector 94 detects a stop of movement of an observation FOV. In the FOV-resting sequence, for example, if the focusing device performs auto-focusing, the illumination controller will temporarily switch the illuminator 60 into an entire illumination pattern in which all of the illumination blocks of the coaxial epi-illuminator 62, the ring-shaped-illuminator 63, or the like are lighted ON. After the focusing device completes the automatic focusing, the illumination controller will direct the illuminator 60 to operate in the first lighting pattern again. If the movement/rest detector 94 then detects a start of movement of an observation FOV, the focus sequence executor 93 performs the FOV-moving focus sequence while the illumination controller 66 instructs the illuminator 60 to keep operating in the first lighting pattern.

The image-processing part 84 realizes a function that composes an image from a plurality of images (composite image mode). For example, in the case in which an image of an observation object is captured with a low depth of field, images of the observation object are captured with different focus positions so that in-focus parts of the images are selected in accordance with focus information and composed to generate a composite image that is captured as if with a high depth of field (DOF composite image). Also, improved high resolution images, which are captured by using a so-called super-resolution technology, or high dynamic range images can be obtained. Composite images that can be generated by the image-processing part 84 can include a DOF composite image, a 3D composite image, a pixel shift multi shot image, a super-resolution image, an HDR image, and the like. The image-processing part 84 can further have a function that measures an observation object. For example, a measurement tool that includes buttons for their corresponding measurement operations can be displayed on an image. A desired measurement operation can be performed by operating its corresponding button to measure an observation object in the image displayed.

In the first sequence performed by the illumination controller 66, the illuminator 60 operates in the first lighting pattern, and a live image that is irradiated with the first lighting pattern of light is displayed. In the second sequence, the Illuminator 60 operates in the second lighting pattern in which at least one of the illumination directions is selected based on feature quantities of image data, which are calculated by the feature quantity calculator 88, corresponding to images that are captured when an observation object is irradiated with their corresponding illumination directions so that the image-processing part 84 realizes a function that composes an image from a plurality of images (composite image mode). In addition, the display 70 will display such a composite image (e.g., a DOF composite image, a 3D composite image, a pixel shift multi shot image, a super-resolution image, and an HDR image) of the observation object that is irradiated with the second lighting pattern of light.

A switch from the first sequence to the second sequence can be triggered by an execution instruction of the composite image mode or specification of an ROI through the area specifier.

The height information acquirer 89 acquires height information of the observation object WK at different XY positions as three-dimensional reference information, more specifically, height image data of the observation object WK, for example. In the case in which the FOV changer 5 moves an observation FOV to be displayed on the display 70 by the display controller 52, focus positions are adjusted by adjustment of the focusing device in accordance with height information of an XY position to be moved corresponding to an observation position in a next FOV moving step (a next observation position) in the three-dimensional reference information, which is acquired by the height information acquirer 89. In this specification, height information represents positions of an observation object in the Z direction with respect to the mount surface of the stage 30. Because height image data that is three dimensional information of the observation object WK has been previously acquired, image focus adjustment can be performed in accordance with the height information of the height image data so that focused image can be displayed on the display 70 even during movement of an observation FOV. For example, the height information acquirer 89 acquires height information corresponding to XY positions of the observation object WK as three-dimensional reference information relating to image data of a wide area image that is captured together with its three dimensional information through a low power objective lens section of the objective lens 25. For example, the height information acquirer 89 can acquire height information corresponding to XY positions of the observation object WK as three-dimensional reference information relating to wide area image data of an image that has been previously captured as a navigation image (discussed later) together with its three dimensional information. If a part of the observation object WK that is not associated with its height information, which is acquired by the height information acquirer 89, (height-information absent part) is displayed, the focusing device will perform image focus adjustment in accordance with height information that is estimated based on height information of a peripheral part in proximity to the height-information absent part, which is not associated with its height information. In the case in which movement of the mounting surface of the stage 30 is not necessarily taken into consideration, for example, in the case in which the mount surface of the stage 30 is fixed, height information does not necessarily represent a position in the z direction with respect to the mount surface of the stage 30 but can represent a position in a z direction in an apparatus-based coordinate system with reference to the magnified observation apparatus.

A moving direction by the focusing device can be determined in accordance with in-focus degree feature quantity change based on image data corresponding to images that are captured during movement by the FOV changer of an observation FOV. In this case, a focused image can be displayed on the display during movement by the FOV changer of an observation FOV.

Also, a geometric shape of an observation object can be selectively estimated from predetermined geometric shapes based on measurements of the observation object so that target height values can be determined based on an XY position of the observation object corresponding to a next observation position and the information as the geometric shape selectively estimated so that the focusing device moves at least one of the objective lens and the observation object in accordance with the target height values. The predetermined geometric shapes can include a flat surface, a spherical surface, a cylindrical shape, a conical shape, a parabolic shape, and the like.

In the case in which the first sequence is performed by the illumination controller 66, if the focusing device focuses based on a geometric shape selectively estimated from the predetermined geometric shapes in the FOV-moving focus sequence, the illuminator 60 will be operated in the first lighting pattern, and focus positions are adjusted based on height information of the observation object WK at XY positions, which has been previously measured and the geometric shape selectively estimated (e.g., plane shape). When the movement/rest detector 94 detects a stop of movement of an observation FOV, the FOV-moving focus sequence is ended, and the FOV-resting sequence is performed. In the FOV-resting sequence, measurement of height information of the observation object WK and auto-focusing are performed, the illumination controller will temporarily switch the illuminator 60 into an entire illumination pattern in which all of the illumination blocks of the coaxial epi-illuminator 62, the ring-shaped illuminator 63, or the like are lighted ON. After the measurement of height information and the auto-focusing are completed, the illumination controller will direct the illuminator 60 to operate in the first lighting pattern again. Three-dimensional reference information will be updated based on height information that is newly measured. If the movement/rest detector 94 then detects a start of movement of an observation FOV, the focus sequence executor 93 performs the FOV-moving focus sequence while the illumination controller 66 instructs the illuminator 60 to keep operating in the first lighting pattern.

The sequence can go to the FOV-resting sequence when the FOV changer 5 stops movement of an observation FOV. In the FOV-resting sequence, the focusing device autonomously starts auto-focusing. Also, the focusing device can be configured to immediately stop auto-focusing when receiving an auto-focusing stop instruction. For example, in the case in which auto-focusing is performed, when the FOV changer restarts moving an observation FOV, the auto-focusing can stop, and the FOV-moving focus sequence is executed. In this case, if this FOV-moving focus sequence is performed to adjust by using the focusing device a relative distance between a focus position of the optical imaging group part (e.g., objective lens 25) and the observation object WK in accordance with image data of an image that is captured by the camera 10 during the movement of an observation FOV, the focusing device can adjust a relative distance between a focus position of the optical imaging group part (e.g., objective lens 25) and the observation object WK to a relative distance corresponding to the maximum focus value that has been obtained in the auto-focusing stopping. If this FOV-moving focus sequence is performed to adjust by using the focusing device a relative distance between a focus position of the optical imaging group part (e.g., objective lens 25) and the observation object WK in accordance with height information of an XY position corresponding to a next observation position in the three-dimensional reference information, which is acquired by the height information acquirer 89, the focusing device can adjust a relative distance between a focus position of the optical imaging group part (e.g., objective lens 25) and the observation object WK to a relative distance corresponding to the height information of XY positions corresponding to the field of view to be moved in the three-dimensional reference information. Consequently, users can keep observing the observation object WK on an image focused to the extent possible even after auto-focusing stops.

The determiner 97 determines during movement by the FOV changer 5 of an observation FOV that is displayed on the display 70 by the display controller 52 whether to allow change of a relative distance between the focus position of the objective lens 25 and the observation object beyond a predetermined condition by the focusing device based on height information of a next observation position in the three-dimensional reference information, which is acquired by the height information acquirer 89. The single-shot composer 98 automatically specifies upper and lower height limits in accordance with height information corresponding to an image of an observation object that is displayed in an observation FOV, and composes images corresponding to heights from the upper and lower height limits to obtain a DOF composite image.

The processor 80 can be constructed of a general-purpose CPU or MPU, an SoC, an ASIC (application specific integrated circuit), or a gate array such as an FPGA. Although the processor has been illustratively described to be constructed of a single CPU that realizes a plurality of functions described later in this embodiment, the processor in the present disclosure is not limited to such a single CPU but can be constructed of two or more CPUs. Such two or more CPUs include not only two or more physically separated CPUs but also a so-called MPU, which includes two or more CPU cores in a single package. In the case of such two or more CPUs, two or more physically separated CPUs or CPU cores can realize the plurality of functions. Alternatively, the plurality of functions can be assigned to two or more physically separated CPUs or CPU cores one by one. Also, the processor can be constructed of a CPU and a GPU. In this case, the GPU can realize functions of the aforementioned display controller 52, and some or all of functions that are assigned to the processor.

(Navigation Image Reading Function)

The magnified observation apparatus according to this embodiment has a navigation image reading function to read a wide area image to help users to find a target part to be observed of an observation object. The navigation image reading function previously captures a wide area image of an observation object through the low power objective lens section of the objective lens 25 to show the wide area image separately from the current observation FOV, for example, in a navigation window. If a user clicks a desired position on the navigation window, the XY stage will be moved to the position. The navigation image reading function is now described with reference to a user interface screen of the magnified observation program shown in FIG. 5. The illustrated navigation image reading screen 230 includes an image display area 231, an operator area 232, and a navigation area 233. The image display area 231 displays the image. The operator area 232 displays operator buttons, text information, and the like. The navigation area 233 displays a navigation image NI, which is a wide area image.

Figure 5:
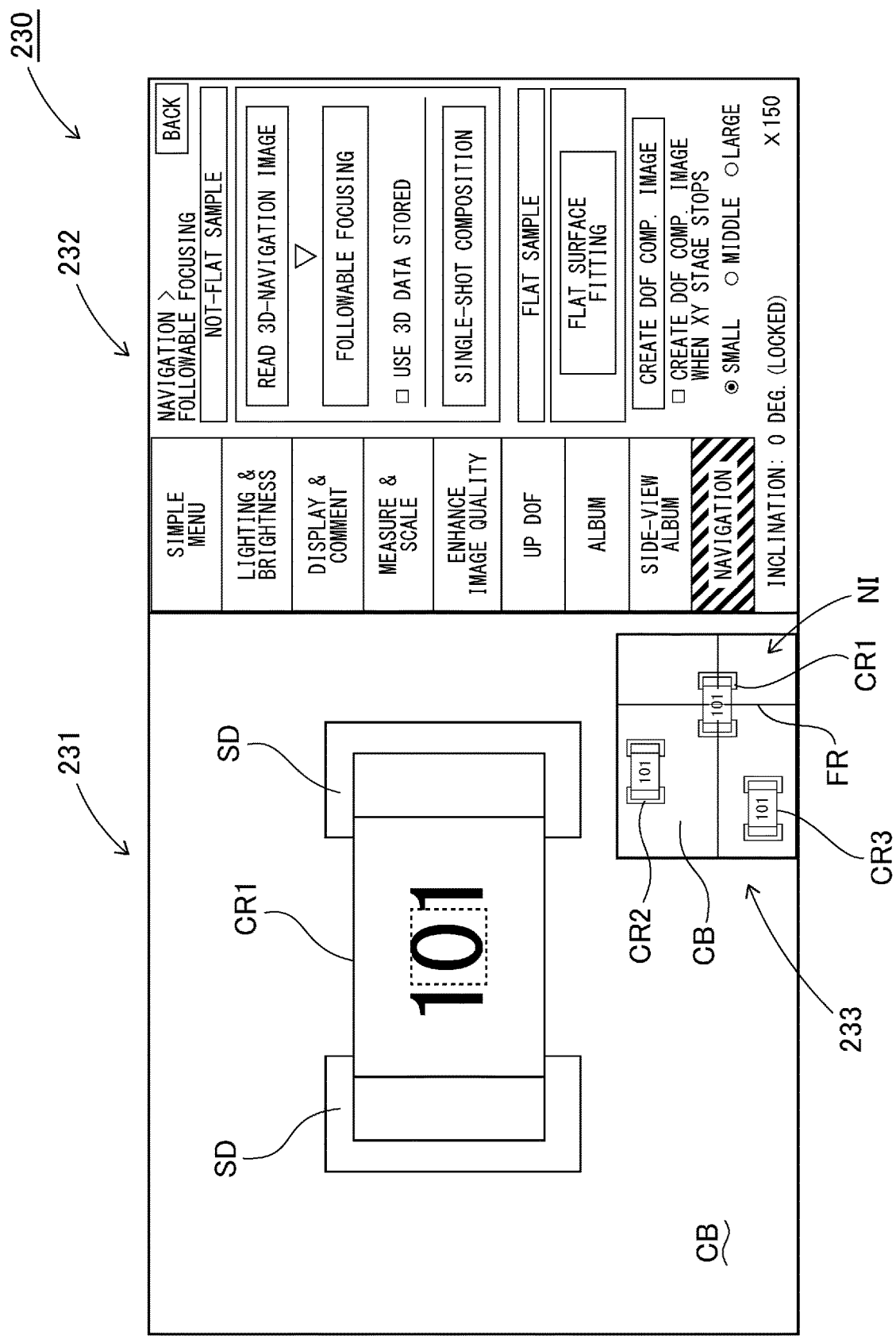
FIG. 5 is a schematic diagram showing a user interface screen of a magnified observation program including a navigation area.
Figure 6:
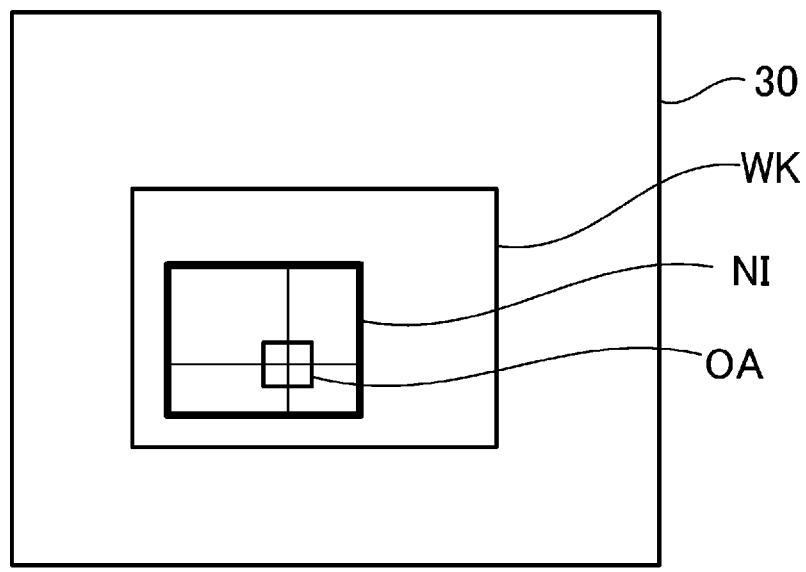
FIG. 6 is a schematic diagram showing a relation of a stage, an object to be object, a navigation image, and an observation field of view.

A positional part of the current observation FOV that is displayed in the image display area 231 is shown by a box FR in the navigation image NI, which is displayed in the navigation area 233. Such a positional part of the current observation FOV that is displayed in the image display area 231 is not limited to be shown by the box FR but can be shown by a cross point in the navigation image NI in the navigation area 233 at which two lines intersect each other. In this case, the cross point in the navigation image NI represented by the two line, which intersects each other, indicates a center of the current observation FOV in the image display area 231. The box FR or cross point lets users to know where the current observation FOV is located relative to an observation object. In FIG. 5, chip resistors CR1 to CR3, which are soldered on a board, are displayed in the navigation image NI, and a center of the chip resistor CR1 is positioned at the center of the observation FOV. If the XY stage is moved to move an observation FOV to be displayed in the image display area 231, the box FR will correspondingly move to a new positional part in the navigation area 233. If a user specifies a desired position through a mouse cursor or the like in the navigation area 233, the XY stage will be correspondingly moved to the position. The navigation image NI preferably displays a wide area of an observation object but does not necessarily display the entire of the observation object. A relation of the stage 30, the object to be object WK, a navigation image, and an observation FOV OA is shown in FIG. 6.

(3D-Navigation Image Reading Function)

The magnified observation apparatus according to this embodiment has a 3D-navigation image reading function that reads a wide area image in combination with height information. The 3D-navigation image reading function can be included in the navigation image reading function. That is, when a wide area image is read as a navigation image, height information can be associated to the navigation image to obtain such a 3D-navigation image.

Figure 7:
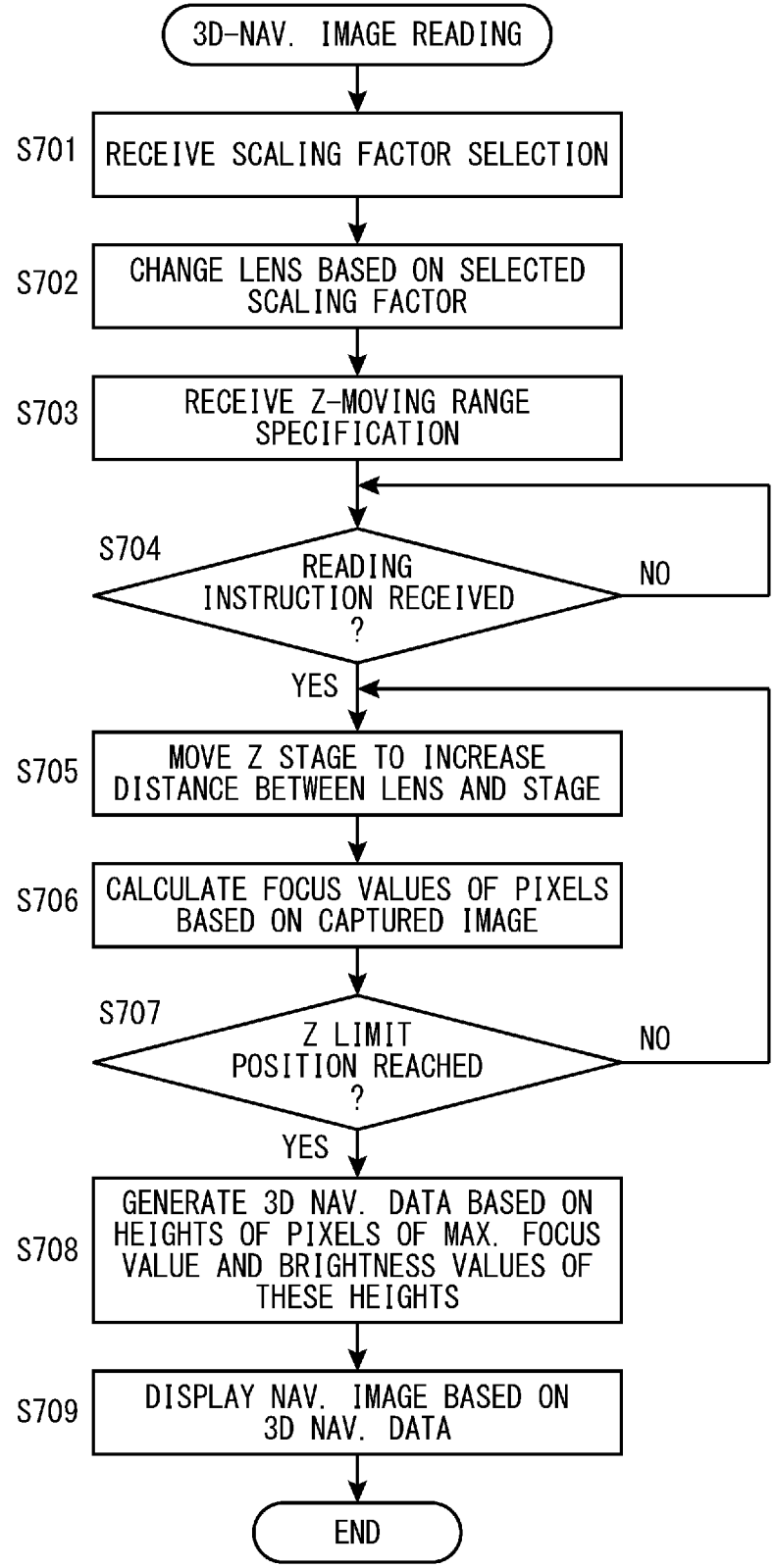
FIG. 7 is a flowchart showing a procedure of a 3D-navigation image reading function.
Figure 8:
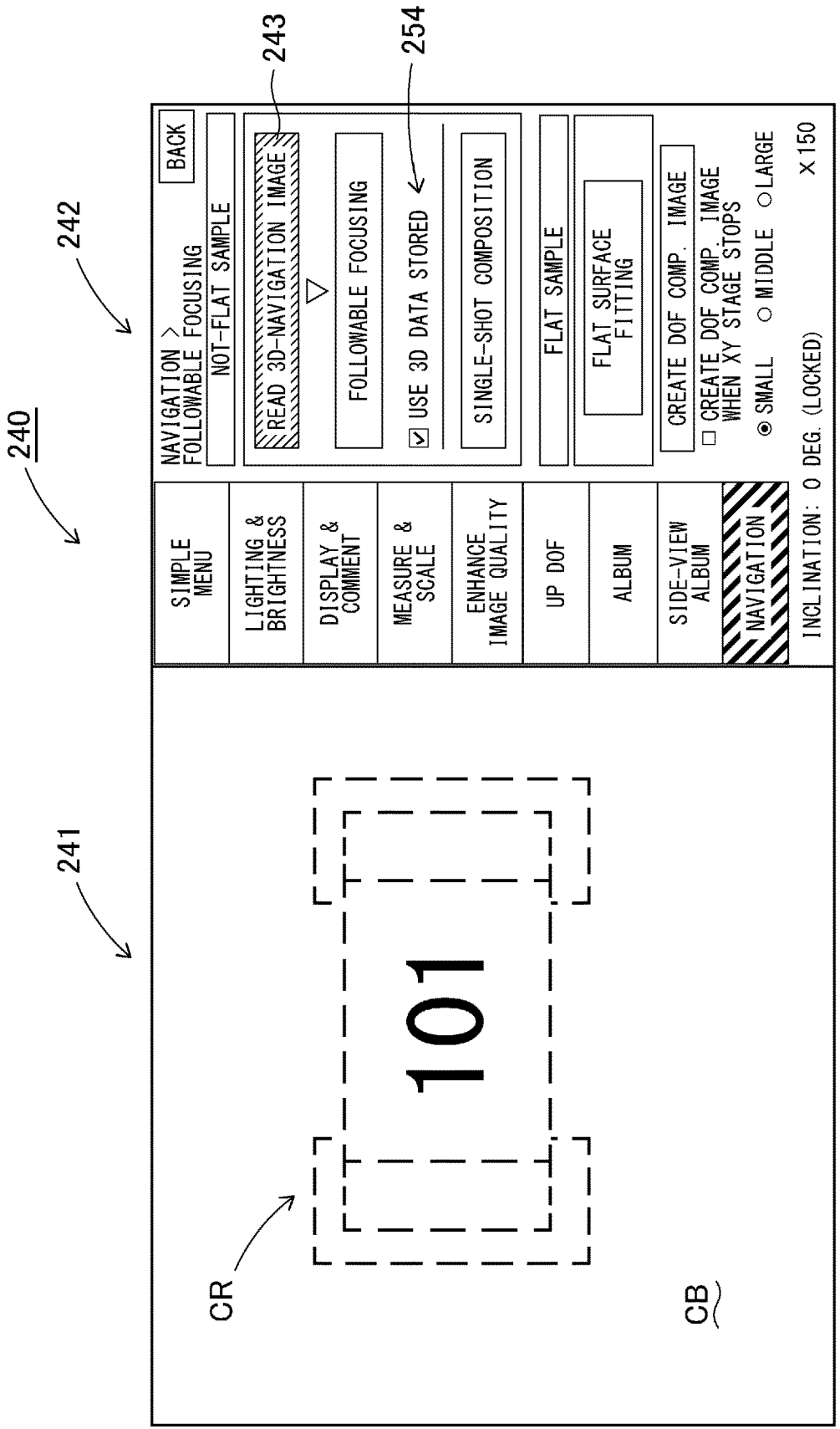
FIG. 8 is a schematic diagram showing a 3D-navigation image reading screen.
Figure 9:
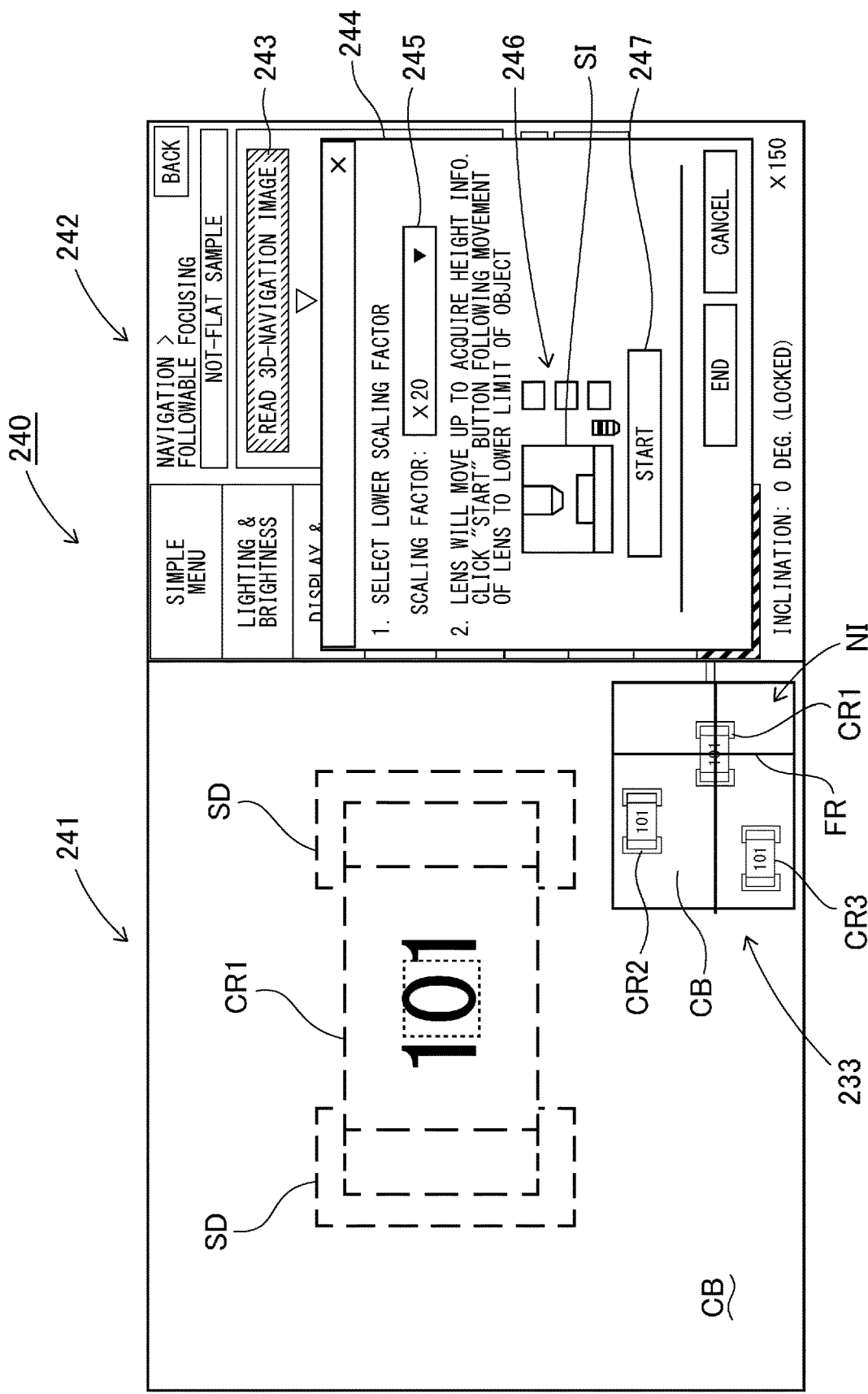
FIG. 9 is a schematic diagram showing another 3D-navigation image reading screen.
Figure 10:
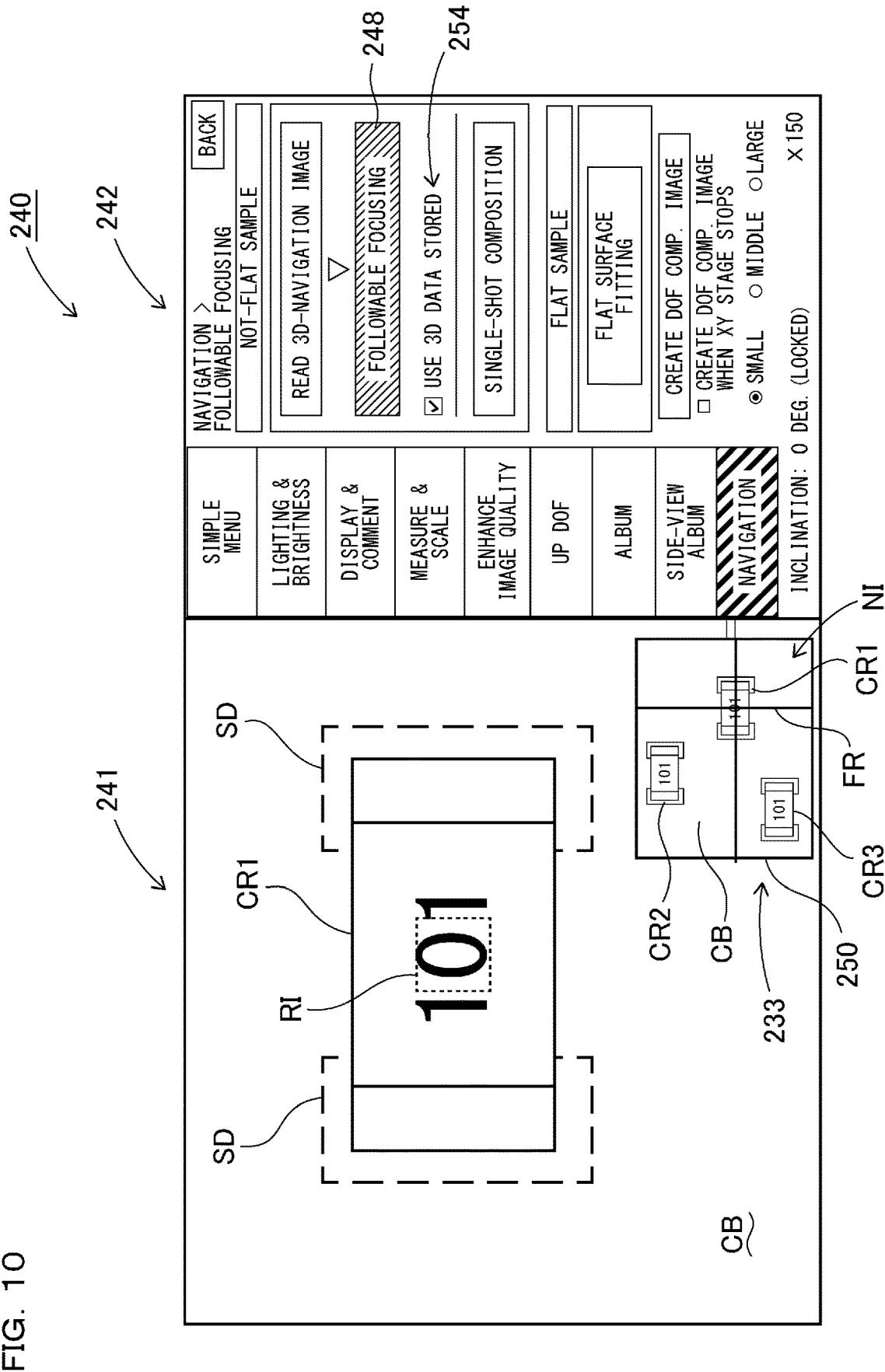
FIG. 10 is a schematic diagram showing another 3D-navigation image reading screen.

A procedure of the 3D-navigation image reading function that reads a wide area image in combination with height information corresponding to pixels is now described with reference to a flowchart of FIG. 7, and user interface screens in FIGS. 8 to 10. A user presses a "Read 3D-Navigation Image" button 243, which is arranged in an operator area 242, in a 3D-navigation image reading screen 240 shown in FIG. 8 so that the 3D-navigation image reading function starts. In this exemplary screen, a misfocused image is first displayed in the image display area 241. In FIGS. 8 to 10, a chip resistor CR, which is mounted directly onto a surface of a board (surface-mount), is displayed as exemplary images of an observation object in the image display area 241. Dashed lines represent misfocused parts of the chip resistor CR.

Subsequently, user input that selects a scaling factor of the objective lens 25 is received in Step S701. In this step, a low power imaging window 244 is popped up as shown in FIG. 9 if the user presses "Read 3D-Navigation Image" button 243 in the 3D-navigation image reading screen 240 shown in FIG. 8. The user can specify navigation image reading conditions such as a scaling factor and focus adjustment through this screen. A scaling factor drop-down list box 245 and a focus adjustment area 246 are provided in the low power imaging window 244. The user can physically change the objective lens 25 to a low power objective lens section of the objective lens 25 that is suitable to capture a wide area image. The magnified observation apparatus can show the user a predetermined low power objective lens section of the objective lens 25 as the default. Subsequently, the objective lens 25 is changed to the scaling factor that is selected by the user in Step S702.

Subsequently, user input that specifies a Z-direction moving range is received in Step S703. The user previously moves the stage 30 or the objective lens 25 to an observation FOV corresponding to a wide area image to be captured in this embodiment. The low power imaging window 244 urges the user to move the stage 30 or the objective lens 25 to a lower limit position. In this specification, the lower limit position refers to a position at which a relative distance between the objective lens 25 and the observation object is the smallest in the Z-direction moving range, or corresponds to the smallest height information value. Also, an upper limit position refers to a position at which a relative distance between the objective lens 25 and the observation object is the greatest in the Z-direction moving range, or corresponds to the greatest height information value. A move button that moves the stage 30 or the objective lens 25 to the lower limit position to acquire height information can be provided in the focus adjustment area 246 in the low power imaging window 244 shown in FIG. 9. In addition, a side camera image SI that is captured by a side camera (discussed later) can be displayed in the focus adjustment area 246. The side camera image SI allows the user to easily adjust movement of the objective lens to the lower limit position without contact of the objective lens with the observation object before acquisition of height information. In this case, when the user specifies a Z-direction moving range, the lower limit position can be specified by adjusting a relative distance between the objective lens 25 and the observation object by moving the objective lens to an lower limit position that is actually moved by the user. Alternatively, the user can specify a lower limit position through the side camera image SI. When the user specifies a Z-direction moving range, an upper limit position can be specified through the focus adjustment area 246. In the exemplary screen shown in FIG. 9, an upper limit position can be selected from three levels (high, mid, and low), which are assigned to three buttons. The low level is initially selected as the default. Specification of an upper limit position is not limited to the selection. For example, the user can specify an upper limit position through the side camera image SI.

Subsequently, a direction to execute the 3D-navigation image reading function is received in Step S704. If the direction is not received, the procedure repeats Step S704. If the user presses a start button 247 in the low power imaging window 244 shown in FIG. 9, and executes the 3D-navigation image reading function, the Z stage is moved to increase a relative distance between the objective lens 25 and the stage 30 in Step S705. Subsequently, an image is captured, and focus values of pixels are calculated based on the image captured in Step S706. Also, a height position can be acquired at the time when the image is captured in this step. For example, linear encoders can be used to acquire a height position with respect to the mount surface of the stage 30. The linear encoders are attached to the upper and lower Z lifters 16 and 35 (e.g., upper and lower Z stages) along with the Z direction to acquire Z-direction positional information. The height position with respect to the mount surface of the stage 30 at the time when the image is captured can be acquired in accordance with the Z-direction positional information. Subsequently, it is determined whether the height position reaches the upper limit position of the Z-direction moving range in Step S707. If not, the procedure returns to Step S705 and repeats this routine. If the height position reaches the upper limit position of the Z-direction moving range, 3D navigation data is generated based on height positions corresponding to the maximum focus values of pixels and subject brightness values of pixels corresponding to the height positions in Step S708. The 3D navigation data is stored as a 3D-navigation image. The 3D-navigation image is a wide area image that indicates a position of an observation FOV that is currently displayed in the image display area 241. Pixels of the 3D-navigation image are represented at their corresponding XY positions in the navigation area 250. Because the 3D-navigation image includes height positions corresponding to pixels, it can be used as the three-dimensional reference information. Finally, a navigation image is displayed on the display 70 based on 3D navigation data in Step S709, and the procedure of the 3D-navigation image reading function ends. Cross lines, which intersect each other and indicate a cross point, can be shown on the navigation image displayed in the navigation area 250 as shown with FIG. 10. In this case, the cross point in the navigation image represented by the two line, which intersects each other, indicates a center of the current observation FOV in the image display area 241. The cross point lets users to know where the current observation FOV is located relative to an observation object. Immediately after the procedure of the 3D-navigation image reading function ends, a correctly focused image will be displayed on the display 70 as shown in FIG. 10. At this time, the image is focused in accordance with focus values in an area RI, which is shown by a dashed line box, in a central part of the image display area 241. In this case, the chip resistor CR is positioned in the area RI, which is shown by a dashed line box, in a central part of the image display area 241. As a result, a surface of the chip resistor CR is in focus, but lands on a board CB are out of focus in the exemplary user interface screens shown in FIG. 10. Image data of an image that is captured by a low power objective lens section of the objective lens 25 has been illustratively described to be used for the 3D-navigation image. Image data used for the 3D-navigation image is not limited to this. For example, a wide area image corresponding to the navigation image can be generated by coupling pieces of data corresponding to a plurality of images. In this case, in order to generate the 3D-navigation image, pieces of height image data corresponding to images that are captured at their positions are generated so that the 3D-navigation image is generated by coupling the pieces of height image data. In order to more accurately acquire 3D data such as 3D navigation data, a distortion-correcting function that can obtain correct flatness can be added. Because each lens of the microscope lens 20 has curvatures, even if an image of a completely flat surface is captured through the lens, peripheral parts of the image in a field of view will be distorted, that is, peripheral parts of 3D navigation data will be distorted. To address the distortion, such distortion amounts in the 3D navigation data can be corrected by the distortion-correcting function. Also, upper and lower limit heights in a Z range of a DOF composite image can be automatically specified based on 3D navigation data that is stored when the DOF composite image is generated (described later). For example, in the case of an observation object WK shown in a schematic view of FIG. 36, in order to generate a DOF composite image of the observation object WK in an observation FOV, a height distribution in the observation FOV is calculated based on the 3D data so that upper and lower limit heights Zmax and Zmin of a Z range of the DOF composite image can be determined. Generation of such a DOF composite image is referred to as single-shot composition. The single-shot composition will be described in detail later.

(Auto-Focusing Device)

The magnified observation apparatus 100 has an auto-focusing function. More specifically, auto-focusing can be performed by the focusing device, which can change a relative distance between the focus position of the objective lens 25 and the stage 30 along the optical axis of the objective lens 25. Auto-focusing can be performed based on calculation of focus values from image data that is generated by the camera 10 or in accordance with a relative distance between the objective lens 25 and an observation object that is measured by an external ranging sensor. Known techniques such as contrast detection and phase detection can be used for auto-focusing. The magnified observation apparatus according to the first embodiment uses contrast detection.

Figure 11:
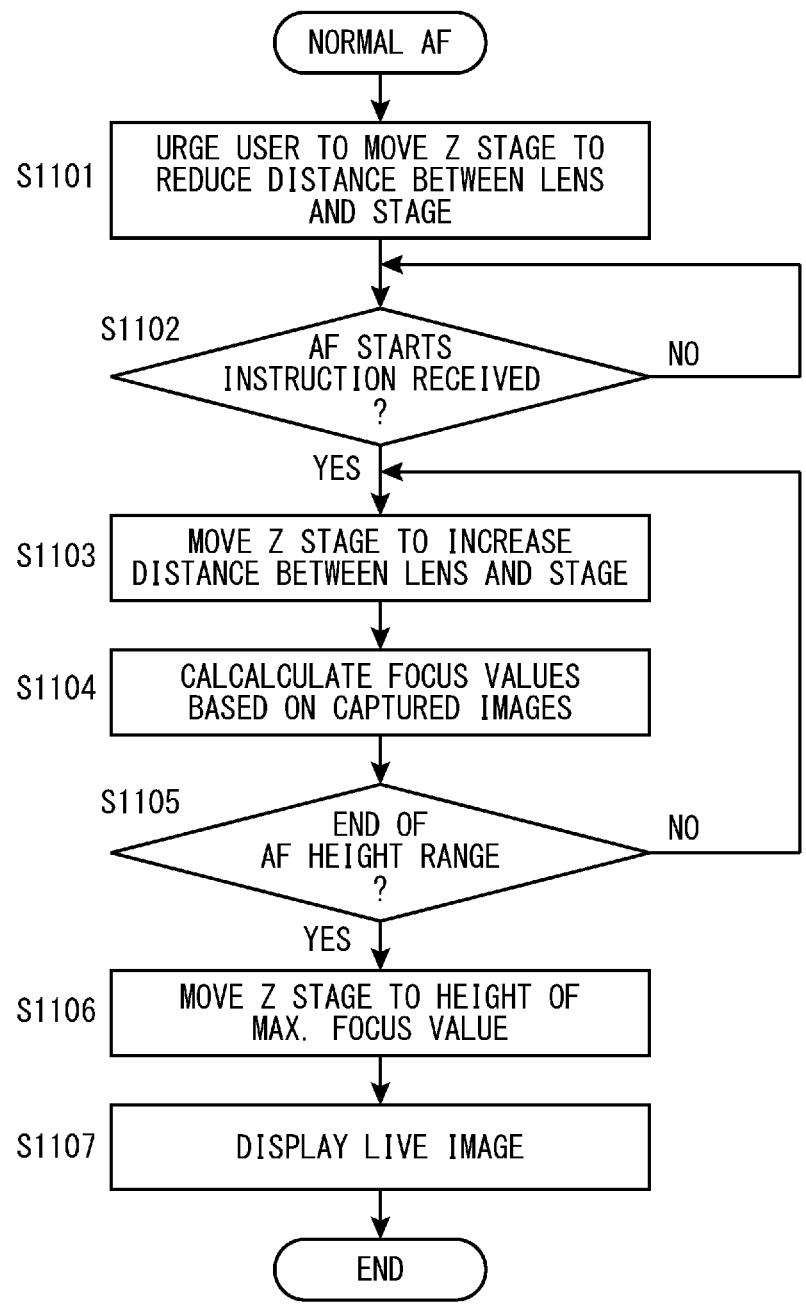
FIG. 11 is a flowchart showing a procedure of normal auto-focusing.

Auto-focusing in the magnified observation apparatus 100 is classified into normal auto-focusing and short range auto-focusing. In the normal auto-focusing, an in-focus position will be found within a normal height range. In the short range auto-focusing, an in-focus position will be found within a narrower range than the height range of the normal auto-focusing. The procedure of the normal auto-focusing is now described with reference to a flow chart of FIG. 11. In this embodiment, for example, a user first lowers the objective lens 25 so that the objective lens 25 is positioned close to an observation object on the mount surface of the stage 30, and the focusing device or the like then moves the Z stage to automatically find an in-focus position. The user is first urged to move the Z stage so that a relative distance between the objective lens 25 and the stage 30 becomes small in Step S1101. Subsequently, it is determined whether a direction to start auto-focusing is received in Step S1102. For example, it is determined whether the user presses an autofocus start button. If the direction to start auto-focusing is received, the procedure goes to Step S1103. If not, the procedure repeats Step S1102.

Subsequently, the focusing device or the like moves the Z stage in a direction that increases a relative distance between the objective lens 25 and the stage 30 in Step S1103. Subsequently, images are captured at a predetermined cycle during movement of the Z stage, and focus values are calculated based on the images captured in Step S1104. Subsequently, it is determined whether the Z stage is moved through the entire height range of normal auto-focusing in Step S1105. If not, the procedure returns to Step S1103 and repeats the routine. Subsequently, if the Z stage is moved through the entire height range of normal auto-focusing, the procedure goes to Step S1106 in which a height position corresponding to the maximum focus value is determined so that the focusing device or the like moves the Z stage to the height position corresponding to the maximum focus value. Finally, a live image is displayed on the display 70 in Step S1107. Consequently, the normal auto-focusing can be competed.

(Short Range Auto-Focusing)

Figure 12:
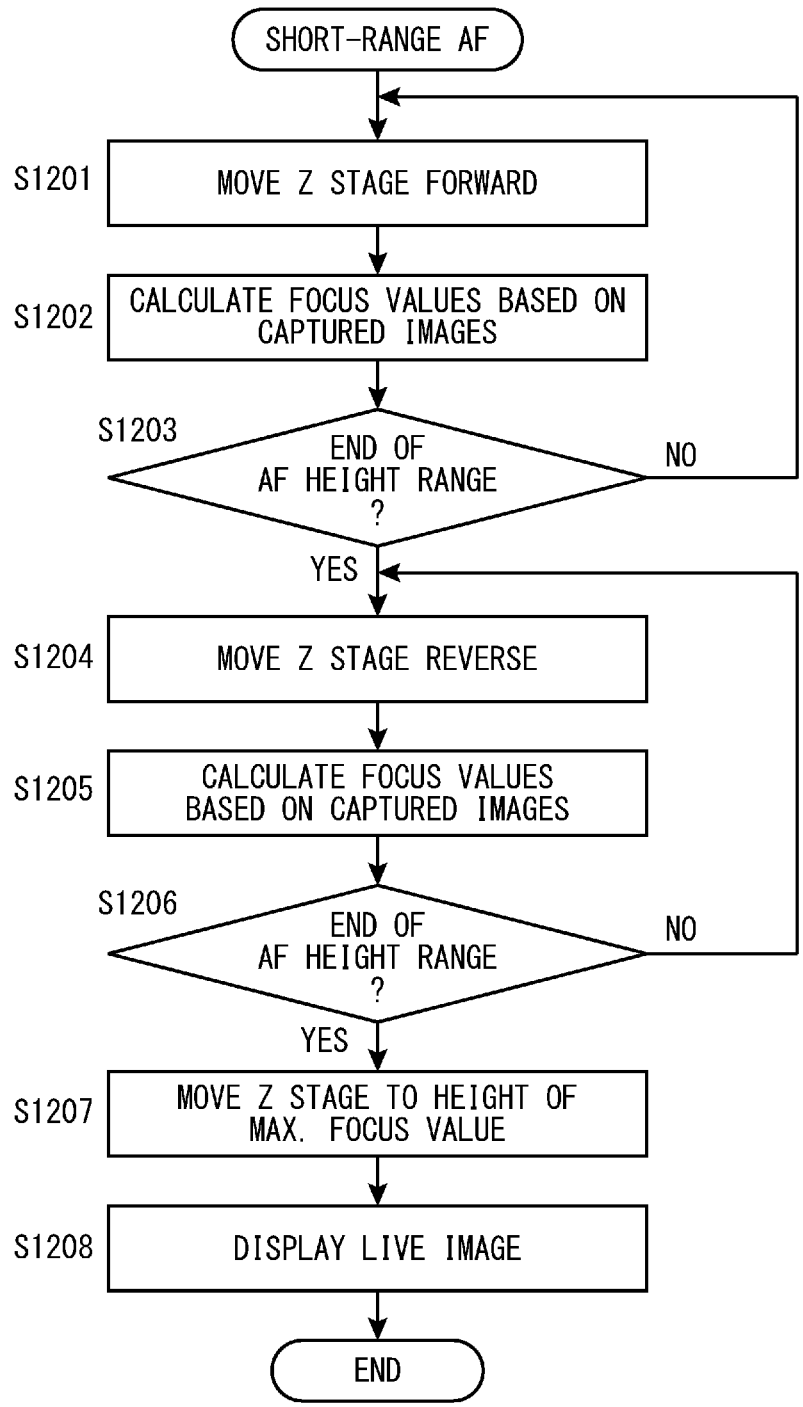
FIG. 12 is a flowchart showing a procedure of short range auto-focusing.

The procedure of the short range auto-focusing is now described with reference to a flow chart of FIG. 12. The short range auto-focusing is used to move the Z stage in a relatively narrower Z direction range to find an in-focus height position in the case in which an image is roughly focused. In the short range auto-focusing, height information can be more precisely measured by moving the Z stage by a narrower pitch. In Step S1201, the Z stage is first moved in a forward direction. Subsequently, images are captured at a predetermined cycle during movement of the Z stage, and focus values are calculated based on the image captured in Step S1202. Subsequently, it is determined whether the Z stage is moved through the entire height range of short range auto-focusing in Step S1203. If not, the procedure returns to Step S1201 and repeats the routine.

Subsequently, if the Z stage is moved through the entire height range of short range auto-focusing, the procedure goes to Step S1204 in which the Z stage is moved in the reverse direction, which is opposite to the forward direction. Subsequently, images are captured at a predetermined cycle during movement of the Z stage, and focus values are calculated based on the image captured in Step S1205. Subsequently, it is determined whether the Z stage is moved through the entire height range of short range auto-focusing in Step S1206. If not, the procedure returns to Step S1204 and repeats the routine.

Subsequently, if the Z stage is moved through the entire height range of short range auto-focusing, the procedure goes to Step S1207 in which a height position corresponding to the maximum focus value is determined so that the Z stage is moved to the height position corresponding to the maximum focus value. Finally, a live image is displayed on the display 70 in Step S1208. Consequently, the short range auto-focusing can be competed.

Second Embodiment

Figure 13:
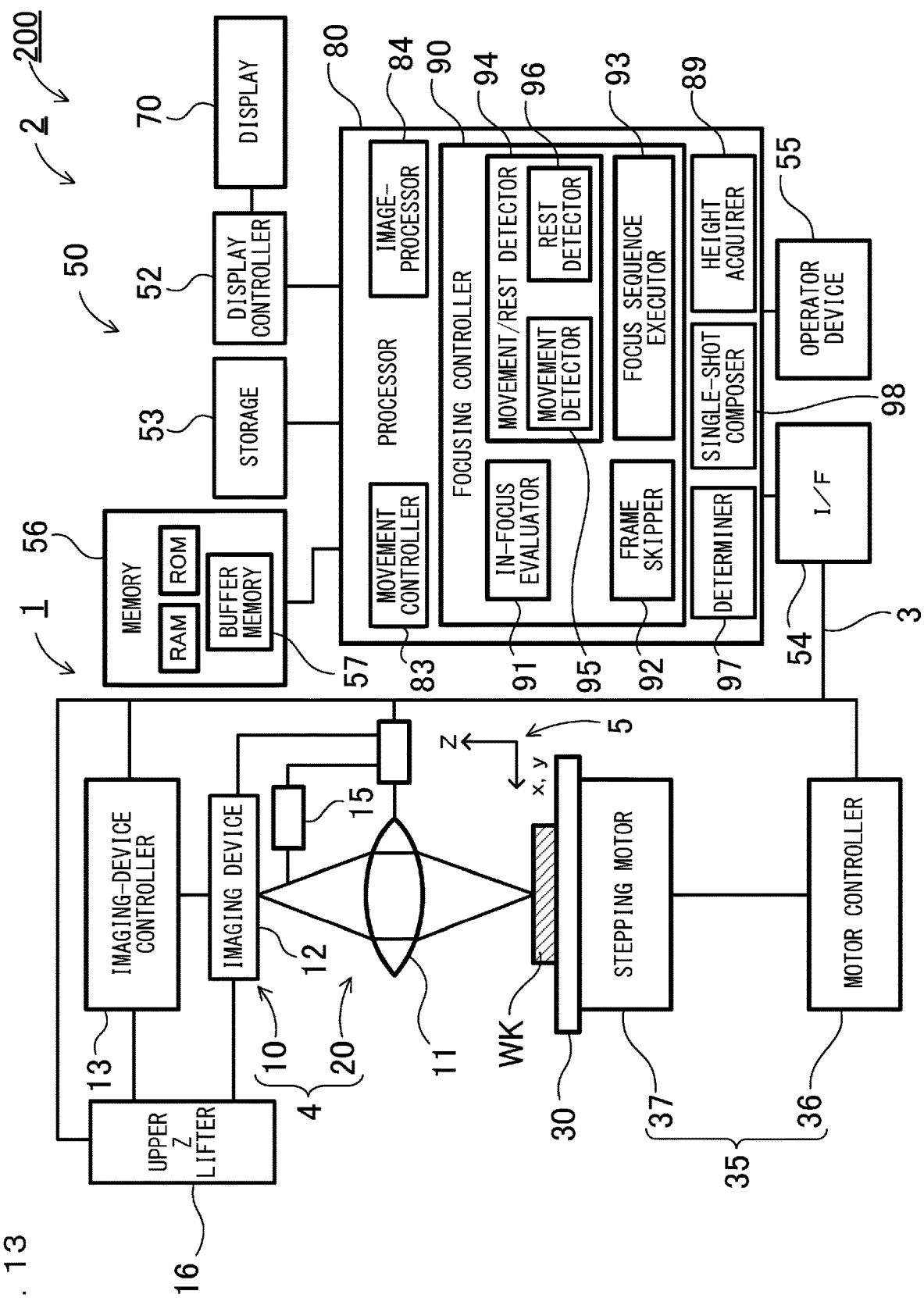
FIG. 13 is a block diagram showing a magnified observation apparatus according to a second embodiment of the present disclosure.

The auto-focusing to be used in the magnified observation apparatus according to the present disclosure is not limited to contrast detection auto-focusing but can be phase detection contrast detection auto-focusing or other type of auto-focusing. For example, a magnified observation apparatus 200 according to a second embodiment shown in FIG. 13 uses phase detection for auto-focusing. The magnified observation apparatus shown in FIG. 24 includes an auto-focusing sensor 15. The components of the magnified observation apparatus according to the second embodiment similar to the foregoing first embodiment are attached with the same reference signs as the first embodiment, and their description is omitted. The auto-focusing sensor 15 is a phase-detection type auto-focusing sensor. The phase-detection type auto-focusing sensor receives light that is split after passing through the objective lens 25. A difference between two images corresponding to split light is used to determine which direction (focus direction) and how much (focus amount) to change the current focus to achieve correct focus. The in-focus degree evaluator 91 determines correct focus based on the focus direction and the focus amount as in-focus degree feature quantities. Because the phase-detection type auto-focusing sensor does not require movement of the objective lens 25 in auto-focusing, high-speed auto-focusing can be achieved as compared with contrast detection auto-focusing.

The auto-focusing sensor is not limited to such a phase-detection type auto-focusing sensor but can be a ranging sensor, which measures a distance between the objective lens and an observation object, for example. When the ranging sensor measures a distance between the objective lens and an observation object, a distance difference between the distance measured and a focus distance of the objective lens, which is previously measured, can be calculated. As a result, auto-focusing can be performed by moving the Z stage or the like by an auto-focusing device by the distance difference calculated. Although phase detection is illustratively used in this embodiment, needless to say, known techniques such as contrast detection can be used for auto-focusing.

Generally, auto-focusing is performed in a rest state of the XY stage. That is, auto-focusing is not performed when the head 4 or the objective lens 25 is moved, and auto-focusing is performed after the XY stage is stopped. In other words, auto-focusing is not performed during moving sequences of an observation FOV but is performed during resting sequences. The auto-focusing can automatically start in response to an explicit instruction that is instructed by users to perform auto-focusing (e.g., in response to a press on an autofocus button) as well as in response to detection of a stop of movement of the XY stage or an observation FOV by the magnified observation apparatus. As a result, to display a focused image on the display 70, users do not have to instruct the magnified observation apparatus to start auto-focusing but such a focused image can be automatically displayed on the display 70 when an observation FOV moving is stopped. Consequently, users can observe an observation object without feeling stress. The movement/rest detector 94 detects a start and stop of movement of an observation FOV.

(Followable Focusing)

On the other hand, in the magnified observation apparatus according to this embodiment can automatically focus not only in a rest state of the XY stage but also during movement of the XY stage (i.e., an FOV moving state). In this specification, such a function that performs image focus adjustment during movement of an observation FOV in the XY plane refers to followable focusing. In the followable focusing, the head 4 can be moved toward an in-focus position as if to follow a surface of an observation object.

Figure 14A:
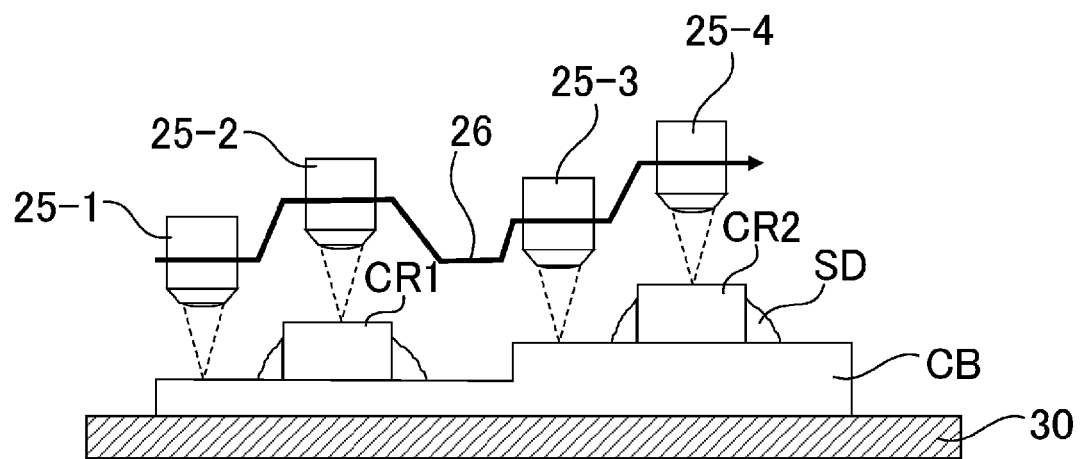
FIG. 14A is a schematic side view showing an FOV-moving sequence in which a head is moved.
Figure 14B:
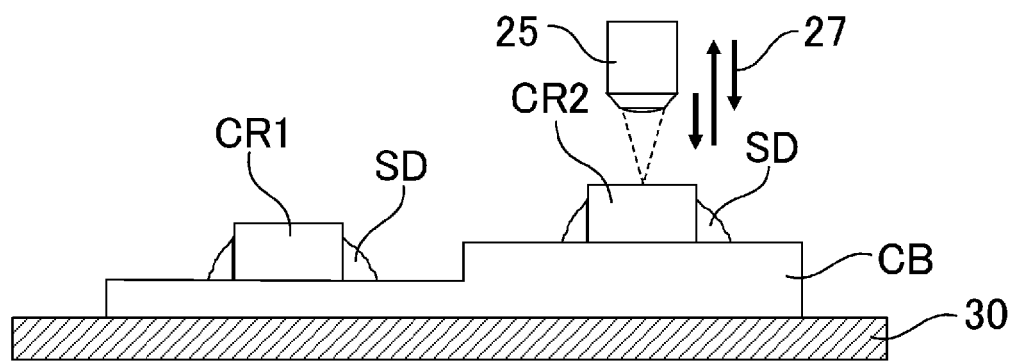
FIG. 14B is a schematic side view showing an FOV-resting sequence.

Such focusing control is now described with reference to FIGS. 14A and 14B. The followable focusing includes an FOV-moving sequence and an FOV-resting sequence. In the FOV-moving sequence, one type of focusing control is performed during movement of an observation FOV. In the FOV-resting sequence, another type of focusing control is performed while an observation FOV is at rest. FIG. 14A is a schematic side view showing the FOV-moving sequence. FIG. 14B is a schematic side view showing the FOV-resting sequence. For ease of explanation, an observation FOV is moved by illustratively moving the objective lens 25 in FIGS. 14A and 14B. Needless to say, movement of an observation FOV is not limited to movement of the objective lens, but an observation FOV is moved by illustratively moving the XY stage. In the schematic side view of FIG. 14A, the objective lens 25 moves in order of 25-1, 25-2, 25-3, and 25-4 relative to the stage 30 along the chip resistors CR1 and CR2, which are mounted on the board CB placed on the mount surface of the stage 30. An arrowed segmented line 26 shows a moving path of the objective lens 25 relative to the stage 30. The objective lens 25 can be moved in a vertical direction to roughly follow an external shape of an observation object such as the board CB and the chip resistors CR1 and CR2 during movement of an observation FOV and to change a relative distance between a focus position of the objective lens 25 and the stage is changed so that focus positions are adjusted as shown in FIG. 14A. When movement of an observation FOV is stopped, the sequence will go to the FOV-resting sequence in which short range auto-focusing is performed to precisely adjust a focus position as shown in FIG. 14B. Arrows 27 represent change directions of a relative distance between the objective lens 25 to the stage 30 in short range auto-focusing. Auto-focusing precision in the FOV-resting sequence will be higher than in the FOV-moving sequence. Users can select a setting in which auto-focusing in the FOV-resting sequence is not automatically performed when movement of an observation FOV is stopped.

Figure 15:
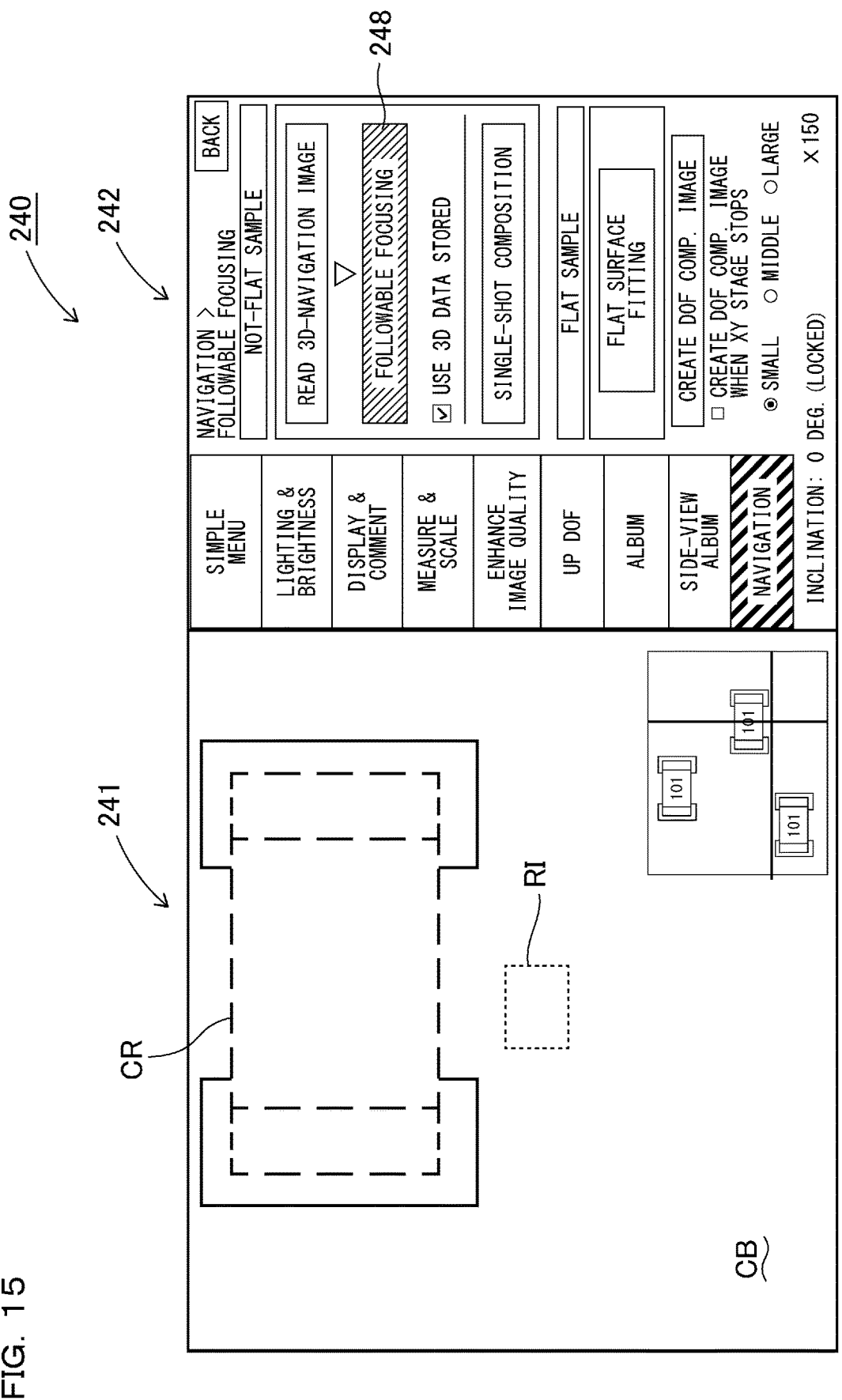
FIG. 15 is a schematic diagram showing another 3D-navigation image reading screen.
Figure 16:
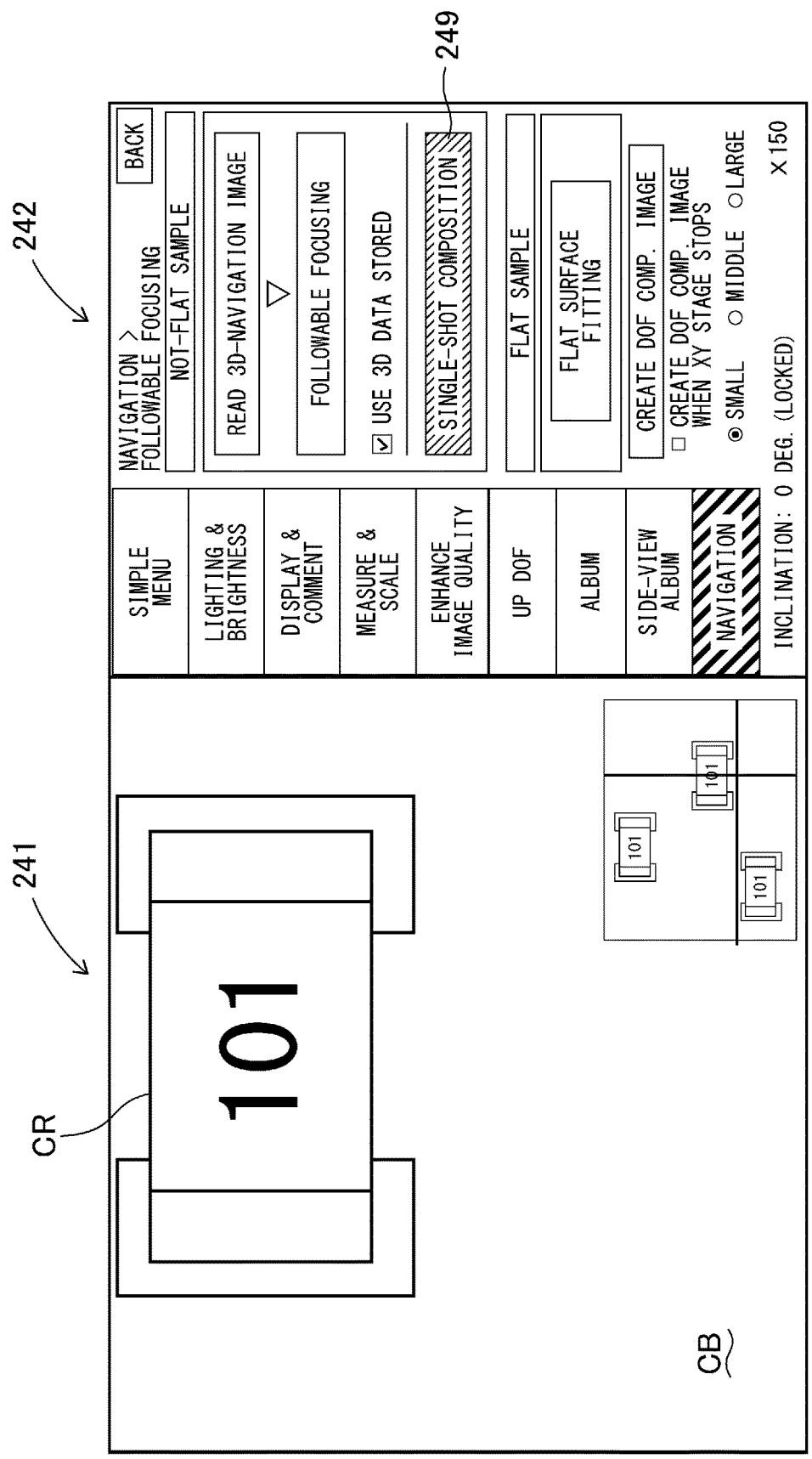
FIG. 16 is a schematic diagram showing still another 3D-navigation image reading screen.

Followable-focusing can be changed between ON and OFF. If followable-focusing is turned ON, a followable focusing mode is activated (turned ON). For example, a user can activate the followable focusing mode by pressing a "Followable Focusing" button 248 on the 3D-navigation image reading screen 240 shown in FIG. 10. FIG. 15 is a schematic diagram showing a 3D-navigation image reading screen representing that an image of an area RI, which is shown by a dashed line box, in a central part of the image display area 241 is focused in the followable focusing mode. In the exemplary 3D-navigation image reading screen shown in FIG. 15, the board CB is positioned in the area RI, which is shown by a dashed line box, in a central part of the image display area 241 so that lands on the board CB are in focus but a surface of the chip resistor CR is out of focus. In the followable-focusing mode, if an observation FOV is moved from an observation FOV shown in FIG. 15 to position the chip resistor CR in the area RI, which is shown by a dashed line box, in a central part of the image display area 241, focus adjustment is performed during the movement of an observation FOV, and as a result the surface of the chip resistor CR is brought into focus but the lands SD on the board CB are brought out of focus as shown in FIG. 10. If the user presses a "Single-Shot Composition" button 249 shown in FIG. 16, single-shot composition is performed so that a DOF composite image will be displayed in the image display area 241 (described later).

Various focusing control techniques that move the objective lens 25 or the Z stage can be used to achieve auto-focusing in the followable focusing mode. Focusing control can be selected in the followable-focusing mode from a plurality of focusing control techniques in the magnified observation apparatus according to this embodiment. In other words, two or more types of followable focusing modes that use different focusing control techniques can be executed. In one of the followable-focusing modes, a suitable selected focusing control sequence is selected and executed during movement of a field of view in a direction perpendicular to the optical axis. Also, when the movement of an observation FOV is stopped, a suitable focusing control sequence will be executed depending on the followable focusing mode. Specifically, the followable focusing mode can include a normal mode, a 3D shape following mode, a flat-surface following mode, and the like. In addition, in each followable-focusing mode, a focusing control sequence suitable for observation mode can be automatically selected during movement of an observation FOV and at a stop of the movement.

(Normal Mode)

Figure 17:
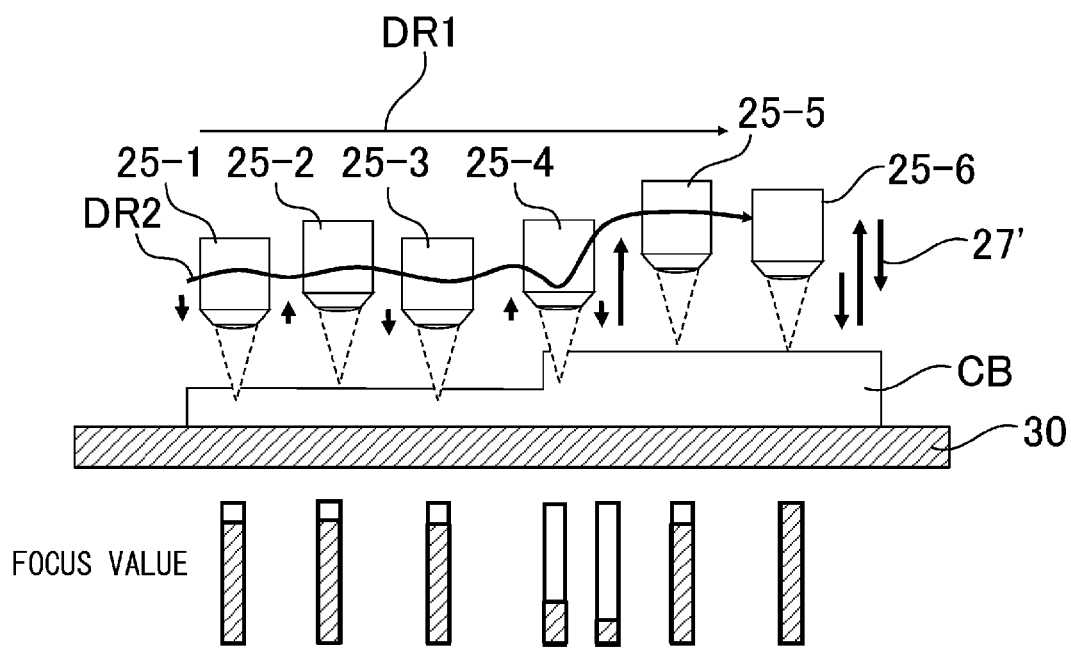
FIG. 17 is a schematic side view showing a sequence of the head moving in a normal mode.

FIG. 17 is a schematic side view showing FOV-moving and FOV-resting sequences in the normal mode. In the schematic side view of FIG. 17, the objective lens 25 moves in order of 25-1, 25-2, 25-3, 25-4, 25-5, and 25-6 relative to the stage 30 along a stepped board CB placed on the mount surface of the stage 30. An arrow DR1 shows a field-of-view moving direction (FOV moving direction) of the objective lens 25 relative to the stage 30. An arrowed segmented line DR2 shows a moving path of the objective lens 25 relative to the stage 30. Arrows 27' represent change directions of a relative distance between the objective lens 25 to the stage 30. In addition, focus values, which are associated with their detection points, are indicated in FIG. 17. Focusing control is performed in accordance with the focus values in the normal mode as shown in FIG. 17. That is, the focusing device is controlled based on focus value change of the current observation FOV (current step view) from an observation FOV step or steps before the current observation FOV (earlier step views) so that a Z direction moving direction of the objective lens in the earlier step views is left unchanged if a focus value of the current step view increases relative to the earlier step views but the objective lens is moved in the direction opposite to the current step view if a focus value of the current step view decreases relative to the earlier step views. Initially, the objective lens 25 is moved in one of upward and downward directions. If the movement reduces a focus value of the current step view, the objective lens 25 is moved in another direction. Focus values are acquired one after another during movement of an observation FOV. One of upward and downward directions is selected in accordance with the focus values acquired to be able to increase a focus value of the current step view. The objective lens 25 is kept moving in one of upward and downward directions relative to the stage 30 that is selected in accordance with the focus value change in each step so that focusing control can be performed without finding a peak focus value in the FOV moving sequence in the normal mode. It is noted that a moving path of the objective lens 25 is shown exaggeratingly for ease of explanation by the arrowed segmented line DR2 so that the path is shown wavy but a practical moving path of the objective lens will substantially agree with an external shape of an observation object. If a focus value change becomes large, the objective lens can be moved by a larger pitch. If the movement of an observation FOV is stopped, the sequence goes to the FOV-resting sequence. Auto-focusing is performed in the FOV-resting sequence so that the objective lens is moved to obtain the maximum focus value in a position to be observed (an observation position). After the auto-focusing is completed, focusing control ends.

Figure 18:
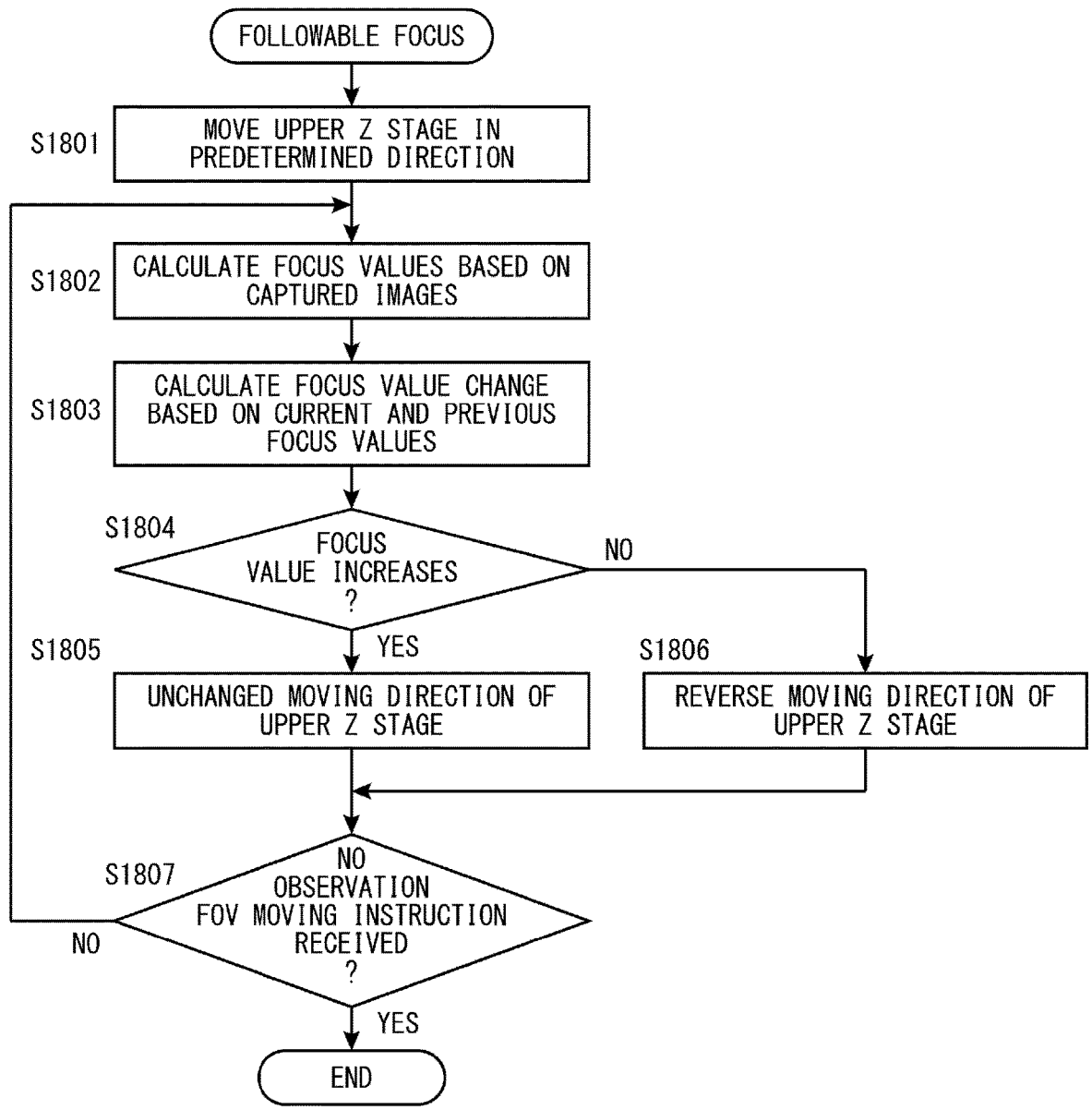
FIG. 18 is a flowchart showing specifics of a followable focusing process.

Specifically, a procedure of auto-focusing in the normal mode (followable focusing process) is now described with reference to FIG. 18. After focus values are buffered in an initial state, the upper Z stage is moved in a predetermined direction in Step S1801. Subsequently, an image is captured, and a focus value is calculated based on the image captured in Step S1802. Furthermore, a focus value change is calculated from a focus value of the current step view (current focus value) and focus values of earlier step views (earlier focus values) in Step S1803. Focus values that are buffered are updated one after another to be used as the earlier focus values. Subsequently, it is determined whether the current focus value increases with respect to the earlier focus values in Step S1804. If the current focus value increases, the procedure goes to Step S1805 in which the current moving direction of the upper Z stage is left unchanged. If the current focus value decreases, the procedure goes to Step S1806 in which the moving direction of the upper Z stage is changed to the direction opposite to the current moving direction. The followable focusing process is repeated as the FOV moving sequence from Step S1801 during movement of a field of view. Consequently, the FOV moving sequence can move the Z stage toward an in-focus position by monitoring focus values to avoid displaying misfocused images even during movement of the XY stage. If movement of a field of view is stopped, the sequence changes to the FOV-resting sequence so that focus values that are temporarily stored in the buffer are cleared and the followable focusing process ends.

(3D Shape Following Mode)

In the 3D shape following mode, height information of the observation object is previously obtained so that the height information is used to achieve focus. The height information can be obtained by obtaining height image data when a 3D-navigation image is captured as a wide area image, which is captured at low power. It is notes that the wide area image can be generated by coupling pieces of height image data including height information (coupled image). As a result, such a 3D-navigation image that has been previously captured and includes height information is used for auto-focusing in the 3D shape following mode. Contrary to this, because such height information is not used in the aforementioned normal mode, height image data is not necessarily obtained in advance. For example, if a check box 254

"Use 3D Data Stored" is checked (ON) in the navigation image reading screen 240 shown in FIG. 8, the followable focusing is performed in the 3D shape following mode in which height information of the 3D-navigation image is used. If the check box 254 "Use 3D Data Stored" is unchecked (OFF), the followable focusing is performed in the normal mode in which height information in the 3D-navigation image is not used.

Figure 19:
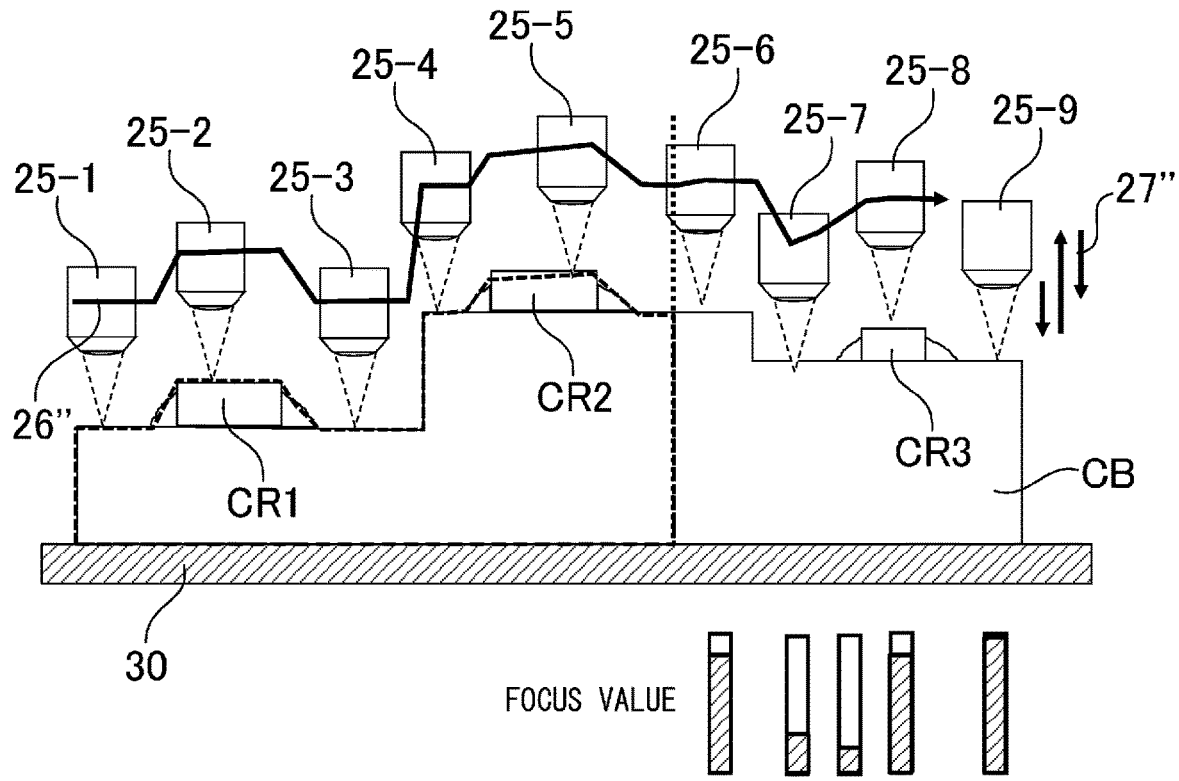
FIG. 19 is a schematic side view showing FOV-moving sequences in the case in which followable focusing is performed in an area in which a 3D-navigation image is stored and in an area in which such a 3D-navigation image is not stored.

FIG. 19 is a schematic side view showing the 3D shape following mode. In the schematic side view of FIG. 19, the objective lens 25 moves in order of 25-1, 25-2, 25-3, 25-4, 25-5, 25-6, 25-7, 25-8, and 25-9 relative to the stage 30 along a stepped board CB placed on the mount surface of the stage 30. An arrowed segmented line 26″ shows a moving path of the objective lens 25 relative to the stage 30. Arrows 27″ represent change directions of a relative distance between the objective lens 25 to the stage 30 in short range auto-focusing. In addition, focus values, which are associated with their detection points, are indicated in FIG. 19. In FIG. 19, a part enclosed by a closed dashed line indicates an area in which its 3D data exists. In the area in which height information (i.e., 3D data) exists as three-dimensional reference information, the height information is used so that focus positions are adjusted. Relative positions 25-1, 25-2, 25-3, 25-4, and 25-5 of the objective lens 25 relative to the stage 30 correspond to the area in which its 3D data exists as three-dimensional reference information (3D-data included area). If an observation FOV is moved to an area in which 3D data has not been obtained as three-dimensional reference information, focusing control is changed to the aforementioned normal mode because height information cannot be acquired. That is, focusing control that uses change of the current focus value from earlier focus values (focus value change by movement of an observation FOV) is performed if an observation FOV is moved to an area in which 3D data has not been obtained. Relative positions 25-6, 25-7, 25-8, and 25-9 of the objective lens 25 relative to the stage 30 correspond to the area in which no 3D data exists as three-dimensional reference information (3D-data absent area) in the exemplary case of FIG. 19. It is noted that a moving path of the objective lens 25 in the area in which no 3D data exists is shown exaggeratingly for ease of explanation by the arrowed segmented line 26″ so that the path is shown wavy but a practical moving path of the objective lens will substantially agree with an external shape of an observation object except that a substantial difference in level exists (a substantial stepped part). Also in the 3D shape following mode, when movement of an observation FOV is stopped, the sequence will go to the FOV resting sequence. As discussed above, even in the case in which both 3D-data included and 3D-data absent areas are included, the followable focusing is changed to a suitable mode depending on the 3D-data included and 3D-data absent areas. Consequently, suitable focusing control can be seamlessly performed. A color of a focus frame can be changed depending on whether 3D data has been obtained as described later. For example, a color of an area RI, which is shown by a dashed line box, in a central part of the image display area 241 can be changed.

(Focus Jump Function)

Figure 20:
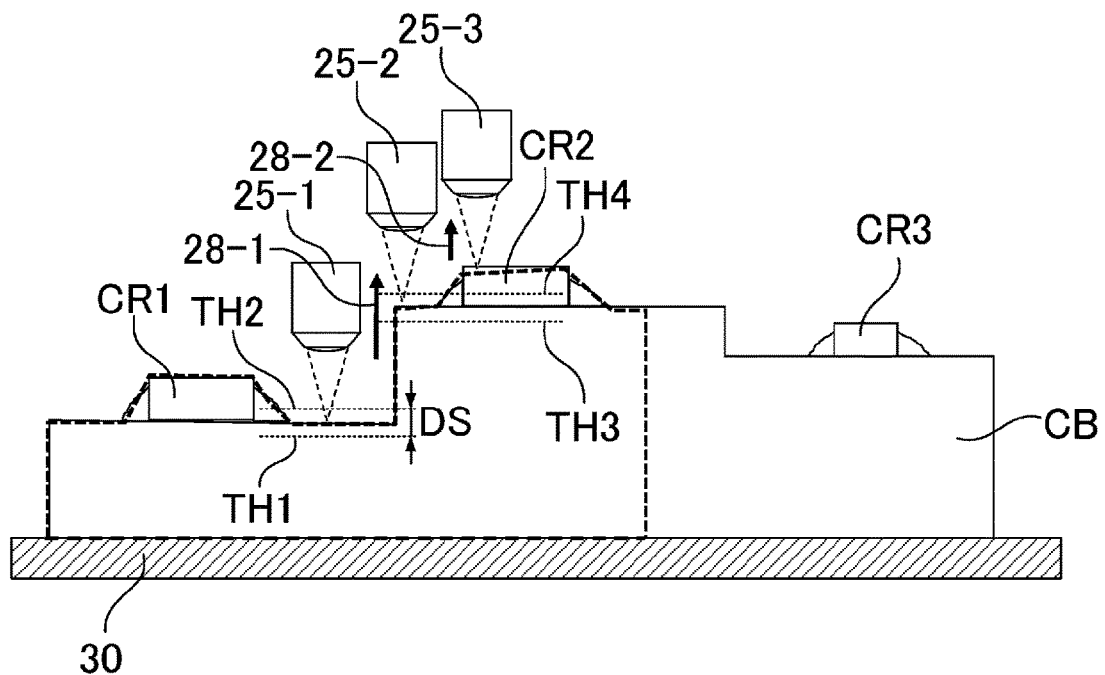
FIG. 20 is a schematic side view showing followable focusing with a focusing jump function.

Focusing control can be performed based on only height positions in 3D data in the 3D shape following mode. Alternatively, focusing control can be performed normally based on focus values similarly to the normal mode but can jump the focus position to an estimated position by using height positions in 3D data if a particular condition is satisfied. For example, if an observation object includes a substantial stepped part, the focus position can be jumped to an estimated position by using height positions in 3D data in a focus jump function. Such a focus jump function is now described with reference to a schematic side view of FIG. 20. In the schematic side view of FIG. 20, the objective lens 25 moves in order of 25-1, 25-2, and 25-3 relative to the stage 30 along chip resistors CR1 to CR3, which are mounted on a stepped board CB placed on the mount surface of the stage 30. An arrow 28-1 represents a change of a relative distance between the objective lens 25 to the stage 30, which corresponds to a focus jump. In FIG. 20, a part enclosed by a closed thick dashed line indicates an area in which its 3D data exists. For example, 3D data of an observation object is previously acquired through a low power objective lens section of the objective lens 25. The 3D data, which is previously acquired, occasionally includes a difference between a shape that is obtained from the 3D data and an actual shape of the observation object. Contrary to this, in the case in which focusing control is performed based on focus values that are measured in real time, the objective lens can be moved along the actual shape of the observation object. However, even in this case, the objective lens cannot be moved along an actual shape of an observation object that includes a substantial stepped part, which will give a large focus value change in a short time. For example, if following response speed is high, movement of the objective lens will oscillate so that focusing control will be unstable. On the other hand, stable focusing control will reduce following response speed and cannot properly follow an actual shape of such an observation object, which includes a substantial stepped part or the like. To address this, the determiner 97 obtains height information of 3D data corresponding to a part of an observation object in an observation position in a next FOV moving step (next observation position), and calculates heights by using focus values that are measured in the aforementioned normal mode. The determiner 97 compares a height in 3D data with a height that is obtained by using focus values of the observation object measured in the aforementioned normal mode (focus-value-based height), and determines whether a difference between the heights falls within a predetermined range. If the difference falls within the predetermined range, the focus-value-based height is selected. If a difference between the focus-value-based height and the height in 3D data is large, in other words, if the difference is out of the predetermined range, the height in 3D data is selected. A relative distance between the objective lens 25 and the stage 30 can be changed from a relative distance that is obtained by using focus values measured in real time to a relative distance acquired from height information of 3D data at an XY position corresponding to a next observation position (next XY observation position) by the aforementioned focusing control during movement of the field of view. That is, the focus position can be jumped from the focus-value-based height to the height in 3D data. A determination threshold DS is indicated in FIG. 20. The determination threshold DS is used to determine whether to select focusing control that is performed based on focus values measured in real time (corresponding to the normal mode) or focusing control that is performed based on a height in 3D data. The observation object has a flat part around the point 25-1. Because a difference between the heights is smaller than the determination threshold DS in this part, the objective lens 25 is moved by focusing control corresponding to the normal mode. The observation object has a stepped part between the points 25-1 and 25-2, and an inclined surface between the points 25-2 and 25-3. If the objective lens 25 passes the stepped part and the inclined surface in which a difference between the heights is not smaller than the determination threshold DS, the objective lens 25 is jumped (focus jump) during movement of a field of view. For example, lower and upper limit heights TH1 and TH2 are specified at the point of 25-1. A difference between the heights becomes out of the predetermined range, which is defined by the lower and upper limit heights TH1 and TH2 during movement of a field of view so that focus jump is performed (28-1). A difference between the heights falls within a predetermined range that is defined by the lower and upper limit heights TH3 and TH4 during movement of a field of view so that focus jump is not performed (28-2). Because height information of 3D data is selectively used, reliable focusing control can be provided without reduction of following response speed even in such a boundary part. It is noted that if the objective lens is slowly moved above an inclined surface a difference between a focus-value-based height and a height in 3D data at a next XY observation position will be fall within the determination threshold DS so that focus jump is not performed.

(Offset Function)

Figure 21:
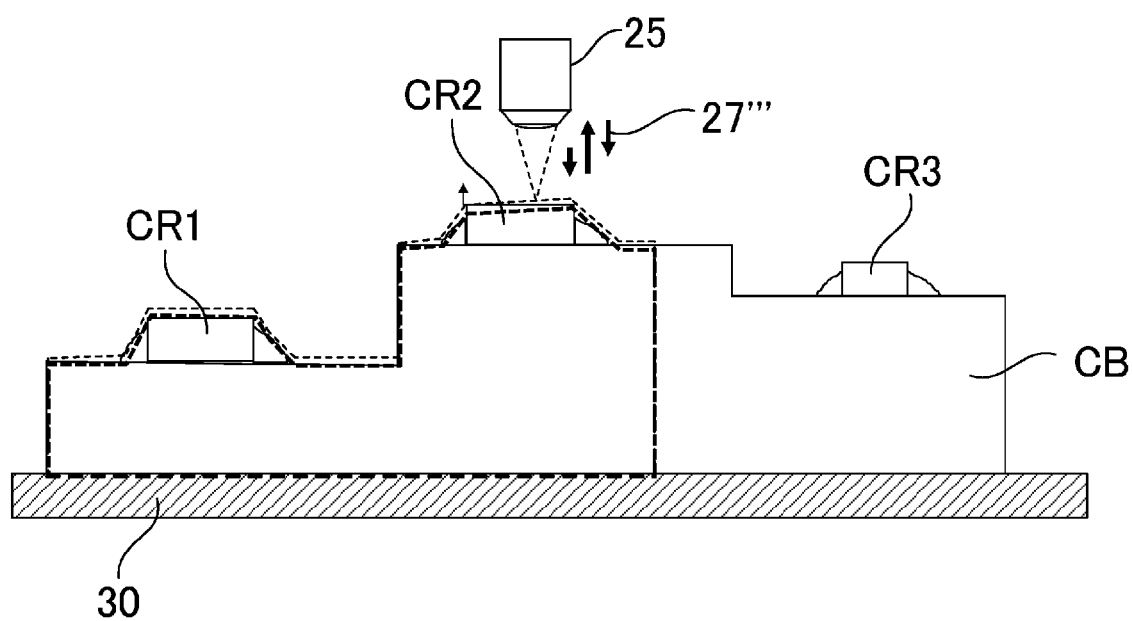
FIG. 21 is a schematic side view showing followable focusing with an offset function.
Figure 37:
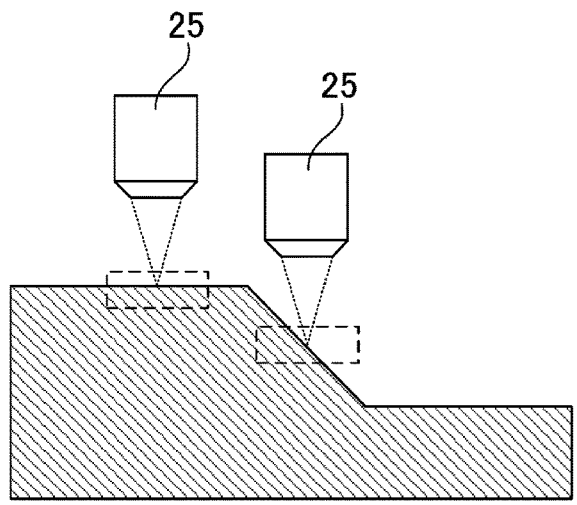
FIG. 37 is a schematic view illustrating determination whether to execute the offset function.

The 3D shape following mode can further have a function that offsets height of 3D data. The offset function is now described with reference to FIG. 21. 3D data of a board CB that includes chip resistors CR1 and CR2 as an observation object is previously acquired. The 3D data previously acquired occasionally has a uniform deviation from the observation object that is actually placed, which is caused by a difference between placement conditions and the like. In this case, 3D data has been obtained shown by a thick dashed line box similar to FIG. 20. When movement of an observation FOV is stopped at a position in which its 3D data exists, auto-focusing operation in the FOV resting sequence is performed so that height information is acquired. Arrows 27''' represent change directions of a relative distance between the objective lens 25 to the stage 30 in short range auto-focusing. To give agreement between a height of this position in the 3D data and the height information acquired, an offset amount of 3D data is calculated. As a result, the 3D data can be offset in accordance with the offset amount. For example, the offset amount calculated is stored in the memory 56. When height information of a next XY observation position is used in the 3D shape following mode, focusing control is performed based on height information of 3D data of the next observation position and the offset amount stored in the memory 56. 3D data shown by a closed thick dashed line is offset upward to a part enclosed by a closed thin dashed line in the exemplary case of FIG. 21. In this case, a positive offset value corresponding to the offset amount is stored in the memory 56. In the case in which 3D data is offset downward, a negative offset value corresponding to the offset amount is stored in the memory 56. Because height information of 3D data is adjusted as discussed above, more accurate surface heights of the observation object can be acquired. Consequently, focusing control can be accurately performed. Whether to execute the offset function can be determined based on a shape around a position at which its height information is acquired. For example, in the case in which height information of a position is acquired in the FOV-resting sequence, shape information of a part around the position is acquired based on 3D data. After that, the offset function is executed if the shape information shows a horizontal surface, and the offset function is not executed if the shape information shows an inclined surface as shown in FIG. 37. In this case, an offset amount of 3D data can be accurately calculated.

(Focus Frame)

Figure 22A:
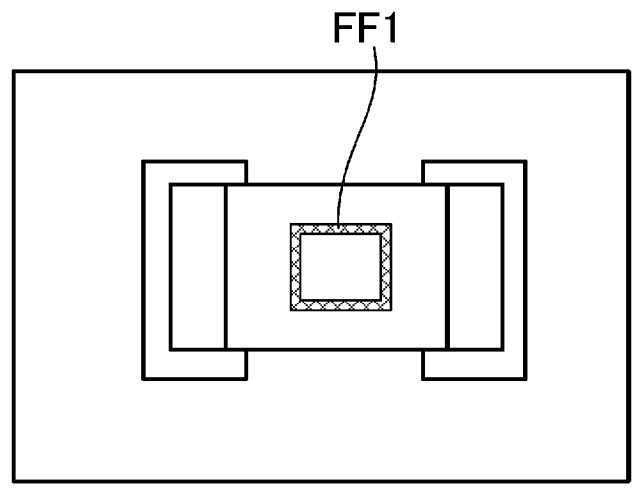
FIG. 22A is a schematic view showing a focus frame in the case in which auto-focusing is performed.
Figure 22B:
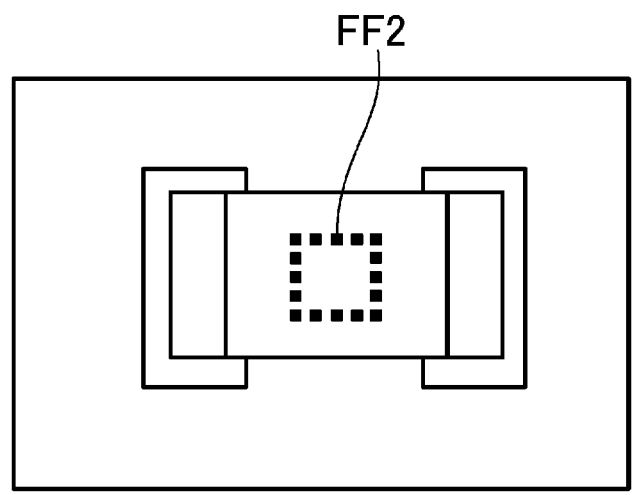
FIG. 22B is a schematic view showing a focus frame in the case in which auto-focusing is not performed.
Figure 22C:
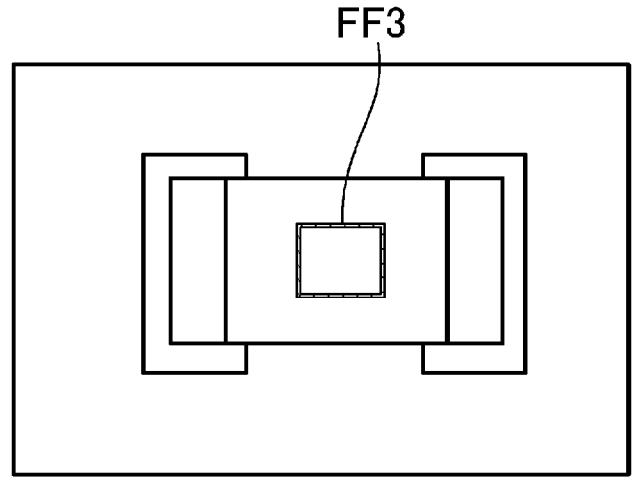
FIG. 22C is a schematic view showing a focus frame in the case in which auto-focusing using focusing control different from the case of FIG. 22A is performed.

In the case in which auto-focusing is performed, a focus frame that indicates a part to be focused in an observation FOV can be displayed. In this case, the focus frame can have different display forms that change depending on focusing control conditions of auto-focusing. Exemplary different display forms are shown in FIGS. 22A to 22C. For example, a focus frame FF1 of a closed thick opaque line is displayed during auto-focusing as shown in FIG. 22A. A focus frame FF2 of a closed thick transparent line is displayed as shown in FIG. 22B in the case in which an observation FOV is at rest. The change between the different display forms of the focus frame helps users to visually identify whether auto-focusing is currently performed. Such change between the different display forms of a focus frame is not limited to change between opaque and transparent frames. For example, other conspicuous change between thick and thin line frames, flashing and non-flashing frames, highlighted and non-highlighted frames, color and gray frames, or the like, which can be visually distinguished by users, can be used. A focus frame can be changed between different display forms depending on whether the FOV moving sequence or the FOV-resting sequence is executed. In the case in which focusing control that uses 3D data (3D shape following mode) is performed, a focus frame FF3 that is defined by a light-blue thin opaque line is displayed in the exemplary display form shown in FIG. 22C. In the case in which the FOV-resting sequence is executed, a focus frame FF1 that is defined by a light-blue thick opaque line is displayed in the exemplary display form shown in FIG. 22A. Also, in the case in which focusing control that uses focus values (normal mode) is performed, a focus frame FF3 that is defined by a green thin opaque line is displayed. In the case in which the FOV-resting sequence is executed, a focus frame that is defined by a green thick opaque line is displayed. When auto-focusing is completed, a focus frame can be changed from an opaque line to a transparent (normal) line. For example, in focusing control that uses 3D data, when auto-focusing is completed, a focus frame can be changed from a focus frame FF1 that is defined by a light-blue thick opaque line to a focus frame FF2 that is defined by a light-blue transparent line. Also, in focusing control that uses focus values (normal mode), when auto-focusing is completed, a focus frame can be changed from a focus frame FF1 that is defined by a green thick opaque line to a focus frame FF2 that is defined by a green transparent line. Such a focus frame can be displayed when an image is sequentially updated in a display area as a moving video picture. In addition, a frame that is displayed in the image display area or the navigation area when an ROI is specified can have different display forms that change depending on depending on whether auto-focusing is performed, types of focusing control, and the like.

Figure 23:
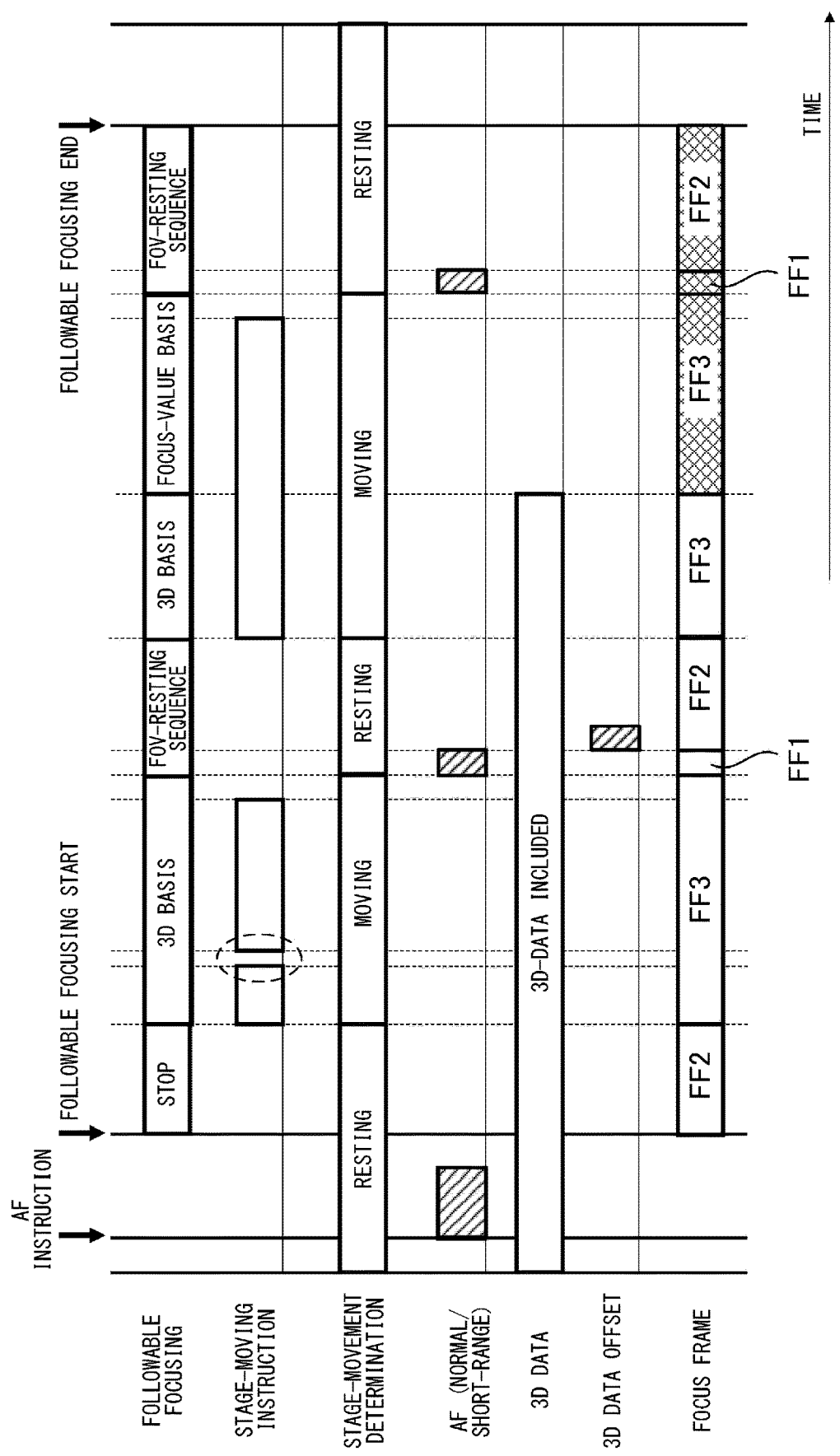
FIG. 23 is a timing chart showing a relationship between instructions and operations in the case in which followable focusing is performed.

A relation between instructions and operations in the 3D shape following mode is now described in the case in which the followable-focusing is performed with reference to a timing chart of FIG. 23. The timing chart illustratively shows that 3D data is previously acquired in the 3D-navigation image reading function or the like, and that an observation FOV is moved by the stage 30 moving. The stage 30 is at rest and its corresponding observation position is located in an area in which its 3D data exists (3D-data included area) in an initial status in the timing chart of FIG. 23. When a direction to execute normal auto-focusing is received from a user in this status, normal auto-focusing is performed so that an image of an observation object in the observation position in the 3D-data included area is correctly focused. After that, when a direction to execute followable-focusing is received from the user, a focus frame that is defined by a light-blue transparent line is superimposed on a live image of an observation object that is displayed in the image display area. After that, the stage 30 is moved in response to an instruction to move the stage 30. Correspondingly, the movement/rest detector 94 detects movement of the stage 30, and the FOV moving sequence in the 3D shape following mode is activated. In response to the activation of the FOV moving sequence, a focus frame is changed from a closed light-blue transparent line to a closed light-blue opaque line. Even if the instruction to move the stage 30 is temporarily interrupted as shown by a dashed line circle in FIG. 23 so that the stage 30 temporarily stops, the movement/rest detector 94 detects that the stage 30 keeps on moving as long as the stage 30 keeps on stopping for a predetermined time period. If the stage 30 stops for the predetermined time period, the movement/rest detector 94 detects that the stage 30 is at rest. If the movement/rest detector 94 detect a stop (that the stage is at rest), the followable focusing changes from the FOV moving sequence to the FOV-resting sequence. When the FOV moving sequence is changed to the FOV-resting sequence, short range auto-focusing is activated and an offset amount is calculated in accordance with height information that is acquired in the short range auto-focusing and height information of 3D data. A focus frame is indicated by a closed thick line during short range auto-focusing in the FOV-resting sequence. When the short range auto-focusing is completed, focusing control becomes idle and the focus frame is changed to a closed light-blue transparent line. After that, the stage 30 is moved in response to an instruction to move the stage 30. Correspondingly, the movement/rest detector 94 detects movement of the stage 30, and the FOV moving sequence in the 3D shape following mode is performed. In response to the activation of the FOV moving sequence, a focus frame is changed from a closed light-blue transparent line to a closed light-blue opaque line. When an observation FOV moves from the 3D-data included area into an area in which no 3D data exists (3D-data absent area), the FOV moving sequence goes to focusing control that corresponds to the normal mode and a focus frame is changed from light blue to green. If the stage 30 stops for the predetermined time period, the movement/rest detector 94 detects that the stage 30 is at rest. If the movement/rest detector 94 detect a stop (that the stage is at rest), the followable focusing changes from the FOV moving sequence to the FOV-resting sequence. When the FOV moving sequence is changed to the FOV-resting sequence, short range auto-focusing is activated. A focus frame is indicated by a closed thick line during short range auto-focusing in the FOV-resting sequence. When the short range auto-focusing is completed, focusing control becomes idle and the focus frame is changed to a closed light-blue transparent line. After that, when a direction to end followable-focusing is received from the user, the followable focusing ends.

(Flat-Surface Following Mode)

Figure 24A:
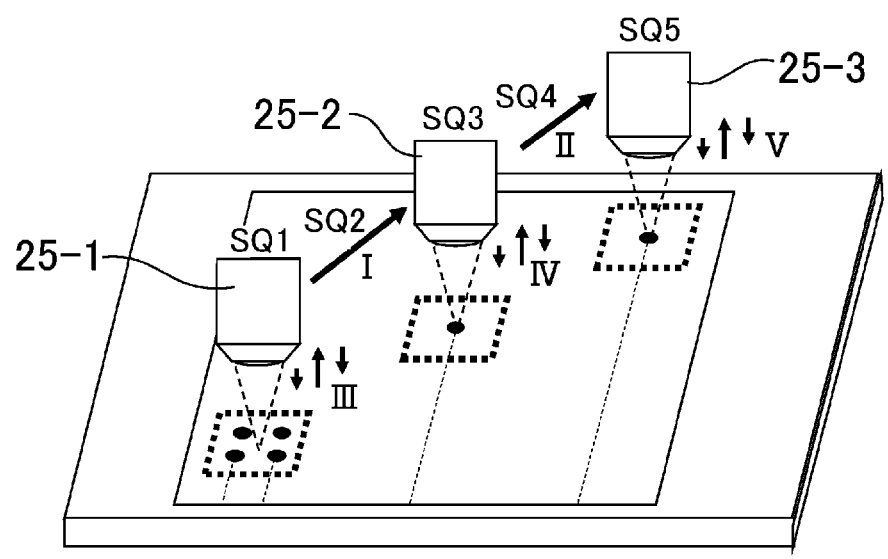
FIG. 24A is a schematic perspective view showing movement of the head in a flat-surface following mode.
Figure 24B:
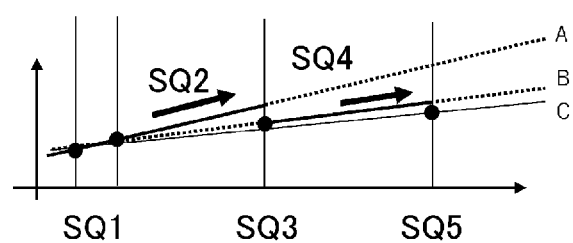
FIG. 24B is a graph showing estimated inclination of a flat surface.
Figure 25:
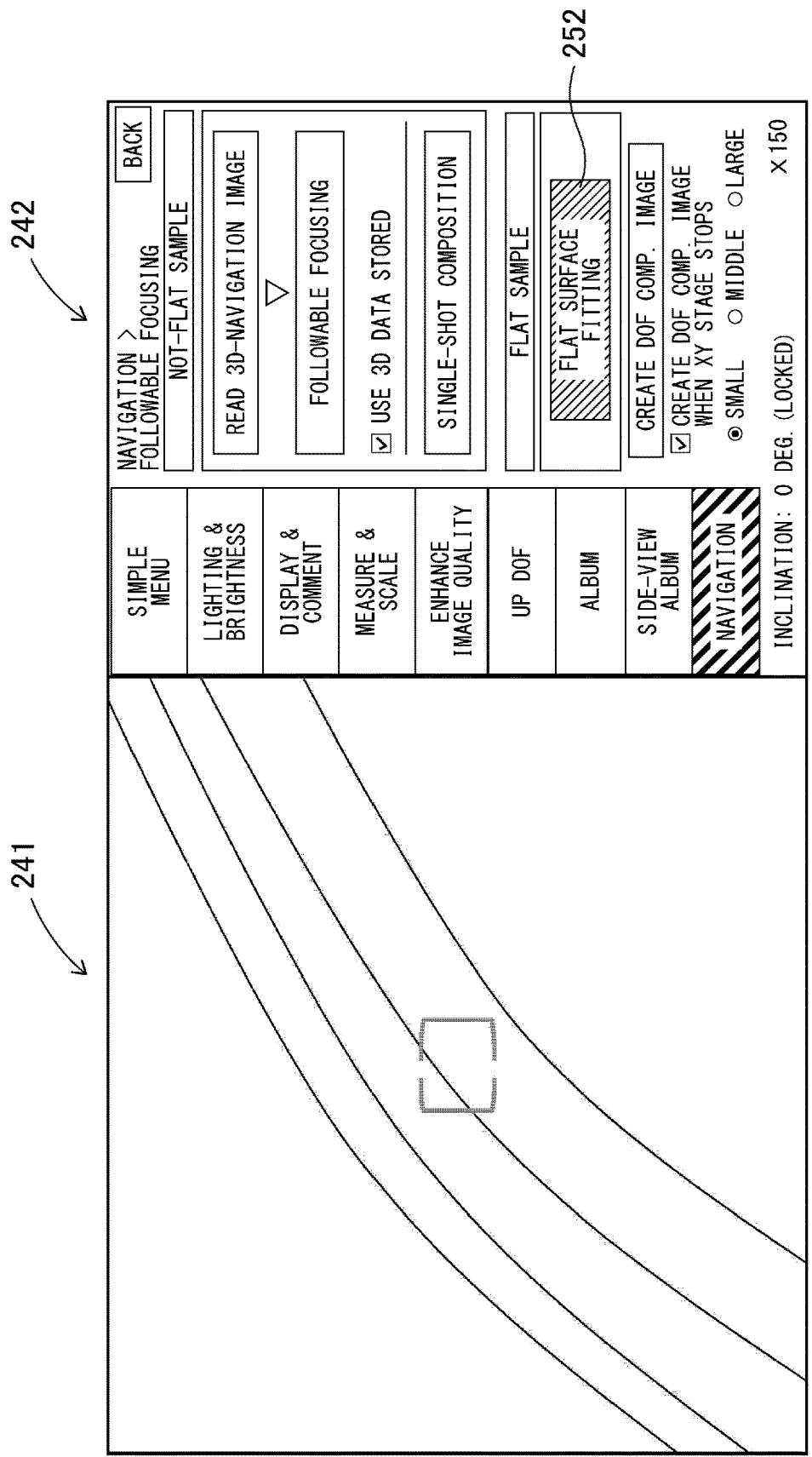
FIG. 25 is a diagram showing a user interface screen displaying a fat-fitting function.

The magnified observation apparatus according to the embodiment has a flat-surface following mode as focusing control. In the flat-surface following mode, a surface is selected from predetermined geometric shapes (a flat surface, a spherical surface, etc.) and is constructed to have the best fit to heights of an observation object corresponding to different XY positions to estimate a surface along which the focus position of the objective lens 25 is to be moved as three-dimensional reference information, and determines a target height, which is estimated as a next observation position, based on information about the surface. The flat-surface following mode estimates height information of a next observation position by applying a geometric shape that is constructed to have the best fit to heights of the observation object. The flat-surface following mode can be used for observation objects that have a geometric surface. After a plurality of positions are focused on an observation object, if a shape of the observation object in a part focused is identified as a flat surface based on the positions focused, the flat surface is used as three-dimensional reference information so that the objective lens can be moved in the Z direction in accordance with an inclination of the flat surface identified in movement of the XY stage in the flat-surface following mode as shown in FIG. 24A. When the movement of the XY stage is stopped, normal auto-focusing can be performed. In the embodiment shown in FIG. 24A, SQ1 shows multipoint height acquisition (auto-focusing operation) in which heights are acquired at a plurality of points, and SQ3 and SQ5 show height acquisition (auto-focusing operation). SQ2 and SQ4 show FOV moving sequences. SQ3 and SQ5 further show FOV resting sequences. For example, users can execute the flat-surface following mode by pressing a "Flat Fitting" button 252, which is arranged in an operator area 242 in a user interface screen shown in FIG. 25. In this case, the flat-surface following mode will start in response to the press on the button. More specifically, heights are acquired at the plurality of points in SQ1, which is shown by a dotted line box, in an observation FOV in FIG. 24A, and the observation object can be identified as a flat surface A as shown in FIG. 24B. Subsequently, the objective lens can be moved to follow the flat surface A, which has been identified in SQ1, in a path of SQ2. An arrow I shows a control direction of the objective lens 25 on the path of SQ2 in FIG. 10A. That is, the arrow I shows a control direction of the FOV changer and a control direction of a relative distance between a focus position of the objective lens 25 and the stage on the path of SQ2. After moved along the path of SQ2, the objective lens 25 is stopped in SQ3. Auto-focusing is additionally performed at a position where the objective lens is stopped so that height information is acquired. Arrows IV show control directions of a relative distance between a focus position of the objective lens 25 and the stage in FIG. 10A. As shown in FIG. 24B, a flat surface B is estimated as updated three-dimensional reference information in accordance with the height information that is acquired in SQ3 in addition to the heights that have been acquired at the plurality of points in SQ1. Subsequently, the objective lens can be moved to follow the flat surface B, which has been identified in SQ3, in a path of SQ4. After moved along the path of SQ4, the objective lens 25 is stopped in SQ5. Auto-focusing is additionally performed at a position where the objective lens is stopped so that height information is acquired. As shown in FIG. 24B, a flat surface C is estimated as updated three-dimensional reference information in accordance with the height information that is acquired in SQ5 in addition to the heights that have been acquired at the points in SQ1 and SQ3. In the flat-surface following mode, when movement of an observation FOV is stopped, auto-focusing is performed so that height is acquired. Accordingly, a flat surface can be newly estimated every when movement of an observation FOV is stopped. The objective lens can be moved in a vertical direction to follow a flat surface that is newly estimated during movement of an observation FOV. Consequently, image focus adjustment, which cannot be performed by conventional magnified observation apparatuses, can be performed even during movement of an observation FOV. It is noted that heights can be acquired at a plurality of points in SQ3 and SQ5 similar to SQ1.

(Frame Skip Function)

The magnified observation apparatus according to this embodiment further has a frame skip function that updates an image on the display only if a newly captured image is more correctly focused than an image that is currently displayed, and does not update the image displayed if not. As a result, in the case in which auto-focusing is performed in the FOV resting sequence for example, users can watch a relatively correctly focused image that is captured before and displayed instead of a misfocused image that is currently captured.

Procedures of performing normal auto-focusing and short range auto-focusing including a frame skip process will be described below as procedures of performing a frame skip process during auto-focusing.

(Frame-Skippable Normal Auto-Focusing)

The procedure of performing normal auto-focusing including a frame skip process is described with reference to a flow chart of FIG. 26. A range of normal auto-focusing in the height direction is previously specified. The Z stage is first moved in a direction that increases a relative distance between the objective lens 25 and the stage 30 in Step S2601. Subsequently, a predetermined frame skip process is performed during movement of the Z stage (described later with reference to FIG. 28) in Step S2602. Subsequently, it is determined whether the Z stage is moved through the entire height range of normal auto-focusing in Step S2603. If not, the procedure returns to Step S2601 and repeats this routine. If the Z stage is moved through the entire height range of normal auto-focusing, the procedure goes to Step S2604 in which the Z stage is moved to a height position corresponding to the maximum focus value. The height position corresponding to the maximum focus value corresponds to an in-focus position. Finally, a live image is displayed in Step S2605, and the procedure of performing normal auto-focusing ends.

(Frame-Skippable Short Range Auto-Focusing)

Figure 27:
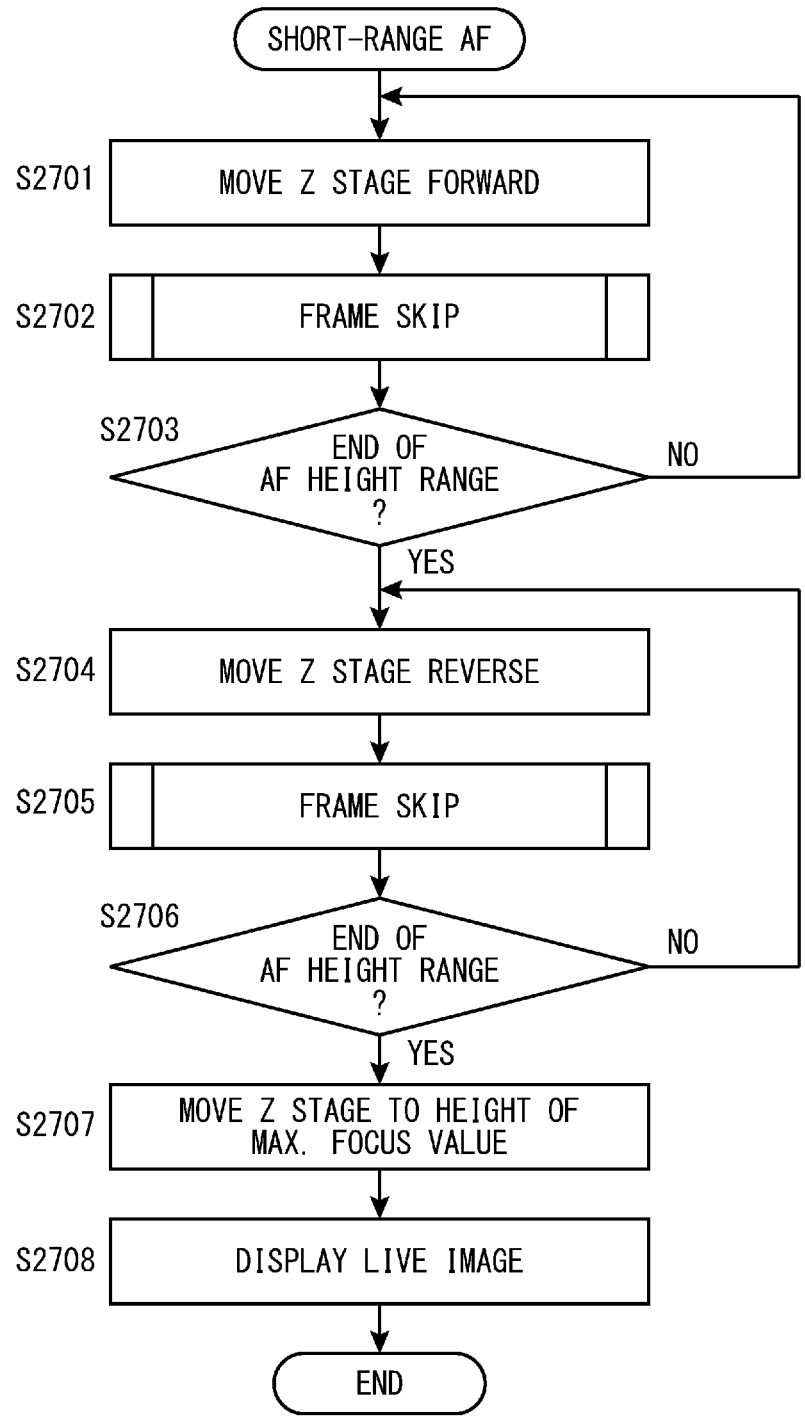
FIG. 27 is a flowchart showing a procedure of frame-skippable short range auto-focusing.

The procedure of performing short range auto-focusing including a frame skip process is described with reference to a flow chart of FIG. 27. A range of short range auto-focusing in the height direction is previously specified.

In Step S2701, the Z stage is first moved in a forward direction. The forward direction is a direction in which the objective lens 25 moves away from an observation object, for example. Subsequently, a predetermined frame skip process is performed during movement of the Z stage (described later with reference to FIG. 28) in Step S2702. Subsequently, it is determined whether the Z stage is moved through the entire height range of short range auto-focusing in Step S2703. If not, the procedure returns to Step S2701 and repeats this routine.

Subsequently, if the Z stage is moved through the entire height range of short range auto-focusing, the procedure goes to Step S2704 in which the Z stage is moved in the reverse direction, which is opposite to the forward direction. The Z stage is moved in a direction in which the objective lens 25 moves toward the observation object, for example. Subsequently, a predetermined frame skip process is performed during movement of the Z stage (described later with reference to FIG. 28) in Step S2705. Subsequently, it is determined whether the Z stage is moved through the entire height range of short range auto-focusing in Step S2706. If not, the procedure returns to Step S2704 and repeats the routine.

If the Z stage is moved through the entire height range of short range auto-focusing, the procedure goes to Step S2707 in which the Z stage is moved to a height position corresponding to the maximum focus value. The height position corresponding to the maximum focus value corresponds to an in-focus position. Finally, a live image is displayed in Step S2708, and the procedure of performing short range auto-focusing ends.

Figure 26:
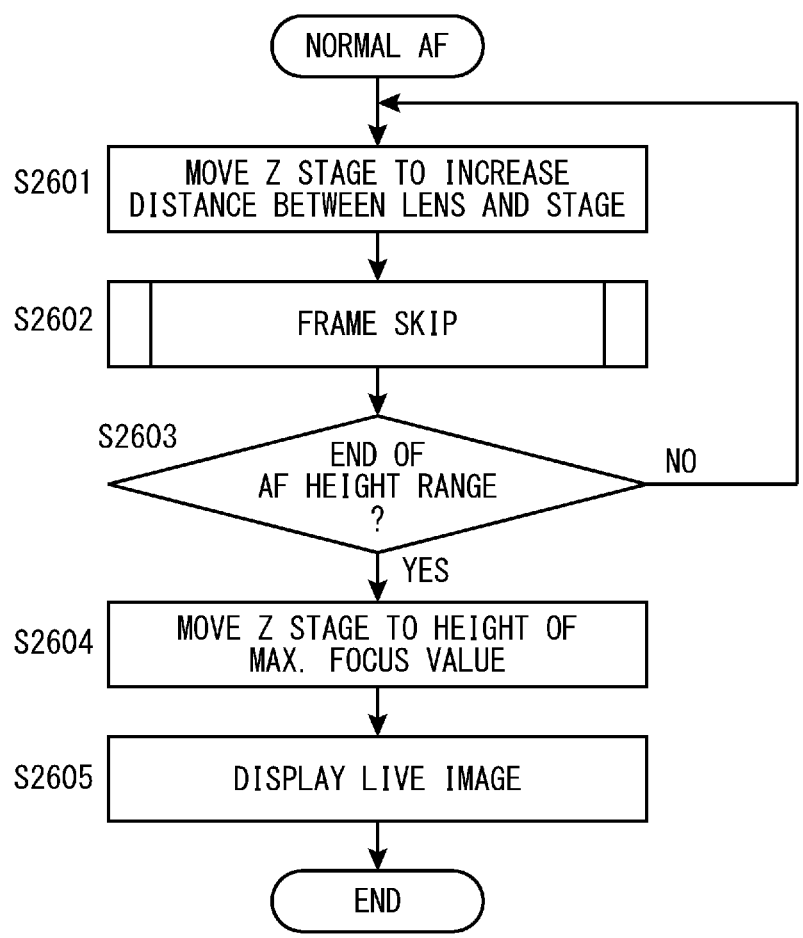
FIG. 26 is a flowchart showing a procedure of frame-skippable normal auto-focusing.
Figure 28:
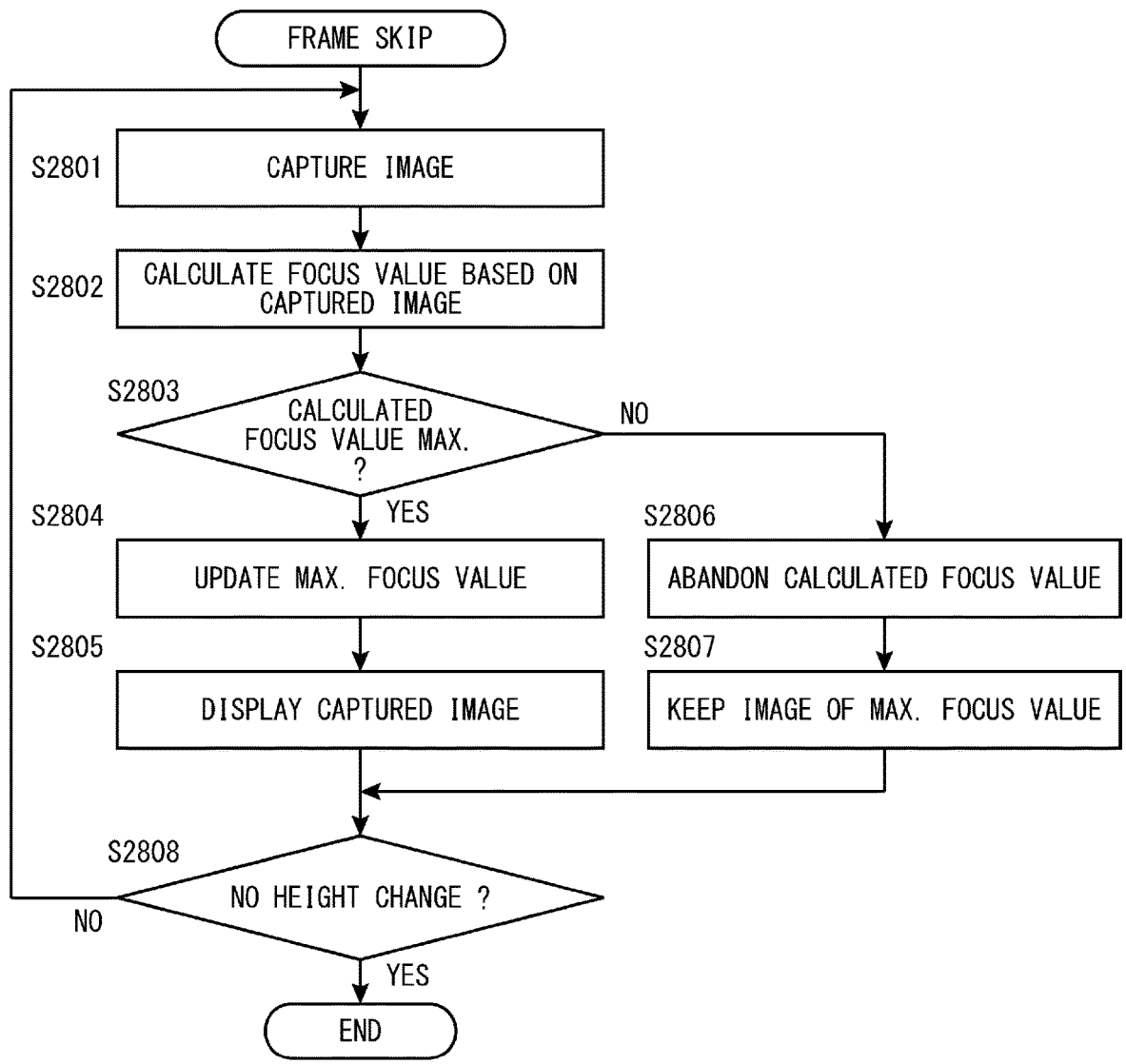
FIG. 28 is a flowchart showing a procedure of the frame skip function.

The procedure of performing the frame skip function in Steps S2702 and S2705 in the flowchart of FIG. 27, and Step S2602 in the flowchart of FIG. 26 is now described with reference to a flowchart of FIG. 28. An image is first captured in Step S2801. A focus value is calculated based on the captured image in Step S2802. The focus values calculated are buffered. Subsequently, it is determined whether the focus value calculated is the maximum in Step S2803. That is, it is determined whether the focus value that is currently calculated is larger than all of focus values that have been calculated. If the current focus value is the largest, the procedure goes to Step S2804 in which the maximum focus value is updated. Subsequently, an image displayed is updated to the newly captured image in Step S2805, and then the procedure goes to Step S2808. If the current focus value is not the largest, the procedure goes to Step S2806 in which the current focus value is abandoned. The procedure then goes to Step S2807 in which an image displayed is not updated. After that, the procedure goes to Step S2808. Subsequently, it is determined whether the objective lens is moved in the height direction in Step S2808. If the objective lens is moved in the height direction, the procedure returns to Step S2801 and repeats the routine. If not, the procedure ends. As a result, the frame skip function that updates an image displayed only when an image of an observation object is correctly focused can be realized. The focus value buffered is reset if short range auto-focusing is completed. In the focus value buffering, all of focus values that have been obtained in short range auto-focusing can be buffered. Alternatively, only a focus value corresponding to the maximum among all of focus values that have been obtained can be buffered.

(Search Auto-Focusing Function)

Figure 29:
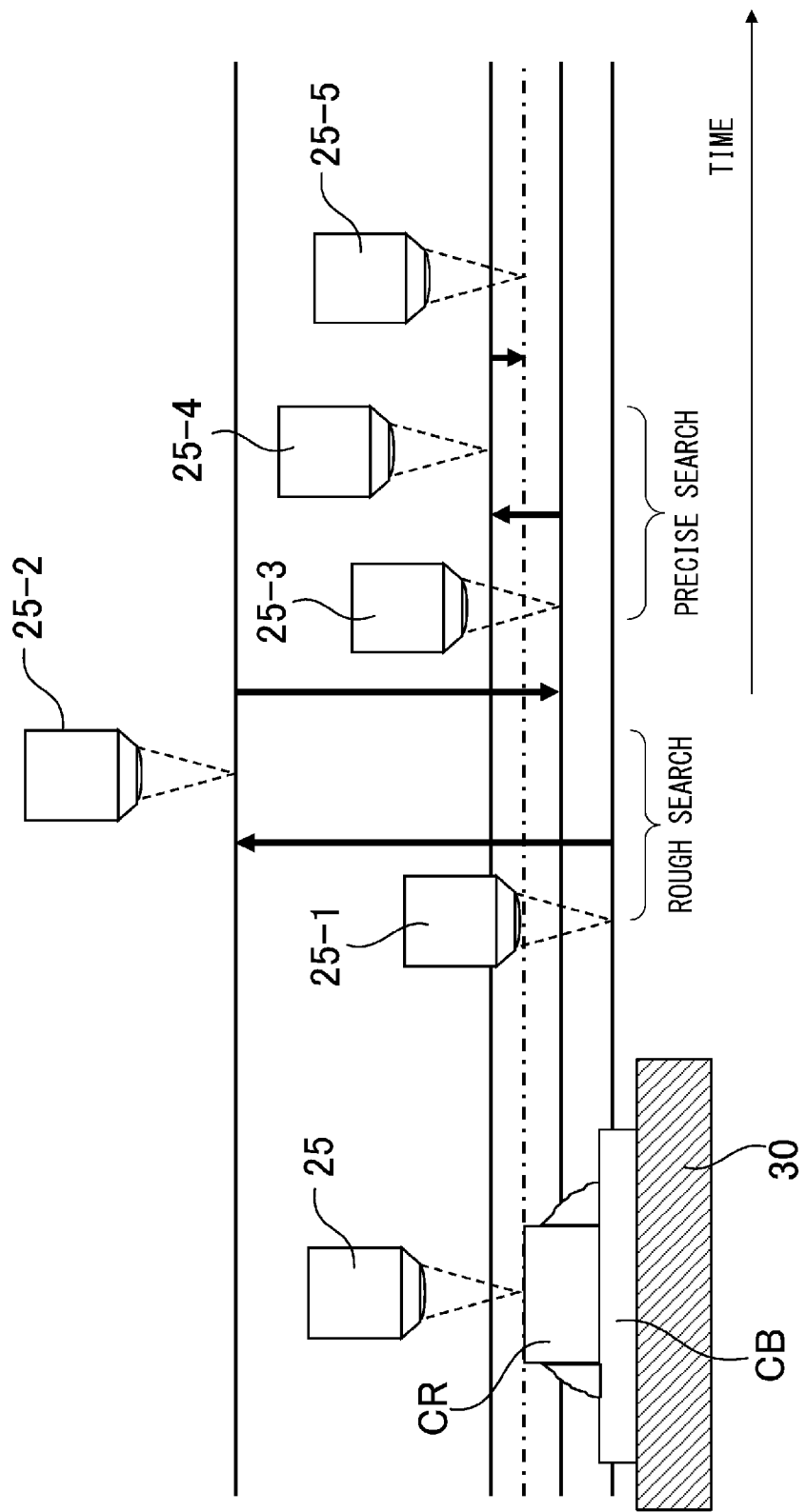
FIG. 29 is a schematic perspective view showing movement of the head in search auto-focusing.

Also, the magnified observation apparatus according to this embodiment has a search auto-focusing function as an example of auto-focusing. FIG. 29 is a schematic perspective view showing a relative distance between the stage 30 and the objective lens 25 as Z direction movement of the objective lens 25. A positional relation between the stage 30, a board CB, and the objective lens 25 is shown in a left-side part of FIG. 29. A chip resistor CR is mounted on the board CB. The objective lens 25 moves in the Z direction. Z-directional positions in the Z direction movement of the objective lens 25 are shown in chronological order of 25-1, 25-2, 25-3, and 25-4, which are arranged from the left side to the right side in a right part of FIG. 29. The search auto-focusing function uses rough and precise searches, in which the objective lens is moved in wider and narrower ranges in the Z direction, respectively, in auto-focusing, as shown in FIG. 29. Combination of the rough and precise searches can provide both high speed and precision of auto-focusing. The objective lens 25 or the Z stage is moved in accordance with a height of an observation object in the vertical direction by control of the search auto-focusing function as shown in FIG. 29. The control of the search auto-focusing function is now described with reference to a timing chart of FIG. 30 as a time-line chart. Focus value variation and change between live-image display and frame skip display in vertical directional control of the objective lens or the Z stage shown in FIG. 29 are shown in the timing chart. The timing chart of FIG. 30 shows that the rough search corresponding to a wider Z range is first executed, and the precise search corresponding to a narrower Z range is then executed.

Figure 30:
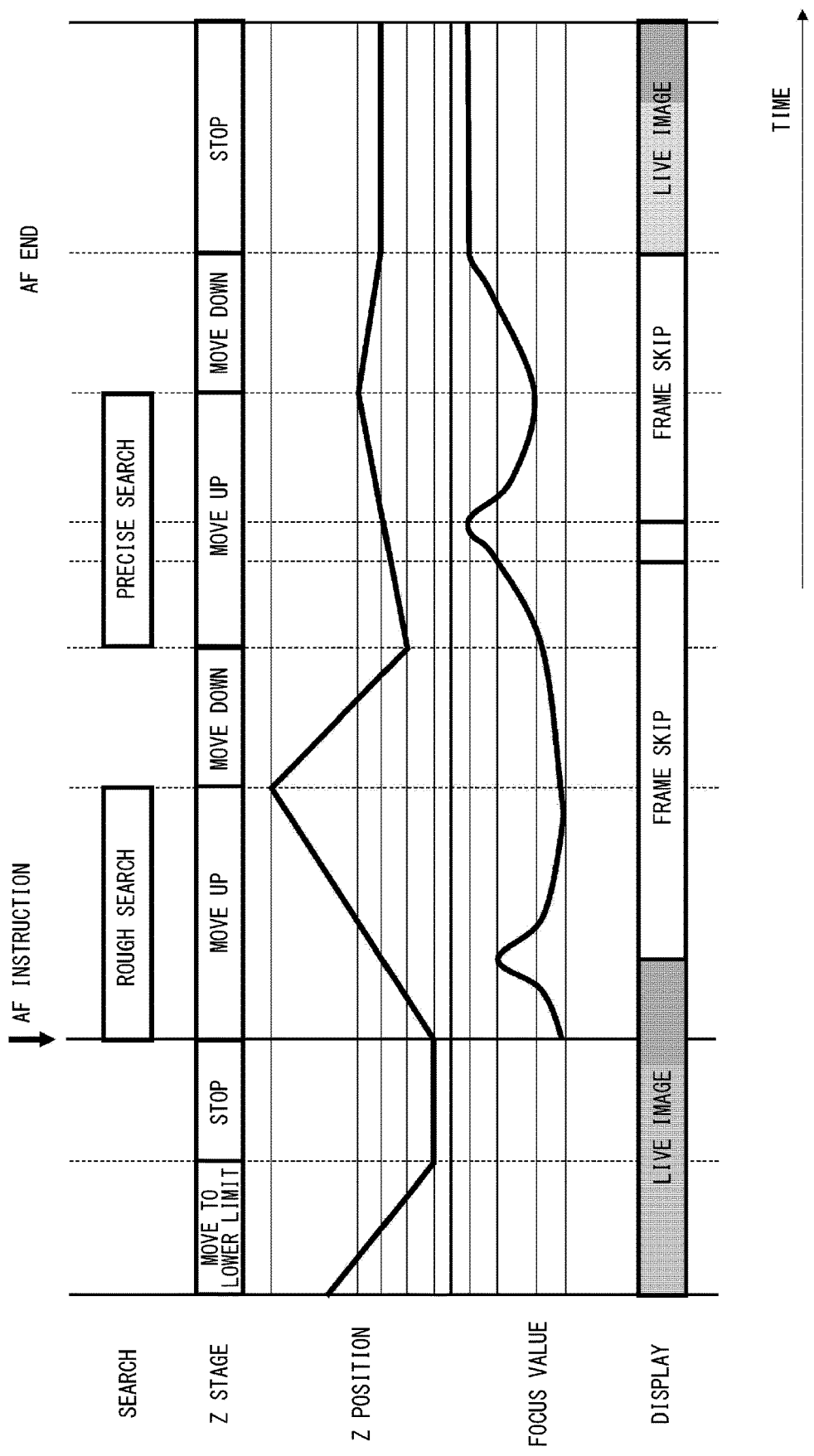
FIG. 30 is a timing chart showing the search auto-focusing.

The rough search is first executed when the search auto-focusing function is activated as shown in an upper part of FIG. 30. In this timing chart, the Z stage is moved downward to a lower limit position of the rough search in response to user input, and then moved upward from the lower limit position to an upper limit position of the rough search. In the upward movement, a live image will be displayed (live display in which an image displayed is continuously updated) to some midpoint corresponding to a peak focus value (peak position). After the peak position, focus values will not exceed the peak so that an image that is captured at the peak position is kept displayed (updating of an image displayed is stopped). That is, live-image display is changed to frame skip display in which the image displayed is not updated. Subsequently, when the rough search is completed, the Z stage is moved downward again to a lower limit position of the precise search. Upper and lower limit positions of the precise search are specified in accordance with the peak position in the rough search. Subsequently, the precise search starts so that the Z stage is moved upward to the upper limit position of the precise search. A pitch of the precise search is smaller than the rough search. As a result, the precise search can more precisely find a peak position. When a focus value that is acquired in the precise search becomes larger than the maximum focus value that is acquired in the rough search, an image displayed is updated. After the peak position, live-image display is changed to frame skip display in which an image that is captured at the peak position is kept displayed (a still image is displayed). When the peak position corresponding to the maximum focus value is fond after the rough and precise searches, the Z stage is moved to the peak position and stopped so that frame skip display is changed to live-image display and a live image is continuously displayed.

(Procedure of Followable-Focusing Mode)

Figure 31:
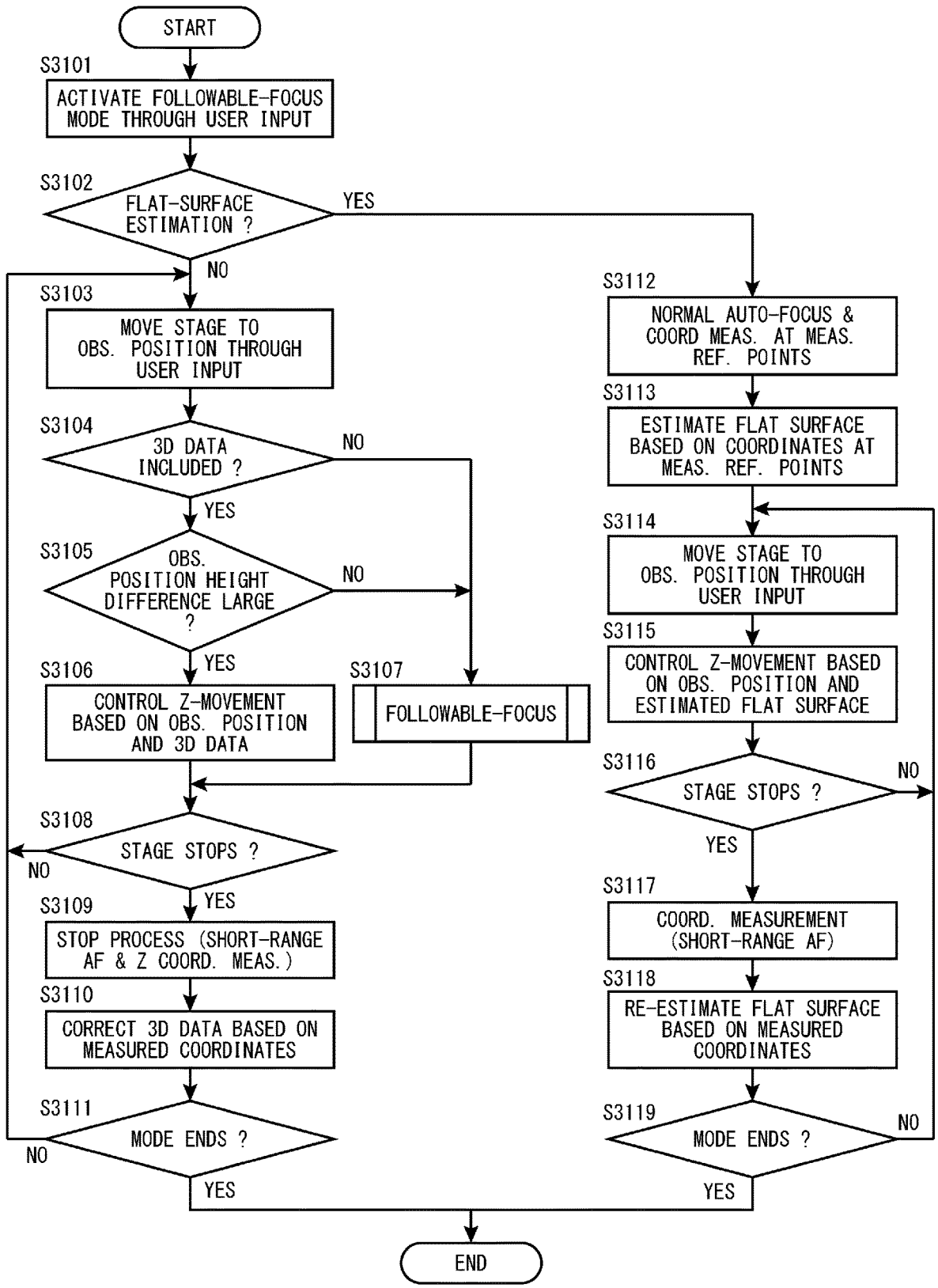
FIG. 31 is a flowchart showing a procedure of a followable focusing mode.

The procedure of performing the followable-focusing mode in which the followable focusing is activated is now described with reference to a flow chart of FIG. 31. The followable-focusing mode is first activated in response to user input in Step S3101. Subsequently, it is determined whether to perform flat-surface estimation in Step S3102. If yes, the procedure goes to Step S3112. If flat-surface estimation is not performed, the procedure goes to Step S3103.

The stage 30 is moved to an observation position in accordance with user input in Step S3103. Subsequently, it is determined whether the observation position is in a 3D-data included area in Step S3104. If the observation position is in a 3D-data absent area, the procedure goes to Step S3107 in which a predetermined followable-focusing process is performed. The predetermined followable-focusing process has been described with reference to FIG. 18.

If the observation position is in a 3D-data included area, it is determined whether a difference between the current height position and a height at a next XY observation position in 3D data is large in Step S3105. For example, it is determined whether a difference between the current height position and a height at a next XY observation position in 3D data is larger than a predetermined threshold. If not, the procedure goes to Step S3107 in which the predetermined followable-focusing process is performed. If the difference is larger than the threshold, Z direction movement of the Z stage is controlled based on the observation position and the 3D data in Step S3106.

Subsequently, the procedure goes from Step S3106 or S3107 to Step S3108 in which it is determined whether to stop movement of the stage 30. If not, the procedure returns to step S3103 and repeats this routine. If it is determined to stop movement of the stage 30, the procedure goes to Step S3109 in which the movement of the stage 30 is stopped (stop process). In this exemplary stop process, short range auto-focusing is performed, and Z coordinates on an observation object are measured (described later). Subsequently, 3D data is corrected based on the Z coordinates measured in Step S3110. That is, three-dimensional reference information to be used for followable focusing is updated. Subsequently, it is determined whether to end the followable-focusing mode in Step S3111. If not, the procedure returns to Step S3103 and repeats this routine. If it is determined to end the followable-focusing mode, the followable-focusing mode ends.

(Flat-Surface Estimation)

If it is determined to perform flat-surface estimation in Step S3102, the procedure goes to Step S3112 so that flat-surface estimation is performed. Specifically, normal auto-focusing is performed, and coordinates are measured at measurement reference points (coordinate measurement is performed) in Step S3112. Subsequently, a flat surface is estimated in accordance with the coordinates at the measurement reference points in Step S3113. The stage 30 is moved to an observation position in accordance with user input in Step S3114. Subsequently, Z direction movement of the Z stage is controlled based on the observation position and the flat surface estimated in Step S3115. Subsequently, it is determined whether to stop the movement of the stage 30 in Step S3116. If not, the procedure returns to Step S3114 and repeats this routine. If it is determined to stop movement of the stage 30, the procedure goes to Step S3117 in which coordinate measurement is performed. Short range auto-focusing (described later) is also performed in Step S3117. Subsequently, a flat surface is estimated again based on the coordinates measured in Step S3118. Finally, it is determined whether to end the followable-focusing mode in Step S3119. If not, the procedure returns to Step S3114 and repeats this routine. If it is determined to end the followable-focusing mode, the followable-focusing mode ends.

(Single-Shot Composition)

Also, the magnified observation apparatus according to this embodiment can generate 3D image data that is obtained by composing images captured at different heights (DOF composite image processing). In DOF composite image processing, upper and lower limit heights can be specified as a range of the height direction by users. Alternatively, such user specification can be omitted by automatically specifying a range of the height direction. The magnified observation apparatus according to this embodiment has a single-shot composing function that allows users to obtain a DOF composite image by using such automatic height range specification (single-shot composition). The processor 80 shown in FIG. 2 can execute the single-shot composition. The block diagram of FIG. 2 shows the single-shot composer 98, which is realized in the processor 80.

Figure 32:
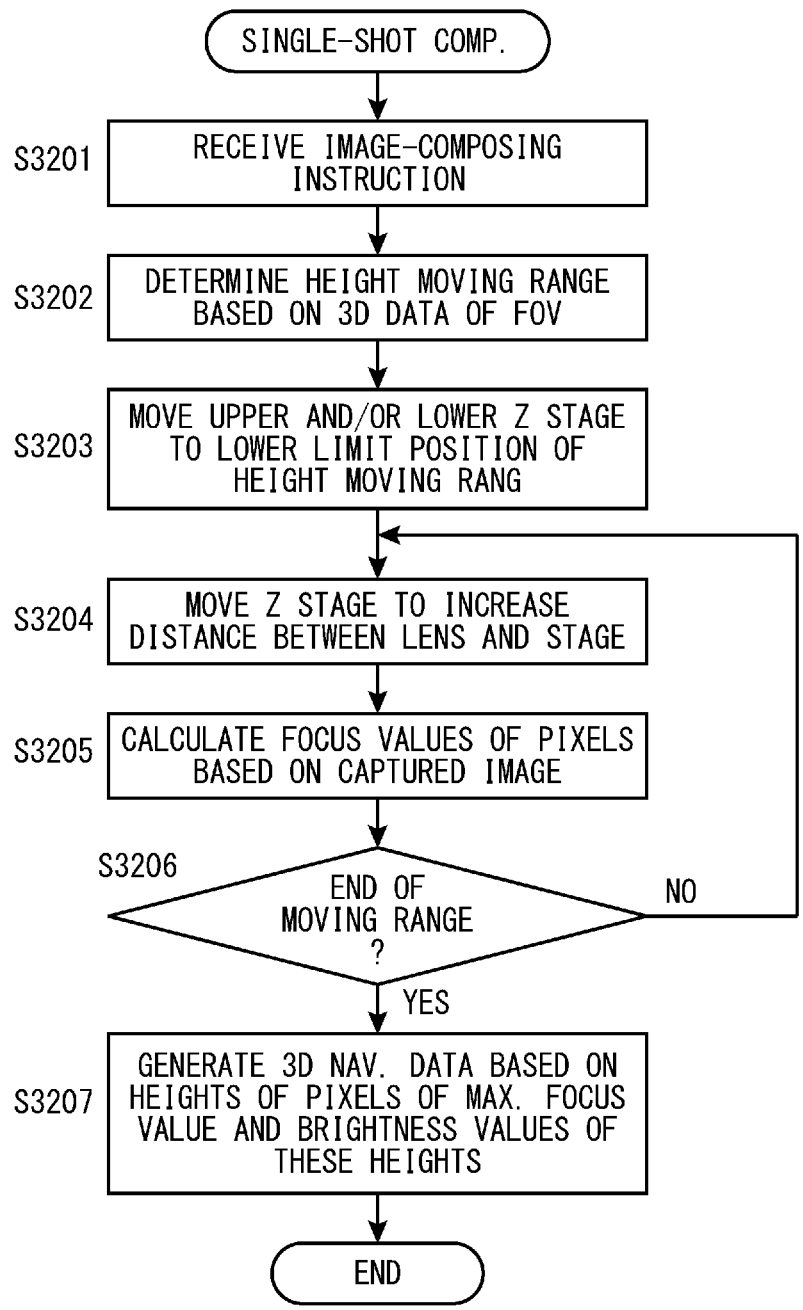
FIG. 32 is a flowchart showing a procedure of single-shot composition.
Figure 36:
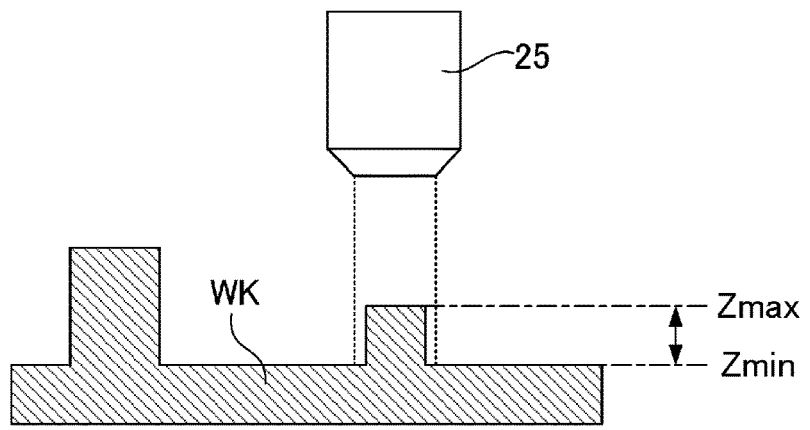
FIG. 36 is a schematic view showing DOF image composition.

A procedure of executing the single-shot composition is now with reference to a flowchart of FIG. 32 and the schematic view of FIG. 36. A direction to execute the single-shot composition is first received from a user in Step S3201. For example, the user clicks on the "Single-Shot Composition" button 249 on the user interface screen of a magnified observation program shown in FIG. 16. Subsequently, a height moving range is determined based on 3D data corresponding to a field of view in Step S3202. Subsequently, the upper Z stage and/or the lower Z stage is moved to the lower limit height Zmin, which is the lower limit position of the height moving range, in Step S3203. Subsequently, the Z stage is moved in a direction that increases a relative distance between the objective lens 25 and the stage 30 in Step S3204. Subsequently, an image is captured, and focus values of pixels are calculated based on the image captured in Step S3205. The in-focus degree evaluator 91 calculates the focus value. Subsequently, it is determined whether the upper Z stage and/or the lower Z stage is moved through the entire moving range, in other words, reaches the upper limit height Zmax in Step S3206. If not, the procedure returns to Step S3204 and repeats this routine. If the upper Z stage and/or the lower Z stage reaches the upper limit height Zmax, the procedure goes to Step S3207 in which 3D navigation data is generated as a DOF composite image based on height positions corresponding to the maximum focus values of pixels and subject brightness values of pixels corresponding to the height positions. The single-shot composition allows users to generate 3D image data which including height information that is acquired by using suitable upper and lower limit heights without specifying upper and lower limit heights on users' own. The single-shot composition can be activated by a click out the "Single-Shot Composition" button 249 shown in FIG. 16, etc. Alternatively, the single-shot composition can be activated when the sequence changes to the FOV-resting sequence. Change of a relative distance between the stage and the objective lens in the short range auto-focusing when the sequence changes to the FOV-resting sequence can be used commonly with in the single-shot composition. Because a relative distance between the stage and the objective lens is adjusted to focus images of an observation object in the DOF composite image processing, the common use of such a relative distance between the short range auto-focusing and the single-shot composition can immediately display a focused live image when the sequence changes to the FOV moving sequence after the single-shot composition.

(FOV Moving Sequence)

Although the FOV moving sequences that perform short range auto-focusing and shot at a stop position have been illustratively described, FOV moving sequences are not limited to these. When the sequence changes to the FOV-resting sequence, the image-processing part 84 can generate a composite image so that the composite image can be displayed on the display 70. Composite images that can be generated by the image-processing part 84 can include a DOF composite image, a 3D composite image, a pixel shift multi shot image, a super-resolution image, HDR video, and the like. If a recording direction is received from a user in the FOV moving sequence, the storage device 53 stores a composite image that is displayed on the display. If the sequence changes from the FOV moving sequence to the FOV moving sequence again, the composite image is cleared, and a live image is displayed on the display 70. Also, if the sequence changes to the FOV-resting sequence, short range auto-focusing can be performed, and one or more types of composite image can be generated. For example, in the case in which short range auto-focusing is performed and an HDR image is generated if the sequence changes to the FOV-resting sequence, after short range auto-focusing, images are captured to generate an HDR image so that the image-processing part 84 generates the HDR image based on the images captured.

Third Embodiment

Figure 33:
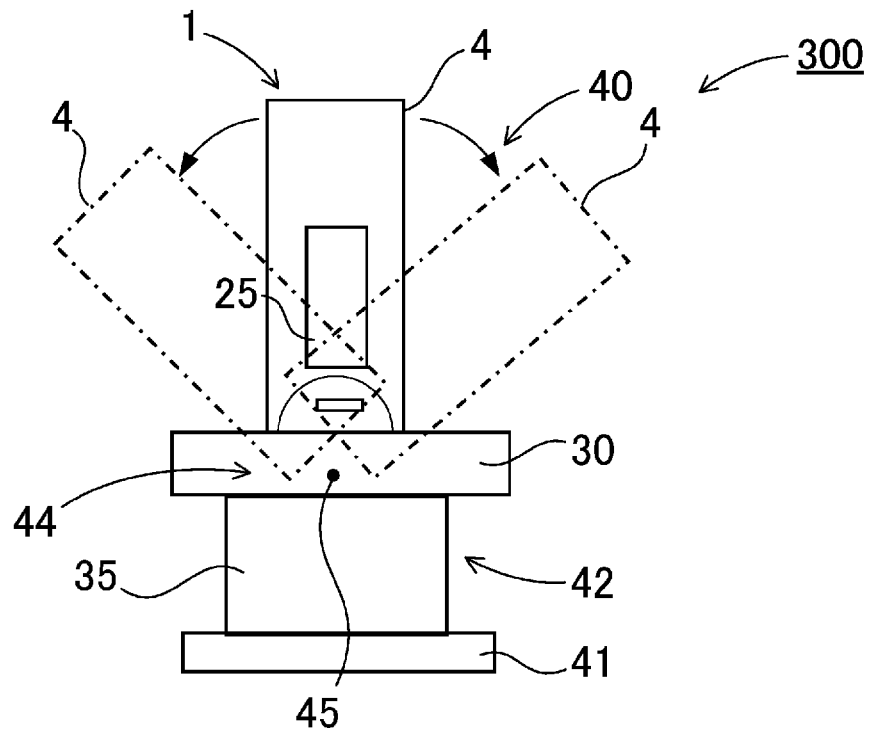
FIG. 33 is a front view showing a magnified observation apparatus according to a third embodiment of the present disclosure.

A magnified observation apparatus 300 according to a third embodiment of the present disclosure further has an oblique observation function. The magnified observation apparatus 300 according to the third embodiment, which has the oblique observation function, is now described with reference to FIG. 33. FIG. 33 is a front view showing the imaging group part 1 of the magnified observation apparatus 300. The components according to the magnified observation apparatus shown in FIG. 33 similar to the foregoing first embodiment are attached with the same reference signs as the first embodiment, and their description is omitted.

The imaging group part 1 includes the stage 30, which holds the observation object, a head 4, and a support 40 that supports the head 4. The support 40 includes a stage movable holder 42 that holds the stage 30 movably in a horizontal plane and in a vertical direction, and a head incliner 44 that can incline the head 4 while the stage 30 is kept held. The stage movable holder 42 and the head incliner 44 are fixed to a base 41. The support 40 stably stands on the base 41, which has a plate shape.

An observation object can be observed in a slant direction (oblique observation) by the head incliner 44 by inclining the head 4 with respect to the stage 30. In particular, in the case in which the head 4 can swing leftward and rightward with respect to an upright orientation about a pivot shaft 45, an observation object can be observed both in left and right slant directions. Such different views can provide high flexibility in observation. In addition, in the oblique observation, an observation FOV is required to be fixed when the head 4 is inclined so that an observation object can be eucentrically observed (eucentric observation). For this reason, in the oblique observation, in order to align a surface of an observation object to be observed with an axis of the pivot shaft 45, a height of the stage 30 is preferably previously adjusted. The magnified observation apparatus according to the third embodiment can execute the followable-focusing mode also in oblique observation. In the case in which the 3D shape following mode is executed, if the head 4 is inclined to a predetermined angle or greater with respect to the stage 30, the 3D shape following mode is cancelled and automatically changed to the normal mode. After that, if an inclination angle of the head 4 with respect to the stage 30 is adjusted into a range smaller than the predetermined angle again, the normal mode is automatically changed to the 3D shape following mode. The normal mode can be executed at all times irrespective of an inclination angle of the head 4 with respect to the stage 30. An angle sensor can be used to detect whether an inclination angle of the head with respect to the stage is smaller than the predetermined angle. In this case, if the angle sensor detects that the head 4 is inclined an angle not smaller than 15 degrees, for example, with respect to the stage 30, the 3D shape following mode can be cancelled and automatically changed to the normal mode. Also, if an inclination angle of the head with respect to the stage is adjusted into a range smaller than 15 degrees, the normal mode can be automatically changed to the 3D shape following mode. Alternatively, a physical lock can be provided to fix the head at 0 degree with respect to the stage 30, in other words, to keep the head 4 upright. In this case, the 3D shape following mode can be automatically activated/deactivated (turned ON/OFF) depending on locking/unlocking of the physical lock. In the case in which the head is fixed at 0 degree, the 3D shape following mode can be executed. If unlocking of the physical lock is detected, for example, the 3D shape following mode can be automatically changed to the normal mode.

Fourth Embodiment

Figure 34:
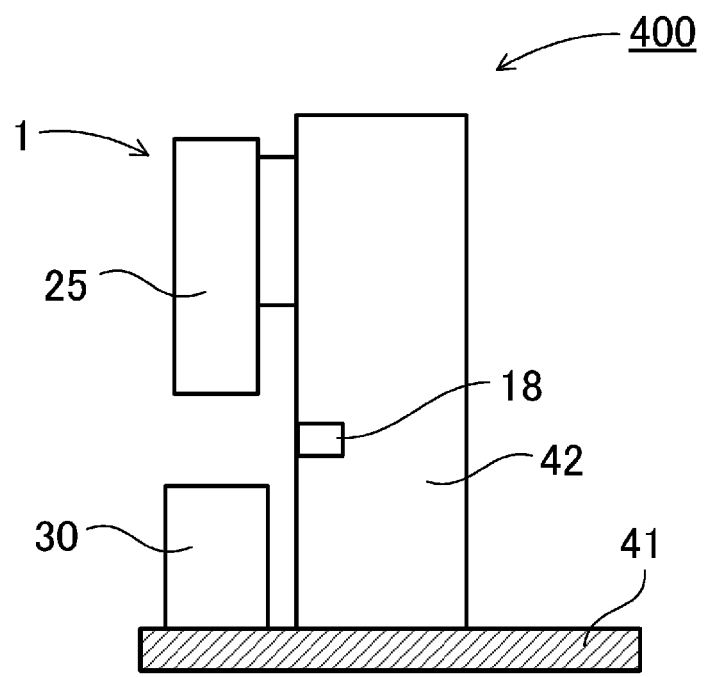
FIG. 34 is a side view showing a magnified observation apparatus according to a fourth embodiment of the present disclosure.

A magnified observation apparatus 400 according to a fourth embodiment of the present disclosure further includes a side camera 18. The side camera 18 captures an image of an observation object on the stage 30 in a side view. The side camera 18 allows users to know a positional relation between the observation object on the mount surface of the stage 30 and the objective lens 25. That is, users can see the positional relation in real time when observing the observation object. As a result, unintended contact can be prevented. The side camera 18 is arranged to capture a side camera image that includes a lower end of the objective lens 25 and an upper end of the stage 30. A user can store a magnified image of an observation object together with it corresponding side camera image when capturing the magnified image through the objective lens 25. In this case, the user can easily and visually know how the magnified image of the observation object is captured at a later date. FIG. 34 is a side view showing the magnified observation apparatus 400 according to the fourth embodiment, which includes the side camera 18. The components according to the magnified observation apparatus 400 shown in FIG. 34 similar to the foregoing first embodiment are attached with the same reference signs as the first embodiment, and their description is omitted. The illustrated magnified observation apparatus 400 includes a stage 30, a head 4, and a support 40 that supports the head 4 as an imaging group part 1. The head 4 includes the side camera 18.

(Side Camera Image)

Figure 35:
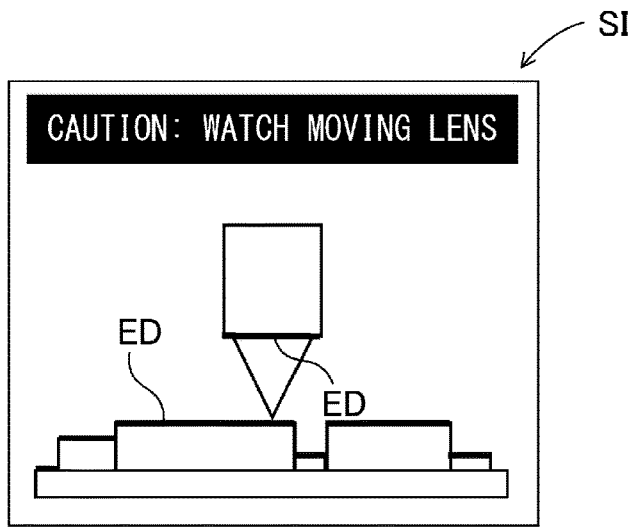
FIG. 35 is a schematic view showing a side camera image captured by a side camera shown in FIG. 34.

The side camera 18 is arranged to capture an image including an upper surface of an observation object and the end of the objective lens 25. FIG. 35 is a schematic view showing an exemplary side camera image SI captured by the side camera 18. A scaling factor and an observation FOV of the side camera are specified to allow users to know a positional relation between the end of the objective lens 25, the observation object, and the stage 30 in the side camera image SI as shown in this FIG. 35. In addition, a phantom focus position of the objective lens 25 can be indicated in the side camera image SI. Also, edge lines ED that are extracted from an image captured can be indicated by thick lines the side camera image SI as shown in FIG. 35. For example, the image-processing part 84 detects an upper edge of the observation object and the end of the objective lens 25 by applying edge extraction to an image that is captured by the side camera 18. As a result, calculation can be performed to prevent contact between an observation object and the objective lens 25 when an image of the observation object is captured or the observation object is measured. Also, a warning can be issued based on the calculation if a possibility of contact arises. An exemplary warning message "Caution: Watch Moving Lens" can be indicated in the side camera image SI on the display 70 as shown in FIG. 35. Such a warning message can be conspicuously indicated by reversed, highlighted, underlined, color-changed characters, or the like to visually issue an alarm about contact to users. Also, an audible warning message, a warning beep, or the like can be issued. Alternatively, a warning light can be activated or flashed. Needless to say, they can be used suitably together.

A background part can be shown differently from the objective lens 25 and the observation object in the side camera image SI so that users can easily distinguish the objective lens 25 and the observation object from the background part. For example, a depth of field of the side camera 18 is adjusted to clearly show only a depth area of the stage 30 corresponding to the depth of field. A background determiner that automatically extracts a background part can be provided. The background determiner determines a fixed part or brightness-varying part in the side camera image SI to the background part, for example. In this case, brightness of the illumination light can be varied. Alternatively, a background influence reducer that masks a background part can be provided. The background determiner or background influence reducer can be separately provided. Alternatively, the image-processing part 84 can serve as the background determiner or background influence reducer.

A magnified observation apparatus, magnified observation method, a magnified observation program, and a non-transitory computer-readable storage medium or storage device storing the magnified observation program according to the present disclosure relates can be suitably used as a microscope, a digital microscope (e.g., reflection or transmission digital microscope), or the like.

It should be apparent to those with an ordinary skill in the art that while various preferred examples of the invention have been shown and described, it is contemplated that the invention is not limited to the particular examples disclosed. Rather, the disclosed examples are merely illustrative of the inventive concepts and should not be interpreted as limiting the scope of the invention. All suitable modifications and changes falling within the spirit of the invention are intended to be encompassed by the appended claims.

What is claimed is:

1. A magnified observation apparatus comprising:
a stage to hold an observation object thereon;
an objective lens adaptive to face the observation object;
a camera configured to capture an image of the observation object through the objective lens and generate image data representing the image;
a display controller configured to control a display to display the image of the observation object based on the image data generated by the camera;
a focusing device configured to adjust image focus by changing a relative distance between a focus position of the objective lens and the observation object by moving at least one of the objective lens and the observation object toward or away from each other in an optical axis of the objective lens to focus an image of the observation object;
an FOV changer configured to change a position of an optical axis of the objective lens relative to the stage to move an observation field-of-view of the camera,
an in-focus degree evaluator configured to calculate in-focus degree feature quantities, which represent in-focus degrees of the image data corresponding to images of the observation object that are generated by the camera; and
a focus sequence executor configured to execute an FOV-moving focus sequence in which the focusing device adjusts a relative distance between the focus position of the objective lens and the observation object in accordance with in-focus degree feature quantities of image data successively calculated by the in-focus degree evaluator corresponding to images of the observation object captured during movement of an observation field-of-view by the FOV changer so that a live image of the observation object is displayed on the display based on image data obtained during the movement of an observation field-of-view by the display controller, wherein in the FOV-moving focus sequence, when in-focus degree feature quantities, detected based on image data after movement of the focusing device in one direction, becomes greater than before the movement of the focusing device in the one direction, the movement of the focusing device in the one direction is continued by the focus sequence executor, and when in-focus degree feature quantities, detected based on image data after the movement of the focusing device in the one direction, becomes smaller than before the movement of the focusing device in the one direction, the movement of the focusing device in the one direction is changed to the opposite direction by the focus sequence executor.

2. The magnified observation apparatus according to claim 1, wherein the focus sequence executor ends the FOV-moving focus sequence in response to resting of an observation field-of-view by the FOV changer, and executes an FOV-resting sequence in which the focusing device stops adjustment of a relative distance between the focus position of the objective lens and the observation object.

3. The magnified observation apparatus according to claim 2 further comprising a movement/rest detector configured to detect moving and resting of an observation field-of-view, wherein the focus sequence executor is configured to execute in response to the detection of moving of an observation field-of-view by the movement/rest detector the FOV-moving focus sequence in which the focusing device adjusts a relative distance between the focus position of the objective lens and the observation object based on at least one of image data of an image that is captured by the camera during the movement of an observation field-of-view and information about a position of an observation field-of-view so that a live image of the observation object is displayed on the display based on the image data of an image that is captured by the camera during the movement of an observation field-of-view by the display controller, and end in response to the detection of resting of an observation field-of-view by the movement/rest detector the FOV-moving focus sequence, and execute the FOV-resting sequence in which the focusing device stops adjustment of a relative distance between the focus position of the objective lens and the observation object.

4. The magnified observation apparatus according to claim 3, wherein the movement/rest detector is configured to detect moving of an observation field-of-view, and is configured to detect resting of an observation field-of-view, wherein the focus sequence executor is configured to execute in response to the detection of moving of an observation field-of-view by the movement/rest detector the FOV-moving focus sequence in which the focusing device adjusts a relative distance between the focus position of the objective lens and the observation object based on at least one of image data of an image that is captured by the camera during the movement of an observation field-of-view and information about a position of an observation field-of-view so that a live image of the observation object is displayed on the display based on the image data of an image that is captured by the camera during the movement of an observation field-of-view by the display controller, and end in response to the detection of resting of an observation field-of-view by the movement/rest detector the FOV-moving focus sequence, and execute the FOV-resting sequence in which the focusing device stops adjustment of a relative distance between the focus position of the objective lens and the observation object.

5. The magnified observation apparatus according to claim 1, wherein the in-focus degree evaluator uses focus values that are calculated based on image data as the in-focus degree feature quantities, wherein in the FOV-moving focus sequence, when a focus value, detected based on image data after movement of the focusing device in one direction, becomes greater than before the movement of the focusing device in the one direction, the movement of the focusing device in the one direction is continued by the focus sequence executor, and when a focus value, detected based on image data after the movement of the focusing device in the one direction, becomes smaller than before the movement of the focusing device in the one direction, the movement of the focusing device in the one direction is changed to the opposite direction by the focus sequence executor.

6. The magnified observation apparatus according to claim 1, further comprising a height information acquirer configured to acquire height information of the observation object at different positions as three-dimensional reference information, wherein, during movement by the FOV changer of an observation field-of-view to be displayed on the display by the display controller, a relative distance between the focus position of the objective lens and the observation object is adjusted in accordance with height information of a next observation position in the three-dimensional reference information, the three-dimensional reference information being acquired by the height information acquirer, by the focusing device.

7. The magnified observation apparatus according to claim 6, wherein during movement by the FOV changer of an observation field-of-view to be displayed on the display by the display controller, a normal mode is executed in the case of absence of height information of a next observation position in the three-dimensional reference information, the three-dimensional reference information being acquired by the height information acquirer, and wherein in the normal mode a relative distance between the focus position of the objective lens and the observation object is adjusted by the focusing device in accordance with the in-focus degree feature quantities, which are successively calculated by the in-focus degree evaluator.

8. The magnified observation apparatus according to claim 6, wherein if a height-information absent part of the observation object whose height-information is not included in the three-dimensional reference information, the three-dimensional reference information being acquired by the height information acquirer, is displayed, the focusing device performs the image focus adjustment in accordance with height information that is estimated based on height information of a peripheral part in proximity to the height-information absent part.

9. The magnified observation apparatus according to claim 6, wherein the height information acquirer acquires height information of the observation object at different positions as three-dimensional reference information when a wide area image is captured at a power lower than a magnified image displayed on the display by the display controller.

10. The magnified observation apparatus according to claim 6, wherein the height information acquirer acquires height information of the observation object at different positions as three-dimensional reference information when images are captured to be coupled to each other to obtain a wide area image.

11. The magnified observation apparatus according to claim 6 further comprising a determiner that determines during movement by the FOV changer of an observation field-of-view to be displayed on the display by the display controller whether to allow change of a relative distance between the focus position of the objective lens and the observation object beyond a predetermined condition by the focusing device based on height information of a next observation position in the three-dimensional reference information, which is acquired by the height information acquirer,
wherein during movement by the FOV changer of an observation field-of-view to be displayed on the display by the display controller a 3D shape following mode is executed if the determiner determines to allow change of a relative distance between the focus position of the objective lens and the observation object beyond the predetermined condition,
wherein in the 3D shape following mode the focusing device adjusts the relative distance based on height information of a next observation position in the three-dimensional reference information, which is acquired by the height information acquirer, and
wherein during movement by the FOV changer of an observation field-of-view to be displayed on the display by the display controller, a normal mode is executed in the case of absence of height information of a next observation position in the three-dimensional reference information, which is acquired by the height information acquirer, if the determiner does not determine to allow change of a relative distance between the focus position of the objective lens and the observation object beyond the predetermined condition, and
wherein in the normal mode a relative distance between the focus position of the objective lens and the observation object is adjusted by the focusing device in accordance with the in-focus degree feature quantities, which are successively calculated by the in-focus degree evaluator.

12. The magnified observation apparatus according to claim 11, wherein in the FOV-moving focus sequence the determiner compares height information that is calculated in the normal mode with height information calculated in the 3D shape following mode, and determines to allow change of a relative distance between the focus position of the objective lens and the observation object beyond the predetermined condition if a difference between the height information that is calculated in the normal mode and the height information that is calculated in the 3D shape following mode is greater than a predetermined value.

13. The magnified observation apparatus according to claim 6 further comprising a single-shot composer that is configured to automatically specify upper and lower height limits in accordance with height information corresponding to an image of an observation object that is displayed in an observation field-of-view, and composes images corresponding to heights from the upper and lower height limits to obtain a depth-of-field composite image.

14. The magnified observation apparatus according to claim 2 further comprising a height information acquirer that is configured to acquire height information of the observation object at different positions as three-dimensional reference information,
wherein, in the FOV-moving focus sequence, during movement by the FOV changer of an observation field-of-view to be displayed on the display by the display controller, a relative distance between the focus position of the objective lens and the observation object is adjusted in accordance with height information of a next observation position in the three-dimensional reference information, which is acquired by the height information acquirer, by the focusing device, and
wherein auto-focusing is performed in the FOV-resting sequence.

15. The magnified observation apparatus according to claim 14, wherein in the FOV-resting sequence auto-focusing is performed, and height information of the observation object is acquired at a stop position so that three-dimensional reference information is updated based on the height information acquired.

16. The magnified observation apparatus according to claim 3 further comprising a height information acquirer that is configured to acquire height information of the observation object at different positions as three-dimensional reference information,
wherein, in the FOV-resting sequence, if moving of the observation field-of-view is detected under auto-focusing, the auto-focusing is stopped, and during movement by the FOV changer of an observation field-of-view to be displayed on the display by the display controller, a relative distance between the focus position of the objective lens and the observation object is adjusted in accordance with height information of a next observation position in the three-dimensional reference information, which is acquired by the height information acquirer, by the focusing device.

17. The magnified observation apparatus according to claim 2 further comprising a height information acquirer that is configured to acquire height information of the observation object at different positions as three-dimensional reference information,
wherein, in the FOV-moving focus sequence, during movement by the FOV changer of an observation field-of-view to be displayed on the display by the display controller, a relative distance between the focus position of the objective lens and the observation object is adjusted in accordance with height information of a next observation position in the three-dimensional reference information, which is acquired by the height information acquirer, by the focusing device, and
in the FOV-resting sequence, upper and lower height limits are specified in accordance three-dimensional reference information and an area of an observation field-of-view at a stop position, and images corresponding to heights from the upper and lower height limits are composed to obtain a depth-of-field composite image.

18. The magnified observation apparatus according to claim 1, wherein in the FOV-moving focus sequence the focus sequence executor constructs a surface that is selected from predetermined geometric shapes and has the best fit to heights of the observation object corresponding to different positions to estimate a surface along which the focus position of the objective lens is to be moved, and determines a target height based on information about the surface, which is estimated as a next observation position.

19. The magnified observation apparatus according to claim 2 further comprising a height information acquirer that is configured to acquire height information of the observation object at different positions as three-dimensional reference information,
wherein in the FOV-moving focus sequence a surface is selected from predetermined geometric shapes and is constructed to have the best fit to heights of the observation object corresponding to different positions to estimate a surface along which the focus position of the objective lens is to be moved, and determines a target height based on information about the surface, which is estimated as a next observation position, and
wherein auto-focusing is performed in the FOV-resting sequence.

20. A magnified observation apparatus comprising:
a stage to hold an observation object thereon;
an objective lens adaptive to face the observation object;
a camera configured to capture an image of the observation object through the objective lens and generate image data representing the image;
a display controller configured to control a display to display the image of the observation object based on the image data generated by the camera;
a focusing device configured to adjust image focus by changing a relative distance between a focus position of the objective lens and the observation object by moving at least one of the objective lens and the observation object toward or away from each other in an optical axis of the objective lens to focus an image of the observation object;
a height information acquirer configured to acquire height information of the observation object at different positions as three-dimensional reference information,
an FOV changer configured to change a position of an optical axis of the objective lens relative to the stage to move an observation field-of-view of the camera,
an in-focus degree evaluator configured to calculate in-focus degree feature quantities, which represent in-focus degrees of the image data corresponding to images of the observation object that are generated by the camera;
wherein movement by the FOV changer of an observation field-of-view to be displayed on the display by the display controller is executed according to one mode selected from a 3D shape following mode, in which the focusing device adjusts the relative distance based on height information of a next observation position in the three-dimensional reference information, and a normal mode, in which a relative distance between the focus position of the objective lens and the observation object is adjusted by the focusing device in accordance with the in-focus degree feature quantities, which are successively calculated by the in-focus degree evaluator.

* * * * *